United States Patent
Walker et al.

(10) Patent No.: US 7,894,936 B2
(45) Date of Patent: *Feb. 22, 2011

(54) PRODUCTS AND PROCESSES FOR MANAGING THE PRICES OF VENDING MACHINE INVENTORY

(75) Inventors: Jay S. Walker, Ridgefield, CT (US); Daniel E. Tedesco, Huntington, CT (US); Dean P. Alderucci, Westport, CT (US)

(73) Assignee: Walker Digital, LLC, Stamford, CT (US)

(*) Notice: Subject to any disclaimer, the term of this patent is extended or adjusted under 35 U.S.C. 154(b) by 1607 days.

This patent is subject to a terminal disclaimer.

(21) Appl. No.: 10/966,407

(22) Filed: Oct. 15, 2004

(65) Prior Publication Data

US 2005/0060062 A1 Mar. 17, 2005

Related U.S. Application Data

(63) Continuation-in-part of application No. 09/218,085, filed on Dec. 22, 1998, and a continuation-in-part of application No. 09/345,092, filed on Jun. 30, 1999, now Pat. No. 7,249,050, and a continuation-in-part of application No. 10/095,372, filed on Mar. 11, 2002, now Pat. No. 7,233,912, which is a continuation-in-part of application No. 08/947,798, filed on Oct. 9, 1997.

(60) Provisional application No. 60/511,875, filed on Oct. 16, 2003, provisional application No. 60/527,988, filed on Dec. 9, 2003.

(51) Int. Cl.
*G06F 17/00* (2006.01)

(52) U.S. Cl. .................. 700/238; 700/236; 705/400; 705/22; 705/28

(58) Field of Classification Search ......... 700/231–244; 705/400, 22, 28
See application file for complete search history.

(56) References Cited

U.S. PATENT DOCUMENTS 2,607,463 A 8/1952 Saigh (Continued)

FOREIGN PATENT DOCUMENTS

CA 2070736 A1 6/1992

(Continued)

OTHER PUBLICATIONS

Rehayem, Gilbert, "Opinion: X-Press Betting", Information Systems & Technology, Ontario Lottery Corp.

(Continued)

*Primary Examiner*—Gene Crawford
*Assistant Examiner*—Michael K Collins
(74) *Attorney, Agent, or Firm*—Fincham Downs, LLC; Carson C. K. Fincham

(57) ABSTRACT

According to one embodiment of the disclosed invention, an apparatus determines a current price of a product for sale by the vending machine. It then determines, for the product, a price increment, a predetermined price, and a demand threshold, that are defined by data stored in at least one data table. A rate of units of the product that are sold are determined. The rate is compared with the demand threshold.

Based on the comparison of the rate with the demand data, it is determined whether the new price should be greater than or less than the current price. The new price is set to the predetermined price if the new price should be greater than the current price. If the new price should be less than the current price, a price increment amount is subtracted from the current price to yield the new price. The determined new price is displayed.

15 Claims, 15 Drawing Sheets

U.S. PATENT DOCUMENTS

| | | |
|---|---|---|
| 3,442,422 A | 5/1969 | Neidig |
| 3,573,747 A | 4/1971 | Adams et al. .............. 340/172.5 |
| 3,609,250 A | 9/1971 | Morris ........................ 179/100 |
| 3,688,276 A | 8/1972 | Quinn |
| 3,691,527 A | 9/1972 | Yamamoto |
| 3,705,384 A | 12/1972 | Wahlberg |
| 3,718,906 A | 2/1973 | Lightner ..................... 340/147 |
| 3,747,733 A | 7/1973 | Knickerbocker |
| 3,937,929 A | 2/1976 | Knauer |
| 3,947,882 A | 3/1976 | Lightner ....................... 360/92 |
| 4,008,792 A | 2/1977 | Levasseur et al. ............ 194/1 N |
| RE29,450 E | 10/1977 | Goldsby |
| 4,108,361 A | 8/1978 | Krause ......................... 235/375 |
| 4,237,537 A | 12/1980 | Pitches et al. ................ 364/465 |
| 4,245,730 A | 1/1981 | Bachmann et al. ........... 194/1 A |
| 4,258,837 A | 3/1981 | Manos |
| 4,282,575 A | 8/1981 | Hoskinson et al. ........... 364/479 |
| 4,316,532 A | 2/1982 | Levasseur ..................... 194/1 N |
| 4,323,770 A | 4/1982 | Dieulot et al. ................ 235/375 |
| 4,341,951 A | 7/1982 | Benton |
| 4,359,147 A | 11/1982 | Levasseur |
| 4,376,479 A | 3/1983 | Sugimoto |
| 4,412,292 A | 10/1983 | Sedam et al. ................. 364/479 |
| 4,417,671 A | 11/1983 | Kawasaki et al. |
| 4,420,751 A | 12/1983 | Paganini |
| 4,454,670 A | 6/1984 | Bachmann et al. ............. 40/584 |
| 4,478,353 A | 10/1984 | Levasseur |
| 4,494,197 A | 1/1985 | Troy et al. ................... 364/412 |
| 4,498,570 A | 2/1985 | King et al. ................... 194/1 N |
| 4,500,880 A | 2/1985 | Gomersall et al. ...... 340/825.35 |
| 4,518,098 A | 5/1985 | Fleischer ...................... 221/15 |
| 4,551,935 A | 11/1985 | Bachmann |
| 4,554,446 A | 11/1985 | Murphy |
| 4,567,609 A | 1/1986 | Metcalf |
| 4,574,947 A | 3/1986 | Hutchings |
| RE32,115 E | 4/1986 | Lockwood |
| 4,587,984 A | 5/1986 | Levasseur et al. ............ 133/8 R |
| 4,593,361 A | 6/1986 | Otten .......................... 364/479 |
| 4,598,378 A | 7/1986 | Giacomo |
| 4,598,810 A | 7/1986 | Shore |
| 4,603,390 A | 7/1986 | Mehdipour |
| 4,639,875 A | 1/1987 | Abraham |
| 4,654,513 A | 3/1987 | Hennessy |
| 4,654,800 A | 3/1987 | Hayashi et al. .............. 364/479 |
| 4,668,150 A | 5/1987 | Blumberg |
| 4,669,730 A | 6/1987 | Small ...................... 273/138 A |
| 4,677,553 A | 6/1987 | Roberts et al. ............... 364/412 |
| 4,679,150 A | 7/1987 | Hayashi et al. .............. 364/479 |
| 4,689,742 A | 8/1987 | Troy et al. ................... 364/412 |
| 4,723,212 A | 2/1988 | Mindrum et al. ............. 364/401 |
| 4,734,858 A | 3/1988 | Schlafly |
| 4,736,096 A | 4/1988 | Ushikubo |
| 4,737,910 A | 4/1988 | Kimbrow |
| 4,743,022 A | 5/1988 | Wood |
| 4,760,247 A | 7/1988 | Keane et al. ................. 235/454 |
| 4,766,548 A | 8/1988 | Cedrone et al. .............. 364/479 |
| 4,799,156 A | 1/1989 | Shavit |
| 4,815,741 A | 3/1989 | Small ...................... 273/138 A |
| 4,817,166 A | 3/1989 | Gonzalez |
| 4,817,990 A | 4/1989 | Krost |
| 4,825,045 A | 4/1989 | Humble ....................... 235/383 |
| 4,833,607 A | 5/1989 | Dethloff |
| 4,834,231 A | 5/1989 | Awane et al. ................. 194/217 |
| 4,839,507 A | 6/1989 | May ............................ 235/381 |
| 4,854,590 A | 8/1989 | Jolliff et al. .............. 273/138 A |
| 4,857,840 A | 8/1989 | Lanchais |
| 4,859,838 A | 8/1989 | Okiharu ....................... 235/383 |
| 4,878,248 A | 10/1989 | Shyu |
| 4,882,473 A | 11/1989 | Bergeron et al. ............. 235/380 |
| 4,882,675 A | 11/1989 | Nichtberger |
| 4,882,688 A | 11/1989 | Kondziolka et al. |
| 4,899,906 A | 2/1990 | Bella |
| 4,906,828 A | 3/1990 | Halpern ....................... 235/379 |
| 4,908,761 A | 3/1990 | Tai .............................. 364/401 |
| 4,910,672 A | 3/1990 | Off et al. ..................... 364/405 |
| 4,915,205 A | 4/1990 | Reid |
| 4,922,435 A | 5/1990 | Cahlander |
| 4,922,522 A | 5/1990 | Scanlon ........................ 379/95 |
| 4,937,853 A | 6/1990 | Brule et al. ................... 379/96 |
| 4,947,028 A | 8/1990 | Gorog |
| 4,963,723 A | 10/1990 | Masada |
| 4,973,952 A | 11/1990 | Malec et al. ............ 340/825.35 |
| 4,982,337 A | 1/1991 | Burr et al. .................... 364/479 |
| 4,982,346 A | 1/1991 | Giruard |
| 4,992,940 A | 2/1991 | Dworkin |
| 4,993,714 A | 2/1991 | Golightly ................. 273/138 A |
| 4,999,763 A | 3/1991 | Ousborne |
| 5,007,518 A | 4/1991 | Crooks et al. |
| 5,010,485 A | 4/1991 | Bigari |
| 5,025,372 A | 6/1991 | Burton |
| 5,029,098 A | 7/1991 | Levasseur |
| 5,034,739 A | 7/1991 | Gruhl |
| 5,036,472 A | 7/1991 | Buckley |
| 5,039,848 A | 8/1991 | Stoken |
| 5,056,019 A | 10/1991 | Schultz et al. ............... 364/405 |
| 5,058,044 A | 10/1991 | Stewart |
| 5,064,999 A | 11/1991 | Okamoto |
| 5,081,685 A | 1/1992 | Jones, III |
| 5,091,713 A | 2/1992 | Horne et al. ................. 340/541 |
| 5,117,354 A | 5/1992 | Long |
| 5,117,407 A | 5/1992 | Vogel .......................... 369/30 |
| 5,119,295 A | 6/1992 | Kapur ......................... 364/412 |
| 5,128,862 A | 7/1992 | Mueller ....................... 364/405 |
| 5,132,914 A | 7/1992 | Cahlander et al. ........... 364/478 |
| 5,136,658 A | 8/1992 | Mori |
| 5,172,328 A | 12/1992 | Cahlander et al. ........... 364/478 |
| 5,173,851 A | 12/1992 | Off et al. ..................... 364/401 |
| 5,176,224 A | 1/1993 | Spector |
| 5,177,342 A | 1/1993 | Adams ........................ 235/379 |
| 5,185,695 A | 2/1993 | Pruchnicki |
| 5,189,607 A | 2/1993 | Shirasaki |
| 5,191,410 A | 3/1993 | McCalley |
| 5,192,854 A | 3/1993 | Counts ........................ 235/375 |
| 5,193,648 A | 3/1993 | Yuter |
| 5,201,010 A | 4/1993 | Deaton et al. ................... 382/7 |
| 5,202,826 A | 4/1993 | McCarthy |
| 5,204,675 A | 4/1993 | Sekine |
| 5,216,595 A | 6/1993 | Protheroe ................... 364/412 |
| 5,223,698 A | 6/1993 | Kapur ......................... 235/375 |
| 5,231,569 A | 7/1993 | Myatt et al. ................. 364/408 |
| 5,239,165 A | 8/1993 | Novak ......................... 235/375 |
| 5,243,515 A | 9/1993 | Lee ............................. 364/401 |
| 5,245,533 A | 9/1993 | Marshall ..................... 364/401 |
| 5,253,165 A | 10/1993 | Leiseca |
| 5,256,863 A | 10/1993 | Ferguson |
| 5,257,179 A | 10/1993 | DeMar ........................ 364/410 |
| 5,262,941 A | 11/1993 | Saladin et al. ............... 364/408 |
| 5,267,452 A | 12/1993 | Zinsmeyer et al. ............. 62/505 |
| 5,269,521 A | 12/1993 | Rossides |
| 5,274,547 A | 12/1993 | Zoffel et al. ................. 364/408 |
| 5,283,731 A | 2/1994 | Lalonde et al. .............. 364/401 |
| 5,287,268 A | 2/1994 | McCarthy .................... 364/405 |
| 5,297,031 A | 3/1994 | Gutterman et al. .......... 364/408 |
| 5,302,811 A | 4/1994 | Fukatsu ....................... 235/381 |
| 5,305,195 A | 4/1994 | Murphy |
| 5,309,355 A | 5/1994 | Lockwood ................... 364/401 |
| 5,315,093 A | 5/1994 | Stewart |
| 5,315,664 A | 5/1994 | Kumagai |
| 5,319,542 A | 6/1994 | King, Jr. |
| 5,325,291 A | 6/1994 | Garrett |
| 5,339,250 A | 8/1994 | Durbin ........................ 364/479 |
| 5,353,218 A | 10/1994 | De Lapa et al. .............. 364/401 |
| 5,353,219 A | 10/1994 | Mueller et al. ............... 364/405 |
| 5,367,452 A | 11/1994 | Gallery et al. ............... 364/401 |

| | | | | | | |
|---|---|---|---|---|---|---|
| 5,368,129 A | 11/1994 | Von Kohorn ............... 186/52 | | 5,666,493 A | 9/1997 | Wojcik |
| 5,371,796 A | 12/1994 | Avarne ...................... 380/23 | | 5,675,662 A | 10/1997 | Deaton |
| 5,380,991 A | 1/1995 | Valencia et al. ............ 235/383 | | 5,685,435 A | 11/1997 | Picioccio et al. ........... 209/677 |
| 5,381,155 A | 1/1995 | Gerber | | 5,687,087 A | 11/1997 | Taggart |
| 5,383,111 A | 1/1995 | Homma | | 5,687,322 A | 11/1997 | Deaton |
| RE34,915 E | 4/1995 | Nichtberger et al. ........ 364/401 | | 5,692,132 A | 11/1997 | Hogan |
| 5,406,035 A * | 4/1995 | Wallisch ................... 177/25.15 | | 5,701,252 A | 12/1997 | Facchin et al. ............. 364/479 |
| 5,408,417 A | 4/1995 | Wilder | | 5,708,782 A | 1/1998 | Larson |
| 5,415,264 A | 5/1995 | Menoud | | 5,710,557 A | 1/1998 | Schette |
| 5,415,319 A | 5/1995 | Risolia | | 5,710,886 A | 1/1998 | Christiansen |
| 5,420,606 A | 5/1995 | Begum et al. ............... 345/156 | | 5,710,887 A | 1/1998 | Cheeliah |
| 5,422,473 A | 6/1995 | Kamata | | 5,713,795 A | 2/1998 | Kohorn |
| 5,425,108 A | 6/1995 | Hwang | | 5,717,866 A | 2/1998 | Naftger |
| 5,434,394 A | 7/1995 | Roach et al. ................ 235/375 | | 5,719,396 A | 2/1998 | Jack |
| 5,440,336 A | 8/1995 | Buhro et al. ................. 348/13 | | 5,724,518 A | 3/1998 | Helbling |
| 5,445,295 A | 8/1995 | Brown | | 5,724,886 A | 3/1998 | Ewald et al. |
| 5,450,938 A | 9/1995 | Rademacher ............... 194/206 | | 5,726,450 A | 3/1998 | Peterson |
| 5,452,344 A | 9/1995 | Larson ...................... 379/107 | | 5,727,163 A | 3/1998 | Bezos |
| 5,459,306 A | 10/1995 | Stein et al. .................. 235/383 | | 5,727,164 A | 3/1998 | Kaye |
| 5,467,892 A | 11/1995 | Schlamp | | 5,732,398 A | 3/1998 | Tagawa ........................ 705/5 |
| 5,481,094 A | 1/1996 | Suda ......................... 235/383 | | 5,732,950 A | 3/1998 | Moody |
| 5,482,139 A | 1/1996 | Rivalto | | 5,734,150 A | 3/1998 | Brown et al. ................ 235/381 |
| 5,495,412 A | 2/1996 | Thiessen | | 5,734,838 A | 3/1998 | Robinson |
| 5,504,475 A | 4/1996 | Houdou et al. ........... 340/825.35 | | 5,737,710 A | 4/1998 | Anthonyson |
| 5,504,675 A | 4/1996 | Cragun et al. ............... 364/401 | | 5,739,512 A | 4/1998 | Tognazzini |
| 5,510,979 A | 4/1996 | Moderi et al. ............... 364/405 | | 5,748,485 A | 5/1998 | Christiansen et al. |
| 5,511,646 A | 4/1996 | Maldanis et al. ............ 194/217 | | 5,754,653 A | 5/1998 | Canfield |
| 5,513,117 A | 4/1996 | Small | | 5,758,328 A | 5/1998 | Giovannoli |
| 5,521,364 A | 5/1996 | Kimura | | 5,761,648 A | 6/1998 | Golden |
| 5,526,257 A | 6/1996 | Lerner | | 5,768,142 A | 6/1998 | Jacobs ................... 364/479.01 |
| 5,536,045 A | 7/1996 | Adams | | 5,769,269 A | 6/1998 | Peters ........................... 221/7 |
| 5,537,314 A | 7/1996 | Kanter | | 5,772,510 A | 6/1998 | Roberts |
| 5,544,040 A | 8/1996 | Gerbaulet | | 5,774,868 A | 6/1998 | Cragun et al. ................. 705/10 |
| 5,544,784 A | 8/1996 | Malaspina | | 5,774,870 A | 6/1998 | Storey |
| 5,546,316 A | 8/1996 | Buckley | | 5,774,874 A | 6/1998 | Veeneman |
| 5,550,746 A | 8/1996 | Jacobs ................... 364/479.01 | | 5,780,133 A | 7/1998 | Engstrom |
| 5,557,721 A | 9/1996 | Fite | | 5,791,991 A | 8/1998 | Small |
| 5,564,546 A | 10/1996 | Molbak et al. | | 5,794,207 A | 8/1998 | Walker et al. |
| 5,568,406 A | 10/1996 | Gerber | | 5,799,284 A | 8/1998 | Bourquin |
| 5,572,653 A | 11/1996 | DeTemple et al. .......... 395/501 | | 5,802,015 A | 9/1998 | Rothchild |
| 5,581,064 A | 12/1996 | Riley et al. ................. 235/383 | | 5,806,044 A | 9/1998 | Powell |
| 5,591,972 A | 1/1997 | Noble | | 5,809,144 A | 9/1998 | Sirbu |
| 5,592,375 A | 1/1997 | Salmon et al. ............. 395/207 | | 5,816,918 A | 10/1998 | Kelley |
| 5,592,376 A | 1/1997 | Hodroff ..................... 395/214 | | 5,819,285 A | 10/1998 | Damico et al. ............. 707/104 |
| 5,592,378 A | 1/1997 | Cameron et al. ............ 395/227 | | 5,819,981 A | 10/1998 | Cox |
| 5,596,501 A | 1/1997 | Comer | | 5,822,216 A | 10/1998 | Satchell, Jr. et al. ..... 364/479.01 |
| 5,602,377 A | 2/1997 | Beller et al. ................ 235/462 | | 5,822,736 A | 10/1998 | Hartman et al. ................ 705/1 |
| 5,604,901 A | 2/1997 | Kelley | | 5,831,862 A | 11/1998 | Hetrick |
| 5,608,643 A | 3/1997 | Wichter et al. ........ 364/479.14 | | 5,832,457 A | 11/1998 | O'Brien |
| 5,611,051 A | 3/1997 | Pirelli | | 5,832,458 A | 11/1998 | Jones |
| 5,611,052 A | 3/1997 | Dykstra et al. ............. 395/238 | | 5,835,896 A | 11/1998 | Fisher |
| 5,612,257 A | 3/1997 | Tsering | | 5,842,178 A | 11/1998 | Giovannoli |
| 5,612,527 A | 3/1997 | Ovadia | | 5,842,212 A | 11/1998 | Ballurio |
| 5,612,868 A | 3/1997 | Off et al. .................... 364/214 | | 5,844,808 A | 12/1998 | Konsmo et al. ........ 364/479.14 |
| 5,613,620 A | 3/1997 | Center et al. ................ 221/133 | | 5,845,259 A | 12/1998 | West |
| 5,615,269 A | 3/1997 | Micali ......................... 380/49 | | 5,845,265 A | 12/1998 | Woolston |
| 5,620,079 A | 4/1997 | Molbak ..................... 194/217 | | 5,845,577 A | 12/1998 | Nelson |
| 5,621,201 A | 4/1997 | Langhans et al. ........... 235/380 | | 5,848,399 A | 12/1998 | Burke |
| 5,621,640 A * | 4/1997 | Burke ......................... 705/14 | | 5,850,446 A | 12/1998 | Berger |
| 5,621,812 A | 4/1997 | Deaton | | 5,855,007 A | 12/1998 | Jovicic |
| 5,630,357 A | 5/1997 | Akyama | | 5,857,175 A | 1/1999 | Day |
| 5,631,724 A | 5/1997 | Sawada | | 5,860,362 A | 1/1999 | Smith ........................ 101/494 |
| 5,632,010 A | 5/1997 | Briechle et al. ................ 345/1 | | 5,864,604 A | 1/1999 | Moen |
| 5,633,839 A | 5/1997 | Alexander et al. ........... 369/30 | | 5,864,822 A | 1/1999 | Baker, III |
| 5,637,859 A | 6/1997 | Menoud | | 5,870,716 A | 2/1999 | Suguyama |
| 5,638,302 A | 6/1997 | Gerber | | 5,870,717 A | 2/1999 | Wiecha |
| 5,638,985 A | 6/1997 | Fitzgerald | | 5,870,719 A | 2/1999 | Maritzen |
| 5,642,484 A | 6/1997 | Harrison, III et al. | | 5,873,069 A | 2/1999 | Reuhl et al. ................. 705/20 |
| 5,649,114 A | 7/1997 | Deaton | | 5,875,110 A | 2/1999 | Jacobs |
| 5,651,075 A | 7/1997 | Frazier | | 5,878,139 A | 3/1999 | Rosen |
| 5,655,007 A | 8/1997 | McAllister | | 5,878,401 A | 3/1999 | Joseph ........................ 705/22 |
| 5,655,953 A | 8/1997 | Mazzamuto et al. | | 5,883,810 A | 3/1999 | Franklin |
| 5,664,115 A | 9/1997 | Fraser | | 5,887,271 A | 3/1999 | Powell |

| | | | | | | |
|---|---|---|---|---|---|---|
| 5,890,136 A | 3/1999 | Kipp | | 6,223,163 B1 | 4/2001 | Van Luchene ............... 705/1 |
| 5,905,246 A | 5/1999 | Fajkowski | | 6,236,971 B1 | 5/2001 | Stefik |
| 5,907,830 A | 5/1999 | Engel | | 6,243,691 B1 | 6/2001 | Fisher |
| 5,918,213 A | 6/1999 | Bernard et al. ............... 705/26 | | 6,247,047 B1 | 6/2001 | Wolff |
| 5,924,078 A | 7/1999 | Naftzger | | 6,249,772 B1 | 6/2001 | Walker |
| 5,924,080 A | 7/1999 | Johnson | | 6,253,069 B1 | 6/2001 | Mankovitz ............... 455/186.1 |
| 5,924,082 A | 7/1999 | Silverman | | 6,260,024 B1 | 7/2001 | Shkedy |
| 5,927,541 A | 7/1999 | Stoken et al. | | 6,266,651 B1 | 7/2001 | Woolston |
| 5,930,145 A | 7/1999 | Yuyama et al. ......... 364/479.01 | | 6,321,984 B1 | 11/2001 | McCall |
| 5,930,771 A | 7/1999 | Stapp | | 6,324,520 B1 | 11/2001 | Walker |
| 5,937,391 A | 8/1999 | Ikeda | | 6,330,490 B1 | 12/2001 | Kim et al. |
| 5,938,717 A | 8/1999 | Dunne | | 6,330,544 B1 | 12/2001 | Walker |
| 5,947,328 A | 9/1999 | Kovens et al. ............... 221/129 | | 6,341,314 B1 | 1/2002 | Doganata et al. ............ 709/229 |
| 5,948,038 A | 9/1999 | Daly | | 6,370,513 B1 | 4/2002 | Kolawa |
| 5,949,688 A | 9/1999 | Montoya et al. | | 6,397,193 B1 | 5/2002 | Walker et al. ............... 705/16 |
| 5,956,695 A | 9/1999 | Carrithers | | 6,405,174 B1 | 6/2002 | Walker |
| 5,959,869 A | 9/1999 | Miller et al. ........... 364/479.01 | | 6,449,658 B1 | 9/2002 | Lafe et al. ................... 709/247 |
| 5,959,945 A | 9/1999 | Kleiman ................. 369/30 | | 6,466,830 B1 | 10/2002 | Manross et al. ................ 700/83 |
| 5,963,452 A | 10/1999 | Etoh | | 6,467,686 B1 | 10/2002 | Guthrie |
| 5,963,939 A | 10/1999 | McCann | | 6,512,570 B2 | 1/2003 | Garfinkle |
| 5,964,660 A | 10/1999 | James | | 6,571,150 B2 | 5/2003 | Arai et al. |
| 5,970,469 A | 10/1999 | Scroggie | | 6,584,448 B1 | 6/2003 | Laor |
| 5,974,399 A | 10/1999 | Giuliani | | 6,587,031 B1 | 7/2003 | Daugherty |
| 5,988,346 A | 11/1999 | Tedesco | | 6,587,835 B1 | 7/2003 | Treyz et al. |
| 5,991,740 A | 11/1999 | Messer | | 6,594,646 B1 | 7/2003 | Okayama et al. |
| 5,995,942 A | 11/1999 | Smith | | 6,615,241 B1 | 9/2003 | Miller et al. ............... 709/206 |
| 5,997,236 A | 12/1999 | Picioccio et al. ............. 414/403 | | 6,636,733 B1 | 10/2003 | Helferich ................... 455/412 |
| 5,997,928 A | 12/1999 | Kaish et al. ................. 426/418 | | 6,644,547 B1 | 11/2003 | White |
| 5,999,914 A | 12/1999 | Blinn | | 6,684,195 B1 | 1/2004 | Deaton |
| 6,012,834 A | 1/2000 | Dueck et al. ............. 364/479.08 | | 6,708,203 B1 | 3/2004 | Makar et al. ............... 709/206 |
| 6,012,890 A | 1/2000 | Celorio Garrido ........... 369/30 | | 6,748,296 B2 | 6/2004 | Banerjee et al. |
| 6,014,634 A | 1/2000 | Scroggie | | 6,874,612 B1 | 4/2005 | Uland |
| 6,016,504 A | 1/2000 | Arnold | | 6,957,125 B1 | 10/2005 | Rifkin |
| 6,017,157 A | 1/2000 | Garfinkle | | 6,970,837 B1 | 11/2005 | Walker |
| 6,021,394 A | 2/2000 | Takahashi ................... 705/10 | | 6,980,887 B2 * | 12/2005 | Varga et al. ............... 700/236 |
| 6,026,370 A | 2/2000 | Jermyn | | 7,058,581 B1 | 6/2006 | Young |
| 6,026,375 A | 2/2000 | Hall | | 7,076,329 B1 * | 7/2006 | Kolls ......................... 700/232 |
| 6,029,139 A | 2/2000 | Cunningham | | 7,084,737 B1 | 8/2006 | Moore et al. |
| 6,029,141 A | 2/2000 | Bezos et al. ................... 705/27 | | 7,216,089 B1 | 5/2007 | Ota et al. |
| 6,035,284 A | 3/2000 | Straub | | 7,233,912 B2 * | 6/2007 | Walker et al. ............... 705/14 |
| 6,038,551 A | 3/2000 | Barlow | | 7,236,946 B2 | 6/2007 | Bates et al. |
| 6,048,267 A | 4/2000 | Winchinsky | | 7,249,050 B1 * | 7/2007 | Walker et al. ............... 705/14 |
| 6,049,777 A | 4/2000 | Sheena et al. ................. 705/10 | | 7,357,314 B2 | 4/2008 | Kusakawa |
| 6,050,387 A | 4/2000 | Iwaki | | 7,546,277 B1 * | 6/2009 | Tedesco et al. ............. 705/400 |
| 6,050,568 A | 4/2000 | Hachquet | | 2002/0072976 A1 | 6/2002 | Virtanen et al. |
| 6,052,667 A | 4/2000 | Walker | | 2002/0077724 A1 | 6/2002 | Paulucci et al. ............. 700/231 |
| 6,055,513 A | 4/2000 | Katz | | 2002/0099604 A1 | 7/2002 | Lewis et al. ................... 705/14 |
| 6,056,194 A | 5/2000 | Kolls ........................... 235/381 | | 2002/0107610 A1 | 8/2002 | Kaehler et al. |
| 6,058,373 A | 5/2000 | Blinn | | 2002/0111157 A1 | 8/2002 | Stieber et al. |
| 6,058,375 A | 5/2000 | Park | | 2002/0116286 A1 * | 8/2002 | Walker et al. ............... 705/26 |
| 6,059,142 A | 5/2000 | Wittern, Jr. et al. ............. 221/1 | | 2002/0120496 A1 | 8/2002 | Scroggie |
| 6,061,660 A | 5/2000 | Eggleston | | 2003/0033292 A1 | 2/2003 | Meisel |
| 6,067,570 A | 5/2000 | Kreynin et al. ............... 709/27 | | 2003/0088465 A1 | 5/2003 | Monteverde |
| 6,073,840 A | 6/2000 | Marion | | 2003/0107610 A1 | 6/2003 | Lim |
| 6,075,214 A | 6/2000 | Sato et al. | | 2003/0139969 A1 | 7/2003 | Scroggie |
| 6,076,070 A | 6/2000 | Stack | | 2004/0162633 A1 | 8/2004 | Kraft et al. |
| 6,078,866 A | 6/2000 | Buck | | 2004/0243478 A1 | 12/2004 | Walker |
| 6,085,168 A | 7/2000 | Mori et al. | | 2005/0060062 A1 | 3/2005 | Walker et al. |
| 6,086,380 A | 7/2000 | Chu et al. ................... 434/307 | | 2005/1265806 | 7/2005 | Roatis et al. |
| 6,098,879 A | 8/2000 | Terranova ................... 235/384 | | 2008/0051934 A1 | 2/2008 | Tedesco et al. |
| 6,101,485 A | 8/2000 | Fortenberry | | | | |
| 6,115,649 A | 9/2000 | Sakata ......................... 700/241 | | FOREIGN PATENT DOCUMENTS | | |
| 6,119,099 A * | 9/2000 | Walker et al. ................. 705/16 | | CA | 2217739 | 4/1996 |
| 6,131,085 A | 10/2000 | Rossides | | DE | 4037689 | 6/1992 |
| 6,134,534 A | 10/2000 | Walker | | EP | 0 085 546 A2 | 8/1983 |
| 6,138,105 A * | 10/2000 | Walker et al. ................. 705/10 | | EP | 0323383 | 7/1989 |
| 6,167,327 A | 12/2000 | Broker et al. | | EP | 512413 | 11/1992 |
| 6,167,382 A | 12/2000 | Sparks | | EP | 0512509 A2 | 11/1992 |
| 6,170,631 B1 | 1/2001 | Miyazaki | | EP | 0526118 | 2/1993 |
| 6,192,349 B1 | 2/2001 | Husemann | | EP | 0619662 A | 10/1994 |
| 6,193,154 B1 | 2/2001 | Phillips | | EP | 0697793 A | 2/1996 |
| 6,193,155 B1 | 2/2001 | Walker | | EP | 0779587 A2 | 9/1996 |
| 6,205,435 B1 | 3/2001 | Biffar | | | | |

| | | |
|---|---|---|
| EP | 0779587 A3 | 9/1996 |
| EP | 0744856 A | 11/1996 |
| EP | 0 817 138 A1 | 1/1998 |
| EP | 0856812 A2 | 5/1998 |
| EP | 0 862 150 A2 | 9/1998 |
| EP | 0862150 A2 | 9/1998 |
| GB | 2109305 A | 6/1983 |
| GB | 2265032 A | 9/1993 |
| GB | 2 317 257 A | 3/1998 |
| JP | 58132886 A | 8/1983 |
| JP | 2001093 A | 1/1990 |
| JP | 2208798 A | 8/1990 |
| JP | 4235700 A | 8/1992 |
| JP | 5242363 A | 9/1993 |
| JP | 6035946 | 2/1994 |
| JP | 7065218 A | 3/1995 |
| JP | 7078274 | 3/1995 |
| JP | 07098779 A | 4/1995 |
| JP | 7139380 | 6/1995 |
| JP | 7162556 | 6/1995 |
| JP | 07249176 | 9/1995 |
| JP | 7272012 | 10/1995 |
| JP | 8030848 A | 2/1996 |
| JP | 08137951 | 5/1996 |
| JP | 8-147545 | 6/1996 |
| JP | 8221484 | 8/1996 |
| JP | 8221645 A | 8/1996 |
| JP | 8329323 A | 12/1996 |
| JP | 09016836 A | 1/1997 |
| JP | 9062908 A | 3/1997 |
| JP | 9097288 | 4/1997 |
| JP | 9190478 A | 7/1997 |
| JP | H9-198554 | 7/1997 |
| JP | 10187820 | 7/1998 |
| JP | 10214284 | 8/1998 |
| JP | 10240830 | 9/1998 |
| JP | 10269049 | 10/1998 |
| JP | 10289372 | 10/1998 |
| JP | 10289372 A | 10/1998 |
| JP | 11088560 | 3/1999 |
| JP | 2003150769 | 5/2003 |
| KR | 9503826 B | 4/1995 |
| WO | WO 90/16033 A | 12/1990 |
| WO | WO 94/09440 | 4/1994 |
| WO | WO 95-27242 | 10/1995 |
| WO | WO 96/32701 | 10/1996 |
| WO | WO 97/16797 | 5/1997 |
| WO | WO 97/08638 A1 | 6/1997 |
| WO | WO 97/20279 | 6/1997 |
| WO | WO 97/21200 | 6/1997 |
| WO | WO 97/23838 | 7/1997 |
| WO | WO 97/24701 | 7/1997 |
| WO | WO 97/25684 | 7/1997 |
| WO | WO 97/28510 | 8/1997 |
| WO | WO 97/35441 | 9/1997 |
| WO | WO 97/44749 | 11/1997 |
| WO | WO 97/50064 | 12/1997 |
| WO | WO 98/06050 | 2/1998 |
| WO | WO 98/15907 | 4/1998 |
| WO | WO 98/19260 | 5/1998 |
| WO | WO 98/21713 | 5/1998 |
| WO | WO 98/28699 | 7/1998 |
| WO | WO 98/48388 | 10/1998 |
| WO | WO 98/48563 | 10/1998 |
| WO | WO 98/49658 | 11/1998 |
| WO | WO 98/58355 | 12/1998 |
| WO | WO 99/04326 | 1/1999 |
| WO | WO 99/07121 | 2/1999 |
| WO | WO 99/09508 | 2/1999 |
| WO | WO 99/12117 A1 | 3/1999 |
| WO | WO 99/38125 A1 | 7/1999 |

OTHER PUBLICATIONS

Samuelson, Paul A., "Economics 8$^{th}$ Edition", McGraw-Hill Book Company, Copyright 1948, 1951.
"Cape Town", Reuters Ltd, Nov. 8, 1979, PM Cycle.
"Save the mark", Financial Times (London), Feb. 1, 1983, Section I, Men & Matters at p. 12.
Cook, Louise, "ConsumerWatch: Clip, Snip, Save", The Associated Press, Mar. 12, 1984, Business News Section.
Greene, Jan, "Farm bills please assns; National Grocers Association", Supermarket News, vol. 35, Dec. 23, 1985 at p. 6.
"POS spectrum: a lottery looks to POS for growth", UMI, Inc., POS News, Jan. 1989, vol. 5, No. 7, p. 8, ISSN: 0896-6230, CODEN: BHORAD.
Kuttner, Robert, "Computers May Turn The World Into One Big Commodities Pit", Business Week, Sep. 11, 1989, Section: Economic Viewpoint, No. 3123 at p. 17.
Schrage, Michael, "An Experiment In Economic Theory; Labs Testing Real Markets", The Record, Nov. 26, 1989, Section: Business at p. B01.
"Let's Play the Cash Register Receipts Lottery", The New York Times, Dec. 25, 1990, Section 1, p. 30, col. 4, Editorial Desk.
Nakayama, Atsushi, "Coca-Cola machines to be 'smarter'; the Teleterminal control system is aimed at keeping customers, and machines, satisfied", The Japan Economic Journal, Feb. 23, 1991, Section: Industry: Chemicals at p. 22.
Del Rosso, Laura, "Marketel says it plans to launch air fare 'auction' in June; Marketel International Inc.", Travel Weekly, Apr. 29, 1991, Section: vol. 50, No. 34, p. 1, ISSN: 0041-2082.
"Philips offers customers financing through Citicorp; Philips Medical Systems North America, Citicorp North America Inc." Health Industry Today, Jun. 1991, Section: vol. 54, No. 6, p. 4, ISSN: 0745-4678.
Pelline, Jeff, "Travelers Bidding On Airline Tickets SF firm offers chance for cut-rate fares" The San Francisco Chronicle, Aug. 19, 1991, Sections: News at p. A4.
Del Rosso, Laura, "Ticket-bidding firm closes its doors; Marketel International; Brief Article", Travel Weekly, Mar. 12, 1992, Section: vol. 51, No. 21, p. 1, ISSN: 0041-2082.
Fink, Ronald, "Data processing: Pepsico.", Financial World, Sep. 29, 1992, vol. 161, No. 19, p. 52(1), ISSN: 0015-2064.
Gilbert, Allan Z., "Operators can gain with creative merchandising", Automatic Merchandiser, Oct. 1992, p. 80, ISSN: 1061-1797.
"Coupons get serious; supermarkets use barcodes to prevent misredemptions", Chain Store Age Executive with Shopping Center Age, Oct. 1992, Section: vol. 68, No. 10, p. 68, ISSN: 0193-1199.
"Winn-Dixie/The Salvation Army Report Contributions For War Against Hunger", PR Newwsire, Jun. 10, 1993, Section: Financial News.
Gelernter, David, "The Cyber-Road Not Taken; Lost on the Info-Highway? Here's Some Stuff that Could Really Change Your Life", The Washington Post, Apr. 3, 1994, Section: Outlook, p. C1.
Jones, Jeanne, "Data Readers Streamline Management; Scanner Technology Aids Retailers As Well As Plants, Wholesalers", The Houston Post, Jun. 26, 1994, Section: Business at p. D1.
Fiorini, Phillip, "'No Place For Penny?'/Smallest coin doesn't make cents to some", USA Today, Jul. 29, 1994, Section: News at p. 1A.
Smith, Alison, "Survey of UK Consumer Credit and Asset Finance", Financial Times, Nov. 3, 1994, Section: p. VI.
Website: "FAQ: CSH Coke Machine Information", Institute of Information & Computing Sciences, (http //www cs uu nl/wais/html/na-dir/csh-coke-machine-info html), Feb. 4, 1995.
Andreoli, Tom et al., "Cash Machines Offer A Whole Lotto Money For Withdrawl; An Unfortunate Juxtaposition; Block That Metaphor!; Something Street Talk; Fishy In Springfield; State Street Sears?; Champion As Underdog; A 'Whole Language' Graduate", Crain'Chicago Business, Jun. 19, 1995, Section: News at p. 8.
"Spain: BBV launches new card", Cards International, Jun. 22, 1995 at p. 5.
Knippenberg, Jim, "Will local radio empires strike back?", The Cincinnati Enquirer, Jul. 23, 1995, Section: Tempo at p. F01.

Brochure, "Cyber Bid", Net Fun Ltd., Copyright 1996.

Maras, Elliot, "Software opens doors to scientific machine menuing", Automatic Merchandiser, Feb. 1996, Section: p. 36, ISSN: 0002-7545.

Bonnici, Joseph et al., "Consumer issues in coupon usage: An exploratory analysis", Journal of Applied Business Research, Winter 1996/1997, Section: vol. 13, No. 1, pp. 31-40, ISSN: 0892-7626, CODEN: JPBEBK.

Hadley, Kimberly, "Pastors praying anti-arson effort will burn bias", The Nashville Banner, Jul. 26, 1996, Section: News at p. A13.

Gapper, John, "NatWest reports rise in bad debt", Financial Times, Jul. 31, 1996, Section: News: UK; at p. 09.

Gilbert, Allan Z., "A call to action for wireless data communication", Automatic Merchandiser, Aug. 1996, Financial Management section.

"Lynx Technology: Lynx to provide business leasing programme through Schroder Leasing", M2 Presswire, Aug. 9, 1996.

Taylor, Paul, "Towards a dream market", Financial Times (London), Sep. 4, 1996, Section: Survey—FT IT; at p. 03.

"Public Internet Kiosks, Inc. Receives First Order For Its 'Internet Station'—The Vending Machine of the Future", PR Newswire, Sep. 16, 1996.

Singletary, Michelle, "Electronic World, Unchecked Problem? U.S. Move to Paperless Payments Raises Worries About Those Who Don't Use Banks", The Washington Post, Mar. 4, 1997, Section: Financial at p. C01.

Hirschfeld, David, "Increasing Profits Through Automation", Independent Vendors Association Quarterly, Apr./May/Jun. 1997.

French, Simone A. et al., "A Pricing Strategy to Promote Low-Fat Snack Choices through Vending Machines", American Journal of Public Health, May 1997, vol. 87, No. 5.

"Avco Financial Services", National Home Furnishing Association, (http //www homefurnish comNHFA/avco htm), download date: May 23, 1997.

Website, "Catalina Marketing Corporation", (http //catalinamktg com/prodcdir htm), download date: May 29, 1997.

Riordan, Teresa, "Patents; A novel approach to making a better spermicide harks back to some old-fashioned methods", The New York Times, Jun. 9, 1997, Section D, p. 2, col. 1, Business/Financial Desk.

Nairn, Geoff, "The key to your identity: Falling costs will allow fingerprint verification to be widely used, reports Geoff Nairn", Financial Times (London), Jul. 15, 1997, Section: Technology; at p. 12.

"The United Computer Exchange, How It All Works", (http //www uce com/howitworks html), download date: Jul. 23, 1997.

"Classified 2000: The Internet Classifieds", Classifieds2000, Inc., (http //www classifieds2000 com/cgi-cls/Display exe?C2K+aboutus), download date: Aug. 6, 1997.

"General trading information and terms provided by tradingfloor. com", (http //www tradingfloor com/info htm), download date: Aug. 14, 1997.

"NASDAQ", Information Sheet, (http //home axford com/corfin/corf11 htm), download date: Aug. 15, 1997.

Choate, Robert, "Why technology brings a great future for vending", Automatic Merchandiser, Oct. 1, 1997, Section: No. 10, vol. 39, p. 16, 1061-1797.

Brochure, "For the Crew & the Customer: The Best Drive-Thru & Grill Service", Olivetti North America, Winter 1998.

"VendMaster: Windows and Vending Software, Reports", (http //www vendmaster com/reports_main html), download date: Feb. 6, 1998.

King, Brad, "Music competition; With MP3s under attack and major labels designing new standards, three Bay Area firms try to corner the market on online music", SF Weekly, Apr. 28, 1999, Section: Music.

"Mitsubishi's New ChipConnect Software Development Kits and Reference Designs Enable Web-Controlled Embedded Systems Using em Ware's EMIT Architecture", Business Wire, Jul. 19, 1999.

Heid, Jim, "The Hits Just Keep on Coming as Downloadable Music Rocks the Web", PC World, Aug. 1999.

"Asia's first EAT on Ice opens", Travel Trade Gazette Asia, Oct. 1, 1999, Section: Business.

Skinner, Greg, "Digitalia: ratings and ravings", Kidscreen, Oct. 1, 1999, Section: New Media, The Cyber Space, p. 40.

Hays, Contance, "Coke Tests Unit That Can Hike Prices in Hot Weater", The New York Times, Oct. 28, 1999.

"Coke's Automatic Price Gouging", The San Francisco Chronicle, Oct. 29, 1999, Section: Editorial, p. A22.

"Briefing—Asia Information Technology", Asia Pulse, Feb. 18, 2000, Section: General News.

"Vending machines go high-tech", Journal of Business, Mar. 9, 2000, Section: vol. 15, No. 6, p. A1, ISSN: 10756124.

"USA Technologies Expands Distribution of TransAct Credit Card Device & Payment System", Business Wire, Apr. 27, 2000.

"USA Technologies Targets e-Port At Interactive Media Market; Innovative Internet Appliance Featured at @d:tech Internet Conference; Adtech2000", Business Wire, May 9, 2000.

"Coinstar Launches Turn-Key Philanthropic Initiative for Supermarket Partners; Retailers Can Now Tailor Coins That Count Programs to Support Local Non-Profits", Business Wire, May 10, 2000.

Turnis, Jane, "Charity Begins with Pepsi Recycling Can in Colorado Springs, Colo.", The Gazette (Colorado Springs), Dec. 9, 1998.

PCT International Search Report for International Application No. PCT/US98/21216, filed Oct. 8, 1998, in the name of Tedesco et al., and entitled "Method And Apparatus For Dynamically Managing Vending Machine Inventory Prices", mailed May 4, 1999.

Ringle, Ken, "The Sell Phone: Dial 'M' for Munchies", The Washington Post, Jun. 19, 1999, Section: Style, p. C01.

Walker, Leslie, "A Sales Pitch With That Soda?" The Washington Post, Jun. 24, 1999, Section: Financial, p. E01.

"'Digital kiosks' at train stations to offer news, music, games", Deutsche Presse-Agentur, Jul. 15, 1999, Section: International News.

"MP3.com and Djangos.com Partner to Re-Invent Retail Music Industry; Alliance Provides Consumers with Instant Online Access to Purchased CDs", PR Newswire, Jun. 14, 2000, Section: Financial News.

"Are in-store kiosks the future?", Music Week, Jun. 24, 2000, Section: p. 22.

"USA Technologies Files 15 More Patents to Protect e-Port Internet Appliance Device", Business Wire, Jun. 26, 2000.

"Marcus Theatres Corporation First to Offer eKiosk High-Speed Internet Access to Movie Goers", PR Newswire, Aug. 21, 2000.

"E-tailer Notes: The Outernet, planned entertainment chain . . . ", Audio Week, Aug. 28, 2000.

"Re Directorate", Regulatory News Service, Sep. 1, 2000.

Website: "USEDvending.com—New Personal Care Products Vending Machines", (http //www usedvending com/newpersonalcare htm), download date: Oct. 24, 2000.

Website: "e-vending.com homepage—Vending, Joke & Vending Machines", (http www e-vending com/jokes htm), download date: Oct. 24, 2000.

Brochure: "The VC3800 Combination Vendo", Effective Nov. 13, 2002, Seaga Manufacturing, Inc., (www seagamfg com).

Jagsi, Ajay et al., "Cocoa-Cola & The 'Smart' Vending Machines", (http //mba Vanderbilt edu/mike sher/courses/netecon/lecture/grp1 ppt), download date: Jul. 17, 2003.

Berk, Christina Cheddar, "Many Vending Machines Opt Out of High-Tech Fixes", The Wall Street Journal Online, (http //online wsj com/article_email/), download date: Nov. 5, 2003.

Sereno, Jennifer, "Vending machines get fancier", Wisconsin State Journal, Mar. 27, 2004, Section: Business.

Website: "E-vending.com—Snack Vending Machines, Online Vending Machine Catalog", (http www e-vending com/combo_snack_pop_vending_machines_photos htm), download date: Jul. 1, 2004.

"VendMaster: Windows and Vending Software, News", Independent Vendors Association Quarterly, (http //www vendmaster com/news_main html), Apr./May/Jun. 1997.

Website: VendingMi$er, (http // www optimumenergy com/products/miser html), download date: Aug. 12, 1998.

PCT International Search Report for PCT Application No. PCT/US98/21216, entitled "Method And Apparatus For Dynamically Managing Vending Machine Inventory Prices" filed Oct. 8, 1998 in the name of Walker et al, mailing date: May 4, 1999.

Nakayama, Atsushi, "Coca-Cola machines to be 'smarter'; the Teleterminal control system is aimed at keeping customers, and machines, satisfied", The Japan Economic Journal, Feb. 23, 1991, Section: Industry: Chemicals, 2pp.

Allan Z. Gilbert, "Financial Management: A call to action for wireless data communication", Automatic Merchandiser, Aug. 1996, pp. 62-64, 3pp.

"Coupon acceptor; Coinco", Beverage Industry, Jul. 1998, No. 7, vol. 89, p. 38, 2pp.

"Coinco offers BA-30 dollar bill acceptor", Automatic Merchandiser, Aug. 1998, p. 33, 2pp.

Rich Karlgaard, "Keep your eyes on the prize", Forbes, Sep. 21, 1998, p. 43, 3pp.

"Coupon acceptor", Beverage Industry, Dec. 1998, No. 12, vol. 89, p. 34, 1pp.

Tim Davis, "Vending suppliers scurry to meet Coke-mandated vendor communication", Automatic Merchandiser, Aug. 1996, pp. 62-64, 2pp.

Kohda, Youji, Endo, Susumu, "Ubiquitous Advertising on the WWW: Merging Advertisement on the Browser", Computer Networks and SDN Systems 28, May 1, 1996 at pp. 1493-1499, 7pp.

"Coupons get serious; supermarkets use barcodes to prevent misredemptions", Chain Store Age Executive with Shopping Center Age, Oct. 1992, Section: vol. 68, No. 10, p. 68, ISSN: 0193-11992, 2pp.

"Winn-Dixie/The Salvation Army Report Contributions For War Against Hunger", PR Newswire, Jun. 10, 1993, Section: Financial News, 1pp.

Gelernter, David, "The Cyber-Road Not Taken; Lost on the Info-Highway? Here's Some Stuff that Could Really Change Your Life", The Washington Post, Apr. 3, 1994, Section: Outlook, p. C1, 5pp.

Jones, Jeanne, "Data Readers Streamline Management; Scanner Technology Aids Retailers As Well As Plants, Wholesalers", The Houston Post, Jun. 26, 1994, Section: Business at p. D1, 2pp.

Fiorini, Phillip, "'No Place For Penny?'/Smallest coin doesn't make cents to some", USA Today, Jul. 29, 1994, Section: News at p. 1A, 3pp.

Smith, Alison, "Survey of UK Consumer Credit and Asset Finance", Financial Times, Nov. 3, 1994, Section: p. VI, 3pp.

Website: "FAQ: CSH Coke Machine Information", Institute of Information & Computing Sciences, (http //www cs uu nl/wais/html/nadir/csh-coke-machine-info html), Feb. 4, 1995, 6pp.

Andreoli, Tom et al., "Cash Machines Offer A Whole Lotta Money For Withdrawl; An Unfortunate Juxtaposition; Block That Metaphor!; Something Street Talk; Fishy In Springfiled; State Street Sears?; Champion As Underdog; A 'Whole Language' Graduate", Crain's Chicago Business, Jun. 19, 1995, Section: News at p. 8, 2pp.

"Spain: BBV launches new card", Cards International, Jun. 22, 1995 at p. 5, 2pp.

Knippenberg, Jim, "Will local radio empires strike back?", The Cincinnati Enquirer, Jul. 23, 1995, Section: Tempo at p. F01, 1pp.

Brochure, "Cyber Bid", Net Fun Ltd., Copyright 1996, 9pp.

Maras, Elliot, "Software opens doors to scientific machine menuing", Automatic Merchandiser, Feb. 1996, Section: p. 36, ISSN: 0002-7545, 5pp.

Bonnici, Joseph et al., "Consumer issues in coupon usage: An exploratory analysis", Journal of Applied Business Research, Winter 1996/1997, Section: vol. 13, No. 1, pp. 31-40, ISSN: 0892-7626, CODEN: JPBEBK, 13pp.

Hadley, Kimberly, "Pastors praying anti-arson effort will burn bias", The Nashville Banner, Jul. 26, 1996, Section: News at p. A13, 1pp.

Gapper, John, "NatWest reports rise in bad debt", Financial Times, Jul. 31, 1996, Section: News: UK; at p. 09, 1pp.

"Lynx Technology: Lynx to provide business leasing programme through Schroder Leasing", M2 Presswire, Aug. 9, 1996, 2pp.

Taylor, Paul, "Towards a dream market", Financial Times (London), Sep. 4, 1996, Section: Survey—FT IT; at p. 03, 2pp.

"Public Internet Kiosks, Inc. Receives First Order For Its 'Internet Station'—The Vending Machine of the Future", PR Newswire, Sep. 16, 1996, 2pp.

Singletary, Michelle, "Electronic World, Unchecked Problem? U.S. Move to Paperless Payments Raises Worries About Those Who Don't Use Banks", The Washington Post, Mar. 4, 1997, Section: Financial at p. C01, 4pp.

Hirschfeld, David, "Increasing Profits Through Automation", Independent Vendors Association Quarterly, Apr./May/Jun. 1997, 10pp.

French, Simone A. et al., "A Pricing Strategy to Promote Low-Fat Snack Choices through Vending Machines", American Journal of Public Health, May 1997, vol. 87, No. 5, 3pp.

"Avco Financial Services", National Home Furnishing Association, (http //www homefurnish comNHFA/avco htm), download date: May 23, 1997, 2pp.

Website, "Catalina Marketing Corporation", (http //catalinamktg com/prodcdir htm), download date: May 29, 1997, 16pp.

Riordan, Teresa, "Patents; A novel approach to making a better spermicide harks back to some old-fashioned methods", The New York Times, Jun. 9, 1997, Section D, p. 2, col. 1, Business/Financial Desk, 3pp.

Nairn, Geoff, "The key to your identity: Falling costs will allow fingerprint verification to be widely used, reports Geoff Nairn", Financial Times (London), Jul. 15, 1997, Section: Technology; at p. 12, 3pp.

"The United Computer Exchange, How It All Works", (http //www uce com/howitworks html), download date: Jul. 23, 1997, 6pp.

"Classified 2000: The Internet Classifieds", Classifieds2000, Inc., (http //www classifieds2000 com/cgi-cls/Display exe?C2K+aboutus), download date: Aug. 6, 1997, 3pp.

"General trading information and terms provided by tradingfloor.com", (http //www tradingfloor com/info htm), download date: Aug. 14, 1997, 11pp.

"NASDAQ", Information Sheet, (http //home axford com/corfin/corf11 htm), download date: Aug. 15, 1997, 3pp.

Choate, Robert, "Why technology brings a great future for vending", Automatic Merchandiser, Oct. 1, 1997, Section: No. 10, vol. 39, p 16, 1061-1797, 2pp.

Brochure, "For the Crew & the Customer: The Best Drive-Thru & Grill Service", Olivetti North America, Winter 1998, 2pp.

"SaveSmart—How SaveSmart Works for Consumers"; (http://savesmart.com/consumer/consumer-howitworks.html), Copyright 1998, 7pp.

"Welcome to Planet U, providers of U-pons—Internet Coupons—Internet Coupons"; (http://www.webcertificate.com:443/webcert/faq-detail.asp), Copyright 1998, 8pp.

Webcertificate, the perfect gift-giving solution . . . It's quick! It's Easy! It's Secure!; (http://www.webcertificates.com:443/webcert/faq-detail.asp), Copyright 1998, 14pp.

Shop the Marketplace, 1-800-flowers.com; (http://www.1800flowers.com/flowers/welcome.asp), Copyright 1998, 4pp.

"The Leader in Internet Shopping Systems for Supermarkets and Drug Stores", groceries online. copyright 1996 Groceries Online, Inc. (http://www.groceries-online.com/), Copyright 1996, 4pp.

"Brother Industries is pushing ahead with its new PC software . . . ", IDC Japan Report, Aug. 30, 1991, Section: vol. 17, p. 53, 1pg.

Maras, Elliot, "1995: downsizing adds costs; new strategies sought", Automatic Merchandiser, Aug. 1996, pp. 20-22, 24, 26, 28, 30, 32, 34, 36, 38, 40 and 44, 13pp.

Naik, Gautam, "In Digital Dorm, Click on Return for Soda", The Wall Street Journal, Jan. 23, 1997, Section: Online, p. B1, 3pp.

Shea, Barbara, "Read Fine Print When Comparing Car Rentals", Feb. 9, 1997, St. Louis Post-Dispatch, Section: Travel & Leisure, p. 04T, 2pp.

Website: "CSH Drink Machine(s)", (http //www csh rit edu/proj/drink html), download date: Jan. 29, 1998, 2pp.

Desjardins, Doug, "Hollywood's Investment in Online Video Retailer Gets Mixed Reviews", Video Store, Aug. 9, 1998, Section: p. 1, ISSN: 0195-1750, 3pp.

Stigler, George J., "The Theory of Price", The Macmillan Company, Copyright 1952, pp. 82-94, 214-221 (14pp.).

Bowman, Jr., Ward S., "Tying Arrangements and the Leverage Problem", The Yale Law Journal, Nov. 1957, vol. 67, No. 1, pp. 19-36 (10pp.).

Stigler, George J., "The Theory of Price", The Macmillan Company, Third Edition, Copyright 1966, pp. 82-94, 208-215 (8pp).

Narasimhan, Chakravarthi, "A Price Discrimination Theory of Coupons", Marketing Science, Spring 1984, vol. 3, No. 2, pp. 128-147 (20pp.).

Judith Evans, "Who was that masked Cybershopper?; MasterCard-Visa Agreement on Credit Card security may make ON-LINE commerce fly", The Washington Post, View Related Topics; Feb. 2, 1996, Final Edition; Section: Financial; p. F01, 2pp.

"First Virtual Holdings Releases Beta Software for Secure Transactions on Microsoft Merchant Server", PR Newswire, Mar. 31, 1997; Section: Financial News, 2pp.

"Six vendors sign on for early electronic commerce venture", Phillips Business Informaion, Inc. Voice Technology News, Dec. 13, 1994; No. 25, vol. 6; ISSN: 1045-1498, 2pp.

"The easy, pain-free way to buy or lease your next car", What is autoseek; (http://www.autoseek.com/#what) download date: May 28, 1997, 4pp.

Nora Lockwood Tooher, "Macy's new gift card gets trial run in Warwick", The Providence Journal-Bulletin; Oct. 1, 1998; Section: Business; p. 1E, 2pp.

Denise Caruso, "Digital Commerce; The boom in on-line shopping adds a twist to the old quandary of how to tax interstate purchases", The New York Times, View Related Topics, Dec. 28, 1998; Late Edition—Final; Section: C; p. 3; col. 5; Business/Financial Desk, 3pp.

Godwin, Nadine, "New software was key lure in $17 million agency buyout.", Travel Weekly, Nov. 26, 1984, Section: vol. 43, p. 45, ISSN: 0041-2082, 4pp.

"Woodside Management Systems Inc. today announced . . . ", PR Newswire, Apr. 1, 1986, 2pp.

Tellis, Gerard J., "Beyond the Many Faces of Price: an Integration of Pricing Strategies", Journal of Marketing, Oct. 1986, vol. 50, pp. 146-160, 15pp.

Godwin, Nadine, "Agency, funded by 3M, set to market software; Travelmation touts trip planner to corporations; designed to eliminate client-agent telephone calls; Business Travel Update", Travel Weekly, Oct. 13, 1986, Section: vol. 45, p. 45, ISSN: 0041-2082, 4pp.

Godwin, Nadine, "Agency dares to launch its own air res system; Travelmation system provides greater versatility, Automation Report", Travel Weekly, Oct. 23, 1986, 5pp.

"Thomas Cook Travel U.S.A. has announced. . .", PR Newswire, Jan. 12, 1987, 2pp.

Bawa, Kapil et al., "The Coupon-Prone Consumer: some Findings Based on Purchase Behavior Across Product Classes", Journal of Marketing, Oct. 1987, vol. 51, pp. 99-110, 12pp.

Nomani Sr., A., "Air Crashes Stir Signs of Anxiety in Travelers", Wall Street Journal, Aug. 1, 1989, Section 2, p. 1, col. 1, 2pp.

Carlsen, Clifford, "From Airline Tickets to Human Organs, the Electronic Markets are Booming", San Francisco Business Times, Aug. 14, 1989, Section: vol. 3, No. 50, Section 1, p. 17, 2pp.

Golden, Fran, "AAL's Riga doubts Marketel's appeal to retailers", Travel Weekly, Nov. 13, 1989, Section: vol. 48, No. 91, p. 4, ISSN: 0041-2082, 2pp.

"Letters to BusinessExtra", The San Francisco Chronicle, Dec. 26, 1989, Section: Business, C7, 3pp.

Wallace, David, "Company Planning to Let Flyers bid on Airfares", Philadelphia Business Journal, Mar. 26, 1990, Section: vol. 9, No. 3, Section 1, p. 15, 3pp.

Greenberg, Peter S., "The Savvy Traveler: Lower Air Fares For Consumers Not in the Cards . . . " Los Angeles Times, Jul. 8, 1990, Section: Travel, Part L, p. 2, col. 1, Travel Peak, 2pp.

Carey, Christopher, "Firm Offers Auction for Airline Tickets", St. Louis Post-Dispatch, Aug. 7, 1991, Section: Business, p. 1B, 2pp.

Upton, Kim, "News and Briefs: French Say Monoliths Off-Limits to Visitors", Los Angeles Times, Aug. 25, 1991, Section: Travel, Part L, p. 4, col. 1, Travel Desk, 2pp.

"Buy Low, Fly High", USA Today, Nov. 14, 1991, Section: Bonus, p. 15, 2pp.

Feldman, Joan M., "To rein in those CRSs; computer reservation systems" Air Transport World, Dec. 1991, Section: vol. 28, No. 12, p. 89, ISSN: 0002-2543, 5pp.

"Traveler's Notes; Bookit Report", Consumers Reports Travel Letter, Dec. 1991, Section: vol. 7, No. 12, p. 143, 1pg.

"CRTL's Blue Ribbon Deals for 1992", Consumer Reports Travel Letter, Jan. 1992, Section: vol. 8, No. 1, pp. 3-5, 2pp.

"Newsletters", The Atlanta Journal and Constitution, Mar. 1, 1992, Section: Travel: Section K, p. 13, 1pg.

Del Rosso, Laura, "Ticket-bidding firm closes its doors, Marketel International", Travel Weekly, Mar. 12, 1992, Section: vol. 51, No. 21, p. 1, ISSN: 0041-2082, 2pp.

Hainer, Cathy et al., "Where vacationing kids get good care", USA Today, Apr. 1, 1992, Section: Life, p. 4D, 2pp.

Weatherford, Lawrence R. and Bodily, Samuel E., "A Taxonomy and Research Overview of Perishable-Asset Revenue Management: Yield Management, Overbooking, and Pricing", Operations Research, Sep.-Oct. 1992, vol. 40, No. 5, pp. 831-844, 14pp.

Spencer, Milton H. and Amos, Jr., Orley M., "Contemporary Economics, Eight Edition", Worth Publishers, Copyright 1993, 5pp.

Rajendran, K.N. and Tellis, Gerard J., "Contextual and Temporal Components of Reference Price", Journal of Marketing, Jan. 1994, pp. 22-34 (13pp.).

Feldman, Joan M., "Reclaiming control; new software to close gap between projected and actual revenues", Aug. 1995, Section: vol. 32, No. 8, p. 35, ISSN: 0002-2543, 5pp.

*United Sates* v. *Eastman Kodak Co.*, United States Court of Appeals for the Second Circuit, decided Aug. 4, 1995, 16pp.

Bronnenberg, Bart J., "Limited Choice Sets, Local Price Response, and Implied Measures of Price Competition", Journal of Marketing Research, Spring 1996, Section: vol. XXXII, p. 163, 20pp.

Prentice, Michael, "Searching for the lowest fare: Getting the lowest fare takes work, but it's worth the effort", The Ottawa Citizen, Oct. 9, 1996, Section: Citylife; Consuming Passion, p. C3, 3pp.

"Auctioning unsold airline tickets", Insight (USA), download date: Oct. 29, 1996, 1pg.

"Web Ventures presents Bookit!", (http www webventures com/bookit), Copyright 1996, 1pg.

"Salomon Brother's Maldutis Says Internet is Aviation's 'Third Revolution;' Will Earn Billions", World Airline News, Mar. 21, 1997, Section: vol. 7, No. 12, 2pp.

Feldman, Joan M., "Pricing and cybersales; Internet airline ticket sales and reservations", Feb. 1998, Section: No. 2, vol. 35, p. 64, ISSN: 0002-2543, 4pp.

Adyanthaya, Surain, "Revenue Management: the Black Art." Interavia Business & Technology, Sep. 1998, Section: No. 623, vol. 53, p. 43, ISSN: 0983-1592, 4pp.

"Airfare Bargains on the Net: About E-mail Lists", (http //travel epicurious com/travel/c_planning/02_airfares/email/intro html), Copyright 1998, 17pp.

"Airtech—FlightPass Faq", (http //www airtech com/at_flightpass/at_faqflightpass htm), download date: Oct. 5, 1998, 4pp.

Varian, Hal R., "First Monday: Differential Pricing and Efficiency", (http www firstmonday dk/issues/issue2/different/), Copyright 1996, 18pp.

Kephart, Jeff, "Price Dynamics of Vertically; Introduction", (http //www research ibm com/infoecon...), Aug. 15, 1998, 3pp.

"Bookit Airfare Bidding System (Fax for Your Plane Ticket?)", Consumer Reports Travel Letter, Sep. 1991, Section: vol. 7, No. 9, pp. 97, 106, 3pp.

Nelson, Janet, "Practical Traveler; Airlines Relaxing Policy On No-Refund Tickets", The New York Times, Sep. 22, 1991, Section 5, p. 3, col. 1, Travel Desk, 4pp.

"Traveler's Notes; Easier Airfare Bidding.", Consumer Reports Travel Letter, Oct. 1991, Section: vol. 7, No. 10, p. 119, 1pg.

Website: VendMaster, "Windows for Vending PRO with Inventory", (http //www vendmaster com/pro_inv_main html), download date: Jul. 16, 1998, 2pp.

Website: Optimum Energy Group—Products, "VendingMi$er", (http //www optimumenergy com/products/miser html), download date: Aug. 12, 1998, 2pp.

Burke, Raymond R., "Virtual Shopping: Breakthrough in Marketing Research", Harvard Business Review, Mar.-Apr. 1996, pp. 120-131, 9pp.

Anthony Joseph, "Baby the engine, and other saving tips", The Christian Science Monitor, Nov. 4, 1986, p. B10, 3p.

"Coupons & more", welcome to coolsavings.com—Copyright 1996-1999.(http://208,134.230.42/cgi-win/tempprs.exe/first.htm), 3pp.

"A personal shopping organizer for the web savvy consumer. My KillerApp offers a personalized shopping experience to meet the unique needs of every individual user". (http://www.killerapp.com/html/main/pr0004.html), Oct. 2, 1998, 2pp.

"New Wave Marketing", Promotion Times, An SCA Quarterly Newsletter—First Quarter, undated, 2pp.

Brochure: "Reaching In New Directions", First Data Corp., Merchant Services, undated, 30pp.

"Global, Second-Generation, and Frequent-Buyer Set New Trends", Marketing News, Jun. 7, 1985, vol. 19, No. 12, p. 18, ISSN: 0025-3790, 1pg.

Lacher, Lisa, "Coupon Gimmick Registers Profits", Business Dateline, Business Record, Dec. 7, 1987, vol. 83, No. 47, Section 1, 2pp.

Stevens, Lawrence, "Hypermarket Challenge", Computerworld, Dec. 19, 1988, Section: Software & Services, 2pp.

McIntyre, Faye, "Small businesses may prefer alternatives to advertising.", South Dakota Business Review, Jun. 1989, vol. 47, No. 4, p. 1(4), ISSN: 0038-3260, 4pp.

"Safeway Introduces Store-Generated Coupons", PR Newswire, May 1, 1990, 1pg.

Ramirez, Anthony, "The Pizza Version of Dialing '911'", The New York Times, Sep. 9, 1991, Late Edition—Final, Section D, p. 1, col. 3, Financial Desk, 5pp.

Blattenberg, Robert C., "Interactive marketing: exploiting the age of addressability.", Sloan Management Review, Sep. 22, 1991, Section: vol. 33, No. 1, p. 5, ISSN: 0019-848X, 15pp.

O'Kane, Gerry, "Parking your car by computer", South China Morning Post, Mar. 23, 1993, Section: Supplement at p. 3, 3pp.

McDowell, Bill, "Frequency marketing builds repeat business; Management", Information Access Company, a Thomson Corporation Company, Reed Publishing USA, Building Supply Home Centers, Aug. 1993, No. 2, vol. 165, p. 96, ISSN: 0890-9008, 5pp.

Arend, Mark, "Debit frenzy? Not quite, but getting there", ABA Banking Journal, Apr. 1994, vol. 86, No. 4, pp. 57-61, ISSN: 0194-5947, 4pp.

Rubel, Chad, "Young firm armed with technology fights an old giant; ETM to Ticketmaster: Let's rock", American Marketing Association, Marketing News TM, Jun. 19, 1995, 3pp.

"Tecmark Reward Terminal", Tecmark Services, Inc., Copyright 1996, (http //www tecmarkinc com/terminal htm), 1pg.

McKinney, Jeff, "Merchant program could pay off for Provident", The Cincinnati Enquirer, Mar. 24, 1996, Section: Financial at p. E02, 2pp.

"Staples The Office Superstore to Participate in Visa 'Rewards for Your Home' Promotion; Savings will be offered to thousands of Visa Staples customers.", Business Wire, Mar. 25, 1996, p3251164, 2pp.

Retailers in small N. D. town join forces (Discount Points Corp launches Discount Points, a multi-retailer consumer discount program), Tire Business, Apr. 29, 1996, vol. 14, No. 2, p. 10, 3pp.

Wagner, Jim, "Cameras Tell Mall What Door You Use, How Often You Go", Albuquerque Tribune, Aug. 9, 1996, Section: Evening, 2pp.

Fickenscher, Lisa, "Amex to Start Free Rewards Program with Discounts on Merchandise", The American Banker, Oct. 18, 1996, Section: Credit/Debit/ATMS at p. 10, 2pp.

Fitzgerald, Kate, "Amex Program Moves Loyalty To Next Level: Custom Extras Finds A Medium Customers Can't Ignore: Billing Statements", Crain Communications Inc., Advertising Age, Nov. 4, 1996, Section: News, 2pp.

"Click this box for extra pepperoni; CyberSlice routes online orders", The Dallas Morning News, Dec. 2, 1996, Section: Business, 2pp.

"Frequent shopper programs are taking off", Grocery Marketing, Jan. 1997, vol. 63, No. 1, p. 54, 2pp.

Fickenscher, Lisa, "Merchant: American Express Seeks to Mine Its Data on Cardholder Spending Patterns", The American Banker, Mar. 24, 1997, Section: Credit/Debit/ATMS at p. 20, 2pp.

"Dispensing the future", Lafferty Publications Limited, Electronic Payments International, May 1997, Section: Feature at p. 12, 5pp.

"Grocery shopping goes on line in many markets; Technology spurs remote ordering concept", The Dallas Morning News, May 12, 1997, Section: Business at p. 2D, 2pp.

"Industry Briefs", Phillips Business Information, Inc., Card News, Jun. 9, 1997, vol. 12, No. 11, 2pp.

Popyk, Bob, "Turn customers into torchbearers", Information Access Company, a Thomson Corporation Company, National Trade Publications, Boating Industry, Sep. 1997, No. 9, vol. 60, p. 33, ISSN: 0006-5404, 3pp.

Hoeschen, Brad, "Brookfield Square hopes mall card strikes a chord", The Business Journal of Milwaukee Inc., Business Dateline, Business Journal-Milwaukee, Sep. 12, 1997, vol. 14, No. 50 at p. 19, 2pp.

"Acxiom Case-in-Point Case Study—Bloomingdale's Inc.", "Pushing Technology's Edge Upscale department store applies database for profit", (http //www acxiom com/cip-cs-b htm), download date: Sep. 23, 1997, 2pp.

"NCR 7452 Workstation—Beyond Traditional POS", (http //www ncr com/product/retail/products/catalog/7452 shtml), download date: Sep. 23, 1997, 3pp.

"From Our Family to Yours . . . 5 Weeks of Coupon Values for a Valuable Customer", Shoprite, Wakefern Food Corporation, Copyright 1998, 1pg.

Heller, Al, "Chain Pharmacy: Forecast '98: New Technology Advances Pharmacy Productivity", Lebhar-Friedman Inc., Drug Store News, Jan. 12, 1998 at p. CP29, 4pp.

"Advanced Mechanics Internet Specials", (http //www metroplexweb com/advcpn2 htm), download date: Mar. 12, 1998. 2pp.

Website: "New Partners, more exciting rewards: The Membership Rewards program for 1998.", (http //www americanexpress com/rewards/news/docs/1998new_mr shtml), download date: Mar. 12, 1998, 38pp.

Website: "U.P.C. Coupon Code Guidelines Manual", (http //www uc-council org/d31-3 htm), download date: Mar. 12, 1998, 10pp.

Rubinstein, Ed, "Internet Continues To Fortify Takeout Sector For Operators", Lebhar-Friedman Inc., Nation's Restaurant News, Mar. 23, 1998 at p. 55, 5pp.

Information Packet: "My Points®—Universal Rewards Currency", MotivationNet, Inc. Apr. 1998, 29pp.

Hemsley, Steve, "Research and destroy; Point-of-purchase research provides brand managers . . . ", Centaur Communications Ltd., Marketing Week, Apr. 16, 1998, Section: Point Of Purchase at pp. 33-36, (3pp).

"WellsPark Group Lauches 'V.I.P. Rewards'; the Most Comprehensive Relationship Marketing Program Ever Created by a Mall Developer", Business Wire, Inc., May 19, 1998, 2pp.

"Catching Red Light Runners", Business Communications Company, Advanced Transportation Technology News, Jun. 1998, vol. 5, No. 2, 2pp.

Amato-McCoy, Deena, "Co-Branded Acme Credit Card Rewards Loyal Users", Information Access Company, A Thomson Corporation Company, Capital Cities Media Inc., Supermarket News, Jun. 15, 1998, p. 17, ISSN: 0039-5803, 2pp.

"Acme Markets, U.S. Bancorp Debut visa Rewards Card", Phillips Business Information, Inc., Card News, Jun. 22, 1998, vol. 13, No. 12, 1pg.

Rubinstein, Ed, "Technology: Prepaid program lets Galleria guests dine 'a la Card'", Nations's Restaurant News, (http //www nrn com), Jun. 29, 1998, 1pg.

"DataCard Partners With CSI To Offer Card-Based Loyalty Solution To Merchants", Business Wire, Inc., Jul. 9, 1998, 1pg.

Albright, Mark, "Grocery savings via Web coupons", Times Publishing Company, St. Petersburg Times, Jul. 22, 1998, Section: Business at p. 1E, 2pp.

Campos, Frellie, "Discount shopping program extended to residents.", Pacific Business News, Sep. 21, 1998, vol. 36, Issue 27, p. 32, 3/5p, ISSN: 0030-8552, 3pp.

"Garage management needs", "Unit Tracking with The General Manager Professional", (http www dacobusy com/garage/idxgarg htm), download date: Mar. 16, 1999, 2pp.

"Route Sales Automation—Track customers, orders, sales, and inventory! Route accounting . . . ", "Point of sale system carried in the palm of your hand", (http //www dacobusy com/), download date: Mar. 16, 1999, 1pg.

"Alphatech, Inc., Looking To The Future", (http //www alphatech com/), download date: Mar. 25, 1999, 1pg.

"Alphatech: Technologies and Projects", (http //www alphatech com/secondary/techpro/compvis html), download date: Mar. 25, 1999, 1pg.

"IMPS: Vehicle License Plate Recognition System", "IMPS™ Integrated Multi-Pass System State of the Art Vehicle License Plate Recognition System", (http www singapore com/optasia/imps), download date: Mar. 25, 1999, 3pp.

"MSTAR main", "Moving and Stationary Target Acquisition and Recognition (MSTAR)", (http www alphatech com/secondary/techpro/projects/mstar/MSTAR_TopLevel html), download date: Mar. 25, 1999, 2pp.

"Welcome to Q Lube?", (http //www qlube com/), download date: Mar. 25, 1999, 1pg.

Website: "Pricing, The Professional Pricing Society Conference Agenda", (http //www pricing-advisor com/conf_agn htm), download date: Jun. 19, 1999, 10pp.

Press Release, "Priceline.com Delivers Savings For Flexible Travelers In Side-By-Side Price Compairson", Priceline.com, Stamford, CT, May 28, 1999, 4pp.

"Travel Industry Bellwether for All Commerce Players", Jupiter Communications, Copyright 1999, Jupiter Strategic Planning Services, 2pp.

"Circuit City to Integrate E-Commerce with store shopping; retailer's E-superstore—www.circuitcity.com- to Open in July", PR Newswire, Jun. 15, 1999; Section: Financial News, 3pp.

"*Wal-Mart* vs. *Amazon*: The fight begins"; Yahoo News, Jun. 9, 1999, 3pp.

"Mercata—Group Buying Power", (http://www.mercata.com/cgi-bin/mercata/mercata/v1/pages/home.jsp), download date: Jun. 7, 1999, 5pp.

David Lazarus, "E-Commerce, Japanese style", Wired online page, Jun. 7, 1999, 3pp.

"Kmart expands inventory via in-store kiosks", Jun. 20, 1999, RTNews; (www.retailtech.com), 1pg.

"WebVoucher", (www.pinex.co.uk/webvoucher/), download date: Mar. 14, 1999, 2pp.

Quinn, Jane Byrant, "New Cars for Less", Newsweek; Oct. 23, 1978; Section: The Columnists; p. 80, 2pp.

"My Auto Broker—Online Auto Broker", (http://www.adverlink.com/myautobroker/), download date: May 28, 1997, 4pp.

Hilts, Paul, "Technology meets commerce; electronic publishing; includes articles on the World Wide Web and the annual Military Book Show; ABA '96", Publisher's Weekly, vol. 243; No. 28; p. 43; ISSN: 0000-0019, 4pp.

"About CyberSlice", (http://www.cyberslice.com/cgi-bin/WebObjects/CyberSlice:2@httpserv01/), download date: May 6, 1997, 2pp.

"PriceWatch", (http://icon.co.za/-robo/prod01.htm), Jan. 14, 1997, 5pp.

Davis, Tim "Vending suppliers scurry to meet Coke-Mandated vendor communication", Automatic Merchandiser, Dec. 1992, pp. 62-64, 2pp.

Conlon et al. "Press 1 for profit." Sales and Marketing Management. Sep. 1998, 6pp.

Burke, Raymond R. "Do You See What I See? The Future of Virtual Shopping." Journal of the Academy of Marketing Science, vol. 25, No. 4, pp. 352-360, Fall 1997, 17pp.

PCT International Search Report for Application No. PCT/NO95/00060, dated Oct. 10, 1995, 3pp.

Office Action for U.S. Appl. No. 09/348,566, mailed Oct. 1, 2003, pp. 3-5.

PCT Notification of Transmittal of the International Search Report or the Declaration for PCT/US99/22650, Dated Mar. 16, 2000, 7pp.

PCT Notification of Transmittal of the International Search Report or the Declaration for PCT/US99/21720, Dated Mar. 23, 2000, 3pp.

PCT International Search Report for Application No. PCT/US97/13588, dated Dec. 4, 1997, 3pp.

PCT International Search Report for Application No. PCT/US00/13349, dated Sep. 11, 2000, 3pp.

Office Action for U.S. Appl. No. 11/456,342 dated Sep. 14, 2007, 6pp.

Office Action for U.S. Appl. No. 09/345,092 dated Jan. 24, 2002, 37pp.

Office Action for U.S. Appl. No. 09/345,092 dated Mar. 15, 2001, 33pp.

Office Action for U.S. Appl. No. 09/345,092 dated Oct. 22, 2002, 42pp.

Office Action for U.S. Appl. No. 09/345,092 dated Jul. 1, 2005, 17pp.

Office Action for U.S. Appl. No. 09/345,092 dated Mar. 10, 2006, 8pp.

Office Action for U.S. Appl. No. 09/345,092 dated Aug. 29, 2006, 12pp.

Notice of Allowability for U.S. Appl. No. 09/345,092 dated Sep. 29, 2006, 4pp.

Notice of Allowability for U.S. Appl. No. 09/345,092 dated Mar. 1, 2007, 4pp.

Office Action for U.S. Appl. No. 09/345,092 dated Jun. 15, 2007, 2pp.

International Search Report for Application No. PCT/US04/33811 dated Dec. 13, 2005, 3pp.

Written Opinion for Application No. PCT/US04/33811 dated Dec. 13, 2005. 3pp.

Office Action for U.S. Appl. No. 09/218,085 dated Nov. 3, 2000, 22pp.

Office Action for U.S. Appl. No. 09/218,085 dated May 23, 2007, 9pp.

Office Action for U.S. Appl. No. 09/218,085 dated Aug. 31, 2007, 2pp.

Office Action for U.S. Appl. No. 09/218,085 dated Nov. 24, 2006, 6pp.

Office Action for U.S. Appl. No. 09/218,085 dated Aug. 18, 2006, 4pp.

Office Action for U.S. Appl. No. 09/218,085 dated Mar. 9, 2006, 6pp.

Office Action for U.S. Appl. No. 09/218,085 dated Nov. 1, 2002, 24pp.

Office Action for U.S. Appl. No. 09/218,085 dated Oct. 19, 2004, 23pp.

Office Action for U.S. Appl. No. 09/218,085 dated Aug. 10, 2005, 5pp.

Office Action for U.S. Appl. No. 09/218,085 dated Jul. 8, 2001, 23pp.

Office Action for U.S. Appl. No. 10/095,372 dated Aug. 26, 2005, 12pp.

Office Action for U.S. Appl. No. 10/095,372 dated Mar. 4, 2005, 8pp.

"Planet City Y2K Sales Program to Benefit Non-Profits" PR Newswire, New York; Aug. 30, 1999, 2 pp.

Online shopping gives schools new fund-raising tool EDUCATION: Websites donate percentages of purchases, but PTA's proceed cautiously, [Morning Edition]; Elizabeth Chey; Orange County Register; Santa Ana, California; Nov. 21, 1999; 2 pp.

School Fund-Raising Goes Online (Yes, You Can Still Buy Wrapping Paper) Peggy O'Crowley Newhouse News Service, Washington, Oct. 11, 1999, 2 pp.

Pushing for Plastic, Ken Clark; Chain Store Age; May 2000; 1 pg.

WAL-Mart to Contribute Through Vending Machines (City Edition) Greensboro News Record; Greensboro, N.C. May 10, 1995, 1 pg.

Pepsi Wins Contract, Coke is Out at APS, Rebecca Roybal Journal Staff Writer, Albuquerque Journal; Albuquerque, N.W. May 25, 2000, 3 pp.

People and events; Herald, Rock Hill, S.C. Jun. 1, 1995, 2 pp.

Manning, Steven, "Students for Sale'" The Nation, New York, Sep. 29, 1999, 5 pp.

Businessline, Chennai, "Testing Limits of Corporate Sponsorships", Oct. 17, 1999, 3 pp.

NCR 7453 "PC-Based Point-of-Sale Solution", Copyright 1998, NCR Corporation, 1 pg.

Gay, Stephen W. "Local Businesses Adopt School", Tulsa World, Sep. 6, 1995, 2 pp.

Notice of Allowance for U.S. Appl. No. 09/612,163 mailed Nov. 27, 2001, 4 pp.

Notice of Allowance for U.S. Appl. No. 09/612,163 mailed Sep. 19, 2001, 4 pp.

Office Action for U.S. Appl. No. 09/612,163 mailed Jan. 10, 2001, 12 pp.

Office Action for U.S. Appl. No. 09/612,163 mailed Feb. 29, 2000, 7 pp.

Office Action for U.S. Appl. No. 09/612,163 mailed Jul. 6, 2000, 22 pp.

Office Action for U.S. Appl. No. 09/612,163 mailed Sep. 29, 1999, 20 pp.
Notice of Allowance for U.S. Appl. No. 10/095,372 mailed Feb. 1, 2007, 18 pp.
Notice of Allowance for U.S. Appl. No. 10/095,372 mailed Jul. 6. 2006, 17 pp.
Office Action for U.S. Appl. No. 10/095,372 mailed Aug. 26, 2005, 12 pp.
Office Action for U.S. Appl. No. 10/095,372 mailed Mar. 4, 2005, 9 pp.
Office Action for U.S. Appl. No. 11/761,791 mailed Mar. 31, 2010, 7 pp.
Office Action for U.S. Appl. No. 11/761,826 mailed Apr. 1, 2010, 13 pp.
Office Action for U.S. Appl. No. 11/761,842 mailed Mar. 31, 2010, 8 pp.
Office Action for U.S. Appl. No. 09/713,001 mailed Jul. 12, 2004, 8 pp.
Office Action for U.S. Appl. No. 09/713,001 mailed Dec. 10, 2003, 6 pp.
Notice of Allowance for U.S. Appl. No. 10/994,913 mailed Apr. 11, 2007, 4 pp.
Office Action for U.S. Appl. No. 10/994,913 mailed Feb. 28, 2006, 6 pp.
Office Action for U.S. Appl. No. 10/994,913 mailed Aug. 16, 2005, 7 pp.
Notice of Allowance for U.S. Appl. No. 11/745,796 mailed Apr. 30, 2009, 4 pp.
Office Action for U.S. Appl. No. 11/745,796 mailed Oct. 6, 2008, 5 pp.
Office Action for U.S. Appl. No. 11/745,796 mailed Feb. 22, 2008, 5 pp.
Notice of Allowance for U.S. Appl. No. 11/745,876 mailed Jan. 27, 2010, 6 pp.
Notice of Allowance for U.S. Appl. No. 11/745,876 mailed Oct. 16, 2009, 6 pp.
Office Action for U.S. Appl. No. 11/745,876 mailed Jun. 19, 2009, 9 pp.
Office Action for U.S. Appl. No. 11/282,525 mailed Mar. 17, 2010, 43 pp.
Examiner's Answer for U.S. Appl. No. 10/902,347 mailed Oct. 22, 2009, 21 pp.
Office Action for U.S. Appl. No. 10/902,347 mailed Nov. 26, 2008, 16 pp.
Office Action for U.S. Appl. No. 10/902,347 mailed May 21, 2008, 15 pp.
Notice of Allowance for U.S. Appl. No. 11/426,204 mailed Oct. 20, 2008, 4 pp.
Notice of Allowance for U.S. Appl. No. 11/426,204 mailed Sep. 08, 2008, 6 pp.
Office Action for U.S. Appl. No. 11/426,204 mailed Sep. 3, 2008, 5 pp.
Office Action for U.S. Appl. No. 11/426,204 mailed Feb. 4, 2008, 4 pp.
Office Action for U.S. Appl. No. 11/426,204 mailed Oct. 1, 2007, 5 pp.
Office Action for U.S. Appl. No. 11/426,204 mailed May 4, 2007, 4 pp.
Office Action for U.S. Appl. No. 11/426,215 mailed May 4, 2007, 4 pp.
Office Action for U.S. Appl. No. 11/426,221 mailed May 4, 2007, 4 pp.
Notice of Allowance for U.S. Appl. No. 11/877,109 mailed Apr. 29, 2010, 4 pp.
Office Action for U.S. Appl. No. 11/877,109 mailed Nov. 5, 2009, 5 pp.
Office Action for U.S. Appl. No. 10/902,397 mailed Jan. 6, 2010, 10 pp.
Office Action for U.S. Appl. No. 10/902,397 mailed May 18, 2009, 9 pp.
Office Action for U.S. Appl. No. 11/426,163 mailed Mar. 31, 2010, 12 pp.
Office Action for U.S. Appl. No. 11/426,163 mailed Aug. 18, 2009, 7 pp.
Office Action for U.S. Appl. No. 11/426,163 mailed Dec. 10, 2008, 15 pp.
Office Action for U.S. Appl. No. 11/426,163 mailed May 21, 2008, 15 pp.
Examiner's Answer for U.S. Appl. No. 11/426,172 mailed Oct. 15, 2009, 14 pp.
Office Action for U.S. Appl. No. 11/426,172 mailed Jan. 7, 2009, 12 pp.
Office Action for U.S. Appl. No. 11/426,172 mailed Sep. 28, 2008, 9 pp.
Office Action for U.S. Appl. No. 11/426,186 mailed Sep. 28, 2009, 14 pp.
Office Action for U.S. Appl. No. 11/426,186 mailed Mar. 10, 2009, 14 pp.
Office Action for U.S. Appl. No. 11/426,186 mailed Sep. 15, 2008, 12 pp.
Office Action for U.S. Appl. No. 11/426,186 mailed May 5, 2008, 9 pp.
Written Opinion for PCT/US0425497 mailed Dec. 13, 2005, 7 pp.
International Search Report for PCT/US0425497 mailed Dec. 13, 2005, 2 pp.
Office Action for U.S. Appl. No. 10/855,247 mailed Sep. 1, 2009, 25 pp.
Office Action for U.S. Appl. No. 11/426,328 mailed May 3, 2007, 4 pp.
Office Action for U.S. Appl. No. 11/426,328 mailed Oct. 6, 2006, 6 pp.
Office Action for U.S. Appl. No. 11/757,891 mailed Dec. 9, 2009, 13 pp.
Notice of Allowance for U.S. Appl. No. 11/426,332 mailed Nov. 6, 2007, 4 pp.
Office Action for U.S. Appl. No. 11/426,332 mailed Jan. 12, 2007, 5 pp.
Office Action for U.S. Appl. No. 11/426,332 mailed Aug. 25, 2006, 5 pp.
Office Action for U.S. Appl. No. 11/426,336 mailed Oct. 6, 2006, 5 pp.
Office Action for U.S. Appl. No. 11/757,918 mailed Feb. 19, 2010, 7 pp.
Office Action for U.S. Appl. No. 11/661,826 mailed Aug. 16, 2010, 15 pp.
Office Action for U.S. Appl. No. 11/282,525 mailed Aug. 30, 2010, 53 pp.
Office Action for U.S. Appl. No. 11/757,891 mailed Jun. 23, 2010, 13 pp.
Office Action for U.S. Appl. No. 11/757,918 mailed Jun. 22, 2010, 31 pp.
Notice of Allowance for U.S. Appl. No. 11/456,355 mailed Sep. 29, 2010, 6 pp.
Notice of Allowance for U.S. Appl. No. 11/877,109 mailed Nov. 2, 2010, 4 pp.
Office Action for U.S. Appl. No. 11/426,163 mailed Sep. 29, 2010, 9 pp.
Notice of Allowance for U.S. Appl. No. 11/926,948 mailed Sep. 29, 2010, 6 pp.
Office Action for U.S. Appl. No. 09/345,092 mailed Jan. 24, 2002, 38 pp.
Office Action for U.S. Appl. No. 09/345,092 mailed Mar. 20, 2001, 33 pp.
Office Action for U.S. Appl. No. 09/345,092 mailed Oct. 22, 2002, 42 pp.
Office Action for U.S. Appl. No. 09/345,092 mailed Sep. 1, 2005, 17 pp.
Office Action for U.S. Appl. No. 09/345,092 mailed Mar. 10, 2006, 8 pp.
Office Action for U.S. Appl. No. 09/345,092 mailed Aug. 29, 2006, 12 pp.
Office Action for U.S. Appl. No. 09/345,092 mailed Oct. 24, 2006, 3 pp.
Office Action for U.S. Appl. No. 09/345,092 mailed Mar. 9, 2007, 6 pp.

Office Action for U.S. Appl. No. 09/345092 mailed Jun. 15, 2007, 2 pp.
Office Action for U.S. Appl. No. 09/218,085 mailed Nov. 17, 2000, 22 pp.
Office Action for U.S. Appl. No. 09/218,085 mailed May 23, 2007, 9 pp.
Office Action for U.S. Appl. No. 09/218,085 mailed Aug. 31, 2007, 2 pp.
Office Action for U.S. Appl. No. 09/218,085 mailed Nov. 24, 2006, 6 pp.
Office Action for U.S. Appl. No. 09/218,085 mailed Aug. 18, 2006, 4 pp.
Office Action for U.S. Appl. No. 09/218,085 mailed Mar. 9, 2006, 6 pp.
Office Action for U.S. Appl. No. 09/218,085 mailed Nov. 1, 2002, 24 pp.
Office Action for U.S. Appl. No. 09/218,085 mailed Oct. 19, 2004, 23 pp.
Office Action for U.S. Appl. No. 09/218,085 mailed Aug. 10, 2005, 5 pp.
Office Action for U.S. Appl. No. 09/218,085 mailed Jul. 27, 2001, 23 pp.
Office Action for U.S. Appl. No. 10/095,372 mailed Aug. 26, 2005, 12 pp.
Office Action for U.S. Appl. No. 10/095,372 mailed Mar. 4, 2005, 8 pp.
Office Action for U.S. Appl. No. 09/218,085 mailed Apr. 3, 2008, 6 pp.
Office Action for U.S. Appl. No. 09/218,085 mailed Dec. 11, 2007, 4 pp.
Notice of Allowance for U.S. Appl. No. 09/345,092 mailed Oct. 24, 2006, 15 pp.
Notice of Allowance for U.S. Appl. No. 09/345,092 mailed Mar. 9, 2007, 8pp.
Office Action for U.S. Appl. No. 09/348,566, mailed Oct. 1, 2003, pp. 3-5, 7 pp.
International Search Report for PCT/US99/22650, mailed Mar. 16, 2000, 10 pp.
International Search Report for PCT/US99/21720, mailed Mar. 23, 2000, 6 pp.
International Search Report for PCT/US97/13588, mailed Dec. 4, 1997, 3 pp.
International Search Report for PCT/US00/13349, mailed Nov. 9, 2000, 7 pp.
International Search Report for PCT/No95/00060, mailed Oct. 10, 1995, 3 pp.
International Search Report for Application No. PCT/US98/21216, mailed May 4, 1999, 5 pp.
Office Action mailed Mar. 20, 2001, U.S. Appl. No. 09/345,092, 33 pp.
Office Action mailed Oct. 22, 2002, U.S. Appl. No. 09/345,092, 42 pp.
Office Action mailed Jul. 1, 2005, U.S. Appl. No. 09/345,092, 17 pp.
Office Action mailed Mar. 10, 2006, U.S. Appl. No. 09/345,092, 8 pp.
Office Action mailed Aug. 29, 2006, U.S. Appl. No. 09/345,092, 12 pp.
International Preliminary Examination Report for Application No. PCT/US00/13349 mailed Jul. 20, 2001, 6 pp.
International Preliminary Examination Report for Application No. PCT/US00/13349 mailed Aug. 30, 2001, 7 pp.
Office Action mailed Jan. 20, 2000 for U.S. Appl. No. 08/947798, 17 pp.
Office Action mailed Oct. 26, 2000, U.S. Appl. No. 08/947,798, 4 pp.
Office Action mailed May 8, 2001, U.S. Appl. No. 08/947,798, 23 pp.
Office Action mailed Aug. 16, 2001, U.S. Appl. No. 08/947,798, 3 pp.
Office Action mailed Dec. 12, 2002, U.S. Appl. No. 08/947,798, 2 pp.
Office Action mailed Jul. 5, 2002, U.S. Appl. No. 08/947,798, 19 pp.
Office Action mailed Feb. 25, 2003, U.S. Appl. No. 08/947,798, 12 pp.
Office Action mailed May 20, 2004, U.S. Appl. No. 08/947,798, 16 pp.
Office Action mailed Jan. 12, 2005, U.S. Appl. No. 08/947,798, 15 pp.
Office Action mailed Mar. 9, 2006, U.S. Appl. No. 08/947,798, 17 pp.
Office Action mailed Dec. 18, 2006, U.S. Appl. No. 08/947,798, 21 pp.
Office Action mailed Sep. 20, 2007, U.S. Appl. No. 08/947,798, 7 pp.
Office Action mailed Jun. 6, 2007, U.S. Appl. No. 08/947,798, 14 pp.
International Preliminary Examination Report for Application No. PCT/US98/21216 mailed Sep. 24, 1999, 4 pp.
Office Action for U.S. Appl. No. 08/947,798 mailed May 5, 2008, 25 pp.
Office Action for U.S. Appl. No. 08/947,798 mailed Jan. 11, 2008, 5 pp.
Office Action for U.S. Appl. No. 11/456,355 mailed Feb. 21, 2008, 16 pp.
Office Action for U.S. Appl. No. 11/456,355 mailed Oct. 3, 2007, 4 pp.
Office Action for U.S. Appl. No. 09/012,163 mailed Jul. 6, 2000, 22 pp.
Office Action for U.S. Appl. No. 09/012,163 mailed Jan. 10, 2001, 13 pp.
Office Action for U.S. Appl. No. 09/012,163 mailed Sep. 29, 1999, 20 pp.
Office Action for U.S. Appl. No. 09/012,163 mailed Feb. 29, 2000, 7 pp.
Notice of Allowability for U.S. Appl. No. 09/012,163 mailed Jul. 19, 2001, 4 pp.
International Search Report for Application No. PCT/US99/01089 mailed May 11, 1999, 1 pp.
Office Action for U.S. Appl. No. 09/164,670 mailed May 11, 2000, 10 pp.
Office Action for U.S. Appl. No. 09/164,670 mailed Jan. 4, 2001, 8 pp.
Notice of Allowance for U.S. Appl. No. 09/164,670 mailed Jul. 16, 2001, 4 pp.
International Search Report for PCT/US96/13718 mailed Nov. 7, 1996, 3 pp.
European Search Report for EP 97/122695 mailed Nov. 10, 1998, 3 pp.
International Search Report for PCT/US98/17340 mailed Dec. 17, 1998, 1 pg.
International Search Report for EP 97/122899 mailed Aug. 9, 1999, 2 pp.
Written Opinion for Application No. PCT/US99/01089 mailed Feb. 1, 2000, 4 pp.
Preliminary Exam Report for Application No. PCT/US99/01089 mailed Jan. 22, 2000, 4 pp.
Office Action for U.S. Appl. No. 09/348,566 mailed Oct. 1, 2003, 6 pp.
Notice of Allowance for U.S. Appl. No. 11/926,948 mailed Jun. 14, 2010, 7 pp.
Office Action for U.S. Appl. No. 11/926,948 mailed Nov. 12, 2009, 16 pp.
Office Action for U.S. Appl. No. 11/926,948 mailed Feb. 24, 2009, 16 pp.
Office Action for U.S. Appl. No. 11/926,948 mailed Sep. 8, 2008, 13 pp.
Linson, Linda and Jinnett, Jerry "How to Write a Business Plan", U.S. Small Business Administration, copyright 1990, 29 pp.

* cited by examiner

| DISPENSER IDENTIFIER 510 | PRODUCT IDENTIFIER 512 | STOCKED QUANTITY 514 | AVAILABLE QUANTITY 516 | CURRENT PRICE 518 |
|---|---|---|---|---|
| A1 | CHIPS | 10 | 2 | 0.75 |
| A2 | PRETZELS | 10 | 2 | 0.70 |
| A3 | GRANOLA | 15 | 12 | 0.50 |
| B1 | SANDWICH | 8 | 6 | 1.75 |
| B2 | APPLE PIE | 8 | 6 | 1.30 |
| B3 | FRUIT PIE | 8 | 7 | 0.90 |
| C1 | ORANGE DRINK | 8 | 8 | 0.45 |
| C2 | COLA | 8 | 3 | 1.05 |
| C3 | SPARKLING WATER | 8 | 5 | 0.75 |
| D1 | CANDY BAR | 15 | 2 | 0.80 |
| D2 | SPEARMINT GUM | 15 | 11 | 0.40 |
| D3 | POUND CAKE | 8 | 7 | 0.70 |

| | DISPENSER IDENTIFIER 510 | PRODUCT IDENTIFIER 512 | ... | STOCK DATE 520 | TERMINATION DATE 522 | TOTAL SHELF TIME 524 | REMAINING SHELF TIME 526 |
|---|---|---|---|---|---|---|---|
| 548 → | A1 | CHIPS | ... | 6/10/97 | 7/24/97 | 44 DAYS | 23 DAYS |
| 550 → | A2 | PRETZELS | ... | 6/10/97 | 7/24/97 | 44 DAYS | 23 DAYS |
| 552 → | A3 | GRANOLA | ... | 6/10/97 | 8/15/97 | 66 DAYS | 45 DAYS |
| 554 → | B1 | SANDWICH | ... | 6/25/97 | 7/03/97 | 8 DAYS | 2 DAYS |
| 556 → | B2 | APPLE PIE | ... | 6/25/97 | 7/02/97 | 7 DAYS | 1 DAY |
| 558 → | B3 | FRUIT PIE | ... | 6/25/97 | 7/03/97 | 8 DAYS | 2 DAYS |
| 560 → | C1 | ORANGE DRINK | ... | 6/15/97 | 9/01/97 | 78 DAYS | 62 DAYS |
| 562 → | C2 | COLA | ... | 6/23/97 | 9/01/97 | 70 DAYS | 62 DAYS |
| 564 → | C3 | SPARKLING WATER | ... | 6/01/97 | 10/01/97 | 122 DAYS | 92 DAYS |
| 566 → | D1 | CANDY BAR | ... | 6/10/97 | 8/15/97 | 66 DAYS | 45 DAYS |
| 568 → | D2 | SPEARMINT GUM | ... | 6/01/97 | 10/15/97 | 136 DAYS | 106 DAYS |
| 570 → | D3 | POUND CAKE | ... | 6/10/97 | 7/10/97 | 30 DAYS | 9 DAYS |

| EVALUATION FREQUENCY 528 | LAST EVALUATION DATE/TIME 530 | SALES SINCE LAST EVALUATION 532 | PREVIOUS DEMAND 534 | CURRENT DEMAND 536 | DEMAND INCREMENT 538 |
|---|---|---|---|---|---|
| EVERY 3 SALES | 6/28/97 03:00 | 2 | EVERY 2.2 DAYS | EVERY 1.8 DAYS | 10% |
| EVERY 2 SALES | 6/25/97 14:00 | 1 | EVERY 2.3 DAYS | EVERY 1.9 DAYS | 10% |
| EVERY 72 HOURS | 6/27/97 12:00 | 1 | EVERY 7.5 DAYS | EVERY 8.5 DAYS | 5% |
| EVERY 6 HOURS | 6/30/97 18:00 | 0 | EVERY 2.4 DAYS | EVERY 2.5 DAYS | 15% |
| EVERY 12 HOURS | 6/30/97 12:00 | 0 | EVERY 2.5 DAYS | EVERY 2.5 DAYS | 15% |
| EVERY 24 HOURS | 6/30/97 00:00 | 0 | EVERY 4.2 DAYS | EVERY 5.0 DAYS | 15% |
| EVERY 2 SALES | 6/25/97 09:00 | 2 | EVERY 4.0 DAYS | EVERY 5.0 DAYS | 15% |
| OUTSIDE TEMPERATURE >95 | 6/28/97 08:00 | 0 | EVERY 0.9 DAYS | EVERY 0.7 DAYS | 15% |
| EVERY 2 SALES | 6/19/97 05:00 | 1 | EVERY 3.6 DAYS | EVERY 3.6 DAYS | 15% |
| EVERY 72 HOURS | 6/27/97 12:00 | 0 | EVERY 2.6 DAYS | EVERY 2.1 DAYS | 5% |
| EVERY 72 HOURS | 6/27/97 12:00 | 0 | EVERY 5.9 DAYS | EVERY 6.5 DAYS | 5% |
| EVERY 24 HOURS | 6/30/97 12:00 | 0 | EVERY 8.2 DAYS | EVERY 10.0 DAYS | 15% |

FIG. 5B

PRODUCTS AND PROCESSES FOR MANAGING THE PRICES OF VENDING MACHINE INVENTORY

The present application claims the benefit of priority of the following U.S. Provisional Patent Applications, each of which is incorporated herein by reference:

U.S. Provisional Patent Application No. 60/511,875 entitled "METHOD AND APPARATUS FOR DYNAMICALLY MANAGING VENDING MACHINE INVENTORY PRICES", filed Oct. 16, 2003; and U.S. Provisional Patent Application No. 60/527,988 entitled "APPARATUS, SYSTEM AND METHOD FOR ESTABLISHING MULTI-TRANSACTION RELATIONSHIPS WITH VENDING MACHINE CUSTOMERS", filed Dec. 9, 2003.

The present application is a continuation-in-part of each of the following U.S. Patent Applications, each of which is incorporated herein by reference:

(i) U.S. patent application Ser. No. 08/947,798 entitled "METHOD AND APPARATUS FOR DYNAMICALLY MANAGING VENDING MACHINE INVENTORY PRICES", filed Oct. 9, 1997;

(ii) U.S. patent application Ser. No. 10/095,372 entitled "METHOD AND APPARATUS FOR VENDING A COMBINATION OF PRODUCTS", filed Mar. 11, 2002, now U.S. Pat. No. 7,233,912, which was published as US 2002/0161653 A1 on Oct. 31, 2002; and (iii) U.S. patent application Ser. No. 09/218,085 entitled "METHOD AND APPARATUS FOR VENDING PRODUCTS", filed Dec. 22, 1998; and (iv) U.S. patent application Ser. No. 09/345,092, entitled "VENDING MACHINE SYSTEM AND METHOD FOR ENCOURAGING THE PURCHASE OF PROFITABLE ITEMS", filed Jun. 30, 1999, now U.S. Pat. No. 7,249,050.

CROSS REFERENCE TO RELATED APPLICATIONS

The present application is related to the following commonly-owned, co-pending U.S. patent applications, each of which is incorporated herein by reference:

(i) U.S. patent application Ser. No. 10/951,296 entitled "METHOD AND APPARATUS FOR DEFINING AND UTILIZING PRODUCT LOCATION IN A VENDING MACHINE", filed Sep. 27, 2004; and (ii) U.S. patent application Ser. No. 10/902,397 entitled "PRODUCTS AND PROCESSES FOR VENDING A PLURALITY OF PRODUCTS", filed Jul. 29, 2004.

BACKGROUND

Conventional vending machines are automated, and thus can provide several benefits to sellers. For example, a vending machine can sell products at places where human sales people and face-to-face retailing efforts are not practical (e.g. the lobby of an office building); and a vending machine can sell products at times that are inconvenient for traditional retailers (e.g. 3 AM on a Tuesday morning). However, conventional vending machines do not permit the flexibility enjoyed by human retailers in dynamically responding to changes in supply and demand.

Applicants have previously recognized that significant benefits ensue from vending machines configured to dynamically respond to market forces. For example, Applicants' co-pending U.S. patent application Ser. No. 08/947,798 entitled METHOD AND APPARATUS FOR DYNAMICALLY MANAGING VENDING MACHINE INVENTORY PRICES, filed Oct. 9, 1997, provides several benefits, such as the automated, dynamic pricing of products sold via a vending machine, in which the pricing is based on stored rules that can consider up-to-date supply and demand data gathered when no human salesperson is present (e.g., during the sales period prior to a restock date).

Further, Applicant's co-pending U.S. patent application Ser. No. 10/095,372 entitled METHOD AND APPARATUS FOR VENDING A COMBINATION OF PRODUCTS, filed Mar. 11, 2002, provides several benefits, such as the automated, dynamic configuration of promotional product combinations based on supply and demand data.

Further, Applicant's co-pending U.S. patent application Ser. No. 09/218,085 entitled METHOD AND APPARATUS FOR VENDING PRODUCTS, filed Dec. 22, 1998, provides several benefits, such as automatically selecting products for customers based on supply and demand data.

Further, Applicant's co-pending U.S. patent application Ser. No. 09/345,092, entitled VENDING MACHINE SYSTEM AND METHOD FOR ENCOURAGING THE PURCHASE OF PROFITABLE ITEMS, filed Jun. 30, 1999, provides several benefits, such as presenting offers for substitute products based on supply and demand data.

BRIEF DESCRIPTION OF THE DRAWINGS

FIGS. 5A-5C are a table illustrating the structure of an price management table stored in the memory of the vending machine of FIG. 2;

DETAILED DESCRIPTION

Figure 1:
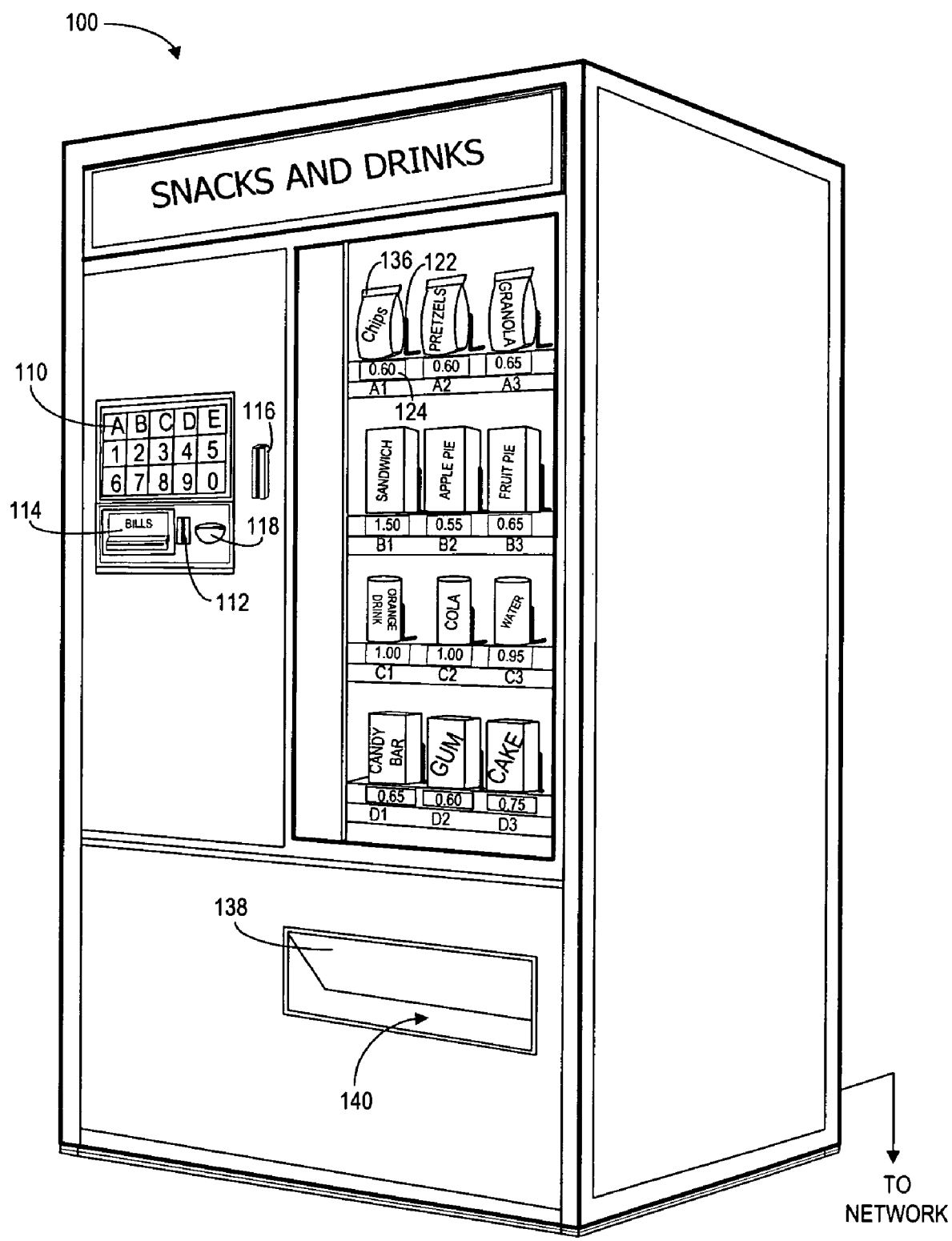
FIG. 1 is a perspective view of a vending machine according to one embodiment of the present invention.

Numerous embodiments are described in this patent application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with various modifications and alterations. Although particular features of the present invention may be described with reference to one or more particular embodiments or figures, it should be understood that such features are not limited to usage in the one or more particular embodiments or figures with reference to which they are described.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed.

The present invention can be configured to work in a network environment including a computer that is in communication, via a communications network, with one or more vending machines. The computer may communicate with the vending machines directly or indirectly, via a wired or wireless medium such as the Internet, LAN, WAN or Ethernet, Token Ring, or via any appropriate communications means or combination of communications means. Each of the vending machines may comprise computers, such as those based on the Intel® Pentium® or Centrino™ processor, that are adapted to communicate with the computer. Any number and type of machines may be in communication with the computer.

Communication between the vending machines and the computer, and among the vending machines, may be direct or indirect, such as over the Internet through a Web site maintained by computer on a remote server or over an on-line data network including commercial on-line service providers, bulletin board systems and the like. In yet other embodiments, the vending machines may communicate with one another and/or the computer over RF, cable TV, satellite links and the like.

Some, but not all, possible communication networks that may comprise the network or be otherwise part of the system include: a local area network (LAN), a wide area network (WAN), the Internet, a telephone line, a cable line, a radio channel, an optical communications line, and a satellite communications link. Possible communications protocols that may be part of the system include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that vending machines and/or computers in communication with each other need not be continually transmitting to each other. On the contrary, such vending machines and/or computers need only transmit to each other as necessary or desirable, and may actually refrain from exchanging data most of the time. For example, a vending machine in communication with another machine via the Internet may not transmit data to the other machine for weeks at a time.

In an embodiment, a server computer may not be necessary or desirable. For example, the present invention may, in one or more embodiments, be practiced on a stand-alone vending machine and/or a vending machine in communication only with one or more other vending machines. In such an embodiment, any functions described as performed by the server computer or data described as stored on the server computer may instead be performed by or stored on one or more vending machines.

In other embodiments, a vending machine may be in communication with a remote computer, such as a server, that provides the vending machine with and/or receives from the vending machine, e.g., all or some of the data described herein. Thus, in certain embodiments, the server may comprise certain elements or portions of certain elements such as a data storage device/memory.

In such an embodiment, the remote computer could be accessible, directly or indirectly, via a second computer (communicating over the Internet or other network) by a customer or operator. Accordingly, a customer or operator of the second computer could communicate with the remote computer via a Web browser. The second computer could, e.g., receive from the remote computer messages described herein as being output by the vending machine, and/or transmit to the remote computer input described herein as being provided to the vending machine. Similarly, various data described herein as received through an input device of a vending machine may be received through a Web browser communicating with a remote server, which in turn communicates with the vending machine. Thus, an operator of the vending machine may have remote polling and reporting capabilities, may be able to transmit new business rules to the vending machine, and the like.

Various disclosed embodiments of the present invention permit the dynamic management of the price of a product in a vending machine.

Various embodiments of the present invention provides a method and apparatus to automatically and dynamically determine, adjust and manage product pricing in a vending machine to account for current market trends. According to a first aspect of the present invention, a method is disclosed for automatically managing a price of a product in a vending machine. The method includes the step of receiving a product identifier specifying the product. The method further includes the step of receiving inventory data. The inventory data can include the quantity of the product in the vending machine.

Next, the method includes the step of determining price management data associated with said product. The price management data can specify supply and/or demand data associated with the product. The method continues with the step of determining the price for the product, and storing the price management data and the price. This first method of managing inventory pricing is particularly useful if performed upon stocking the vending machine.

According to another aspect of the present invention, a second method is disclosed for automatically managing a price of a product in a vending machine. The second method includes the step of accessing price management data and/or the inventory data associated with the product. The inventory data and/or the price management data may be used, in part or in whole, to form the basis for the price in the step of determining the price of the product. The determined price is may be stored in a memory and/or may be displayed. This second method may be performed, e.g., in response to a particular event, such as a product sale, a change in the environment, or according to a schedule.

Many additional aspects are disclosed herein. Various products are disclosed for performing the steps of the respective methods disclosed herein.

Other features, advantages and embodiments are readily apparent from the detailed description when taken in connection with the accompanying drawings.

Apparatus Architecture

Figure 2:
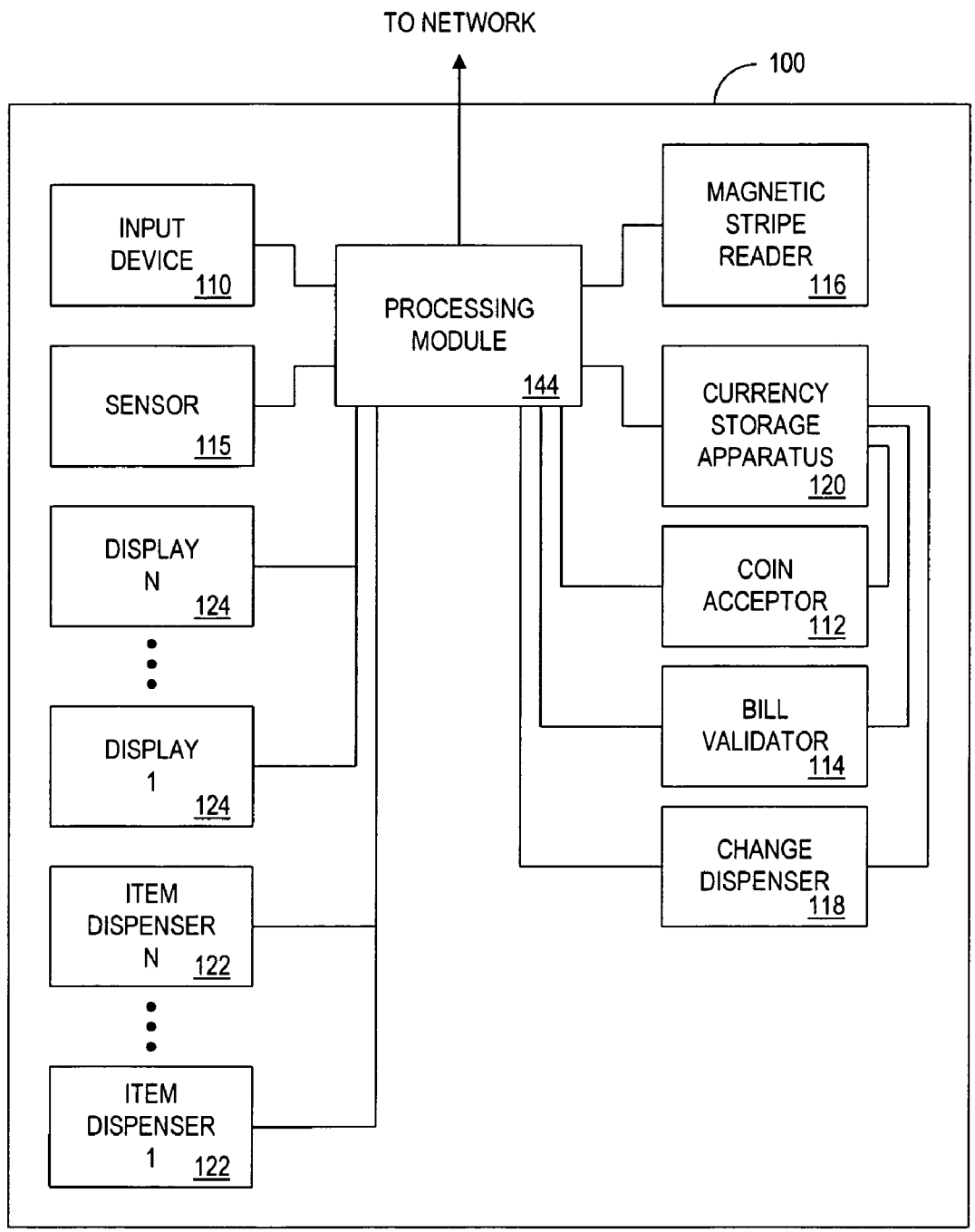
FIG. 2 is a schematic block diagram illustrating the components of the vending machine according to one embodiment of the present invention.
Figure 3:
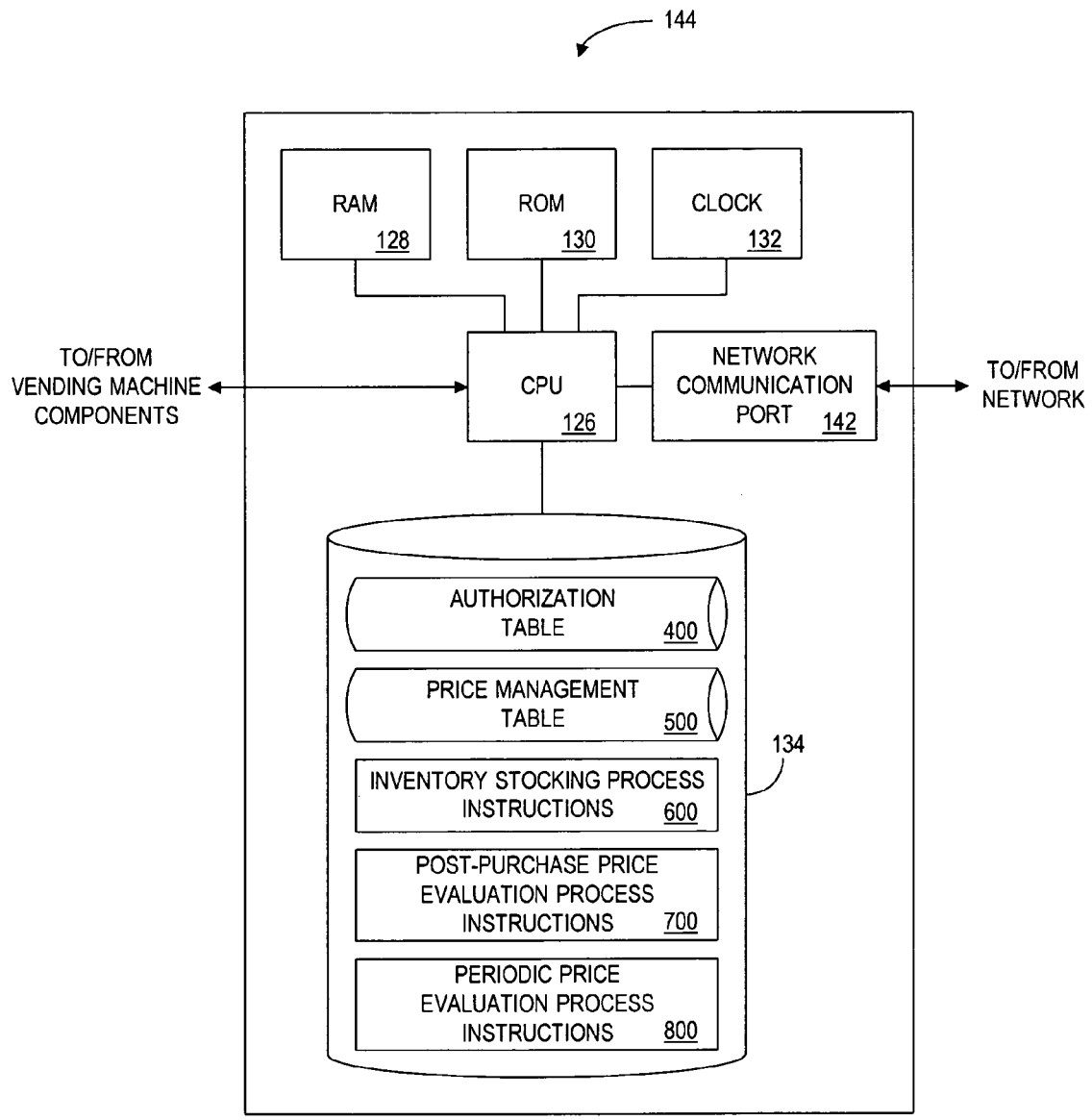
FIG. 3 is a schematic block diagram illustrating the components of the processing module of the vending machine of FIG. 2.

An embodiment of the method and system of the present invention will now be discussed with reference to FIGS. 1-8B. FIGS. 1-3 illustrate the components of one exemplary vending machine 100 including the features of the present invention. Although specific exemplary vending machine 100 is referred to throughout the detailed description, the present invention is directed to any automatic sales machine that allows payment to be exchanged for goods. Payment can be presented through a variety of media including, but not limited to, coins, bills and other currencies, magnetic stripe cards and smart cards (whether pre-paid or linked to an account), and identification codes (e.g., as provided through a keypad, provided via an RFID transmitter and receiver). FIG. 1 is a perspective view of vending machine 100; FIG. 2 is a schematic block diagram of vending machine 100; and FIG. 3 is a schematic block diagram of the processing module of vending machine 100.

The vending machine 100 may include many commercially-available casings/cabinets. For example, in snack machine embodiments, a suitable machine casing may comprise the 129 SnackShop™ manufactured by Automatic Products International, Ltd.™ of Saint Paul, Minn., which stands at 72"/1829 mm wide, has a width of 38⅞"/988 mm, and a depth of 35"/889 mm. Other suitable snack machine casings include the A La Carte™ machine from Automatic Products™, and the GPL SnackVendor™ model # 159 from Crane Merchandising Systems/Crane Co.™ of Stamford, Conn.

In beverage machine embodiments, machine cabinets commercially available from Dixie Narco™, Inc. of Williston, S.C. may be employed. Beverage machine cabinets may comprise a "cooler" or "glass front" style front panel, featuring a transparent front panel (e.g. glass) enabling customers to see inventory for sale. Alternatively, beverage machine casings may comprise a "bubble front" style front panel, featuring a decorative front panel, typically used to advertise a logo of a product manufacturer commercially interested in the vending machine's operation.

Other embodiments are contemplated as well, including combination snack and beverage vending machine embodiments, such as those available from Crain Co.™. Further details concerning the suitability of machine casing/cabinetry are well known in the art.

As shown, vending machine 100 may include one or more input devices 110 for receiving input from a customer indicating a product selection. Input device 110 may also be used for receiving input from an operator during stocking or maintenance of vending machine 100. Although input device 110, as illustrated, includes a set of alpha-numeric keys for providing input to vending machine 100, input device could include one or more of a selector dial, a set of buttons associated with a respective set of item dispensers, a motion sensor, a barcode reader, a Dual-Tone Multi-Frequency (DTMF) receiver/decoder, a wireless device (e.g. a cellular telephone or wireless Personal Digital Assistant), cameras, such as digital video and/or digital still photographic cameras, a voice recognition module, a fingerprint reader, a topical facial pattern scanner/reader, an iris or retinal scanner, a microphone, an infrared receiver, any device capable of receiving a command from a user and transmitting the command to a processor, and/or any conventional input device commonly employed by a vending machine designer. Further, vending machine 100 may include more than one input device 110. For example, vending machine 100 may include an exterior input device 110 for receiving customer input and an interior input device (not shown) for receiving operator input. In the illustrated embodiment, input device 110 receives input data from both operators and customers.

The vending machine 100 may further comprise one or more output devices. An output device may be operable to receive input from a customer, operator, or other person. Also, an output device may be operable to output product and/or other information to a customer or operator.

An output device may comprise, for example, one or more Liquid Crystal Displays (LCDs). An output device may comprise one or more Light Emitting Diodes (LEDs) displays (e.g., several alphanumeric LEDs on the shelves of a vending machine, each LED being associated with a row of product inventory). The price display 124 may provide the functionality of such LEDs.

In one embodiment, an LED display screen may be mounted to a vending machine (e.g., attached thereto, such as via bolts or other mounting hardware). Such a mounted LED display screen and may be used to communicate messages (described herein) to customers. A suitable LED display screen for such an embodiment may be housed in an aluminum case having a length of 27.5", a height of 4.25", and a depth of 1.75". Such a display screen may have a display area capable of showing 13 alphanumeric and/or graphical characters. Further, such an LED display screen may comprise a serial computer interface, such as an RJ45/RS232 connector, for communicating with a processor, as described herein. Further still, such an LED display may be capable of outputting text and graphics in several colors (e.g., red, yellow, green).

Further, in some embodiments, an output device comprises a printer. In one embodiment, a printer is configured to print on card stock paper (e.g. 0.06 mm to 0.15 mm thickness), such as the EPSON EU-T400 Series Kiosk Printer. Further, a printer may be capable of thermal line printing of various alphanumeric and graphical symbols in various font sizes (e.g. raging from 9 to 24 point) on various types of paper. Additionally, such a printer may communicate with a processor (described herein) via an RS232/IEEE 12834 and/or bi-directional parallel connection. Such a printer may further comprise a 4 KB data buffer.

Additionally, in some embodiments, an output device comprises an audio module, such as an audio speaker, that outputs information to customers audibly. Speakers may comprise conventional speakers or modern hypersonic speakers.

Many combinations of input and output devices may be employed in accordance with embodiments of the present invention. For example, in embodiments which include touch screens, input and output functionality may be provided by a single device. As described, in some embodiments, a touch-sensitive screen may be employed to perform both input and output functions. Suitable, commercially available touch screens for use in accordance with the present invention are manufactured by Elo TouchSystems, Inc., of Fremont, Calif., such as Elo's AccuTouch series touch screens. Such touch screens may comprise: (i) a first (e.g., outer-most) hard-surface screen layer coated with an anti-glare finish, (ii) a second screen layer coated with a transparent-conductive coating, (iii) a third screen layer comprising a glass substrate with a uniform-conductive coating. Further, such touch screens may be configured to detect input within a determined positional accuracy, such as a standard deviation of error less than ±0.080-inch (2 mm). The sensitivity resolution of such touch screens may be more than 100,000 touchpoints/in$^2$ (15,500 touchpoints/cm$^2$) for a 13-inch touch screen. For such touch screens, the touch activation force required to trigger an input signal to the processor (described herein) via the touch screen is typically 2 to 4 ounces (57 to 113 g). Additionally, touch screens for use in accordance with embodiments of the present invention may be resistant to environmental stressors such as water, humidity, chemicals, electrostatic energy, and the like. These and other operational details of touch screens (e.g., drive current, signal current, capacitance, open circuit resistance, closed circuit resistance, etc.) are well known in the art.

As shown, vending machine 100 may include a sensor 115 for sensing surrounding environmental conditions. In one embodiment, sensor 115 comprises a conventional temperature sensor configured to sense the local outdoor temperature or the external environmental temperature surrounding vending machine 100. Sensor 115 could include a receiver for receiving a local temperature from a weather service. In another embodiment, the sensor 115 may comprise a motion detector (e.g., which generates a signal when a physical body in proximity to the sensor moves above a certain rate of speed). Such input from a motion detector would be useful, e.g., in basing one or more price changes on "foot traffic" (people detected or estimated to be in the area of the vending machine) or changes in foot traffic (e.g., increases or decreases in the number of people per time detected or estimated to be in the area of the vending machine). For example, the foot traffic could be considered a proxy for demand, or another variable which together with other variables indicates demand. A large number of people in the area might, e.g., trigger an increase in price, impede a decrease in price.

In addition to or in lieu of a sensor, the vending machine may include an input device which allows a temperature (or other data) to be input, e.g., by an operator of the vending machine. Such an input device may comprise, e.g., a keypad or another know device which allows numeric input to be received by the vending machine.

Such an input device may be located such that only an authorized operator can access the input device. For example, the input device may be located inside a cabinet of the vending machine and accessible only upon unlocking the cabinet using a key. Alternatively or additionally, the input device may be located such that anyone can interact with the input device, but authorization is required to have the input entered or accepted. For example, the input device may require a valid authorization code to be entered, or a proper key to be inserted, before a temperature is accepted via the input device.

Vending machine 100 may also include one or more of several payment processing mechanisms which enable, e.g., receiving payment and/or dispensing change. Payment processing mechanisms include coin acceptor 112, bill validator 114, magnetic stripe reader 116 (or other card reader) and change dispenser 118. Magnetic stripe reader 116 is a conventional reader for reading data on the magnetic stripe of a credit or debit card, and it may cooperate with conventional remote point-of-sale credit card processing equipment (not shown) to validate credit based purchases through a conventional credit authorization network. Suitable card-based transaction processing systems and methods are available from USA Technologies, Inc., of Malvern, Pa.

Coin acceptor 112, bill validator 114 and change dispenser 118 communicate with currency storage apparatus 120 and may include conventional devices such as Mars models AE-2400, MC5000, TRC200 or CoinCo model 9300-L. Coin acceptor 112 and bill validator 114 can receive and validate currency that is stored by currency storage apparatus 120.

Further, a bill validator or coin acceptor may be capable of monitoring stored currency and maintaining a running total of the stored currency, as is discussed with reference to U.S. Pat. No. 4,587,984, entitled COIN TUBE MONITOR MEANS, the entirety of which is incorporated by reference herein. The change dispenser facilitates or activates the return of coinage to the customer where appropriate.

In one embodiment, a payment processing mechanism includes a device that is configured to receive payment authorization and product selection commands through a wireless device communication network, directly or indirectly, from a customer device (e.g. a cellular telephone). In such an embodiment, a payment processing mechanism may comprise a cellular transceiver operatively connected to a processor, as described herein. Systems and methods allowing for the selection of and payment for vending machine articles through cellular telephones are provided by USA Technologies, Inc. Further, in such an embodiment, a customer cellular telephone may serve as an input/output device, as described herein.

Referring now to FIGS. 2 and 3, coin acceptor 112, bill validator 114, magnetic stripe reader 116 and change dispenser 118 communicate with, and are controlled by, processing module 144. Processing module 144 may include network communication port 142 for permitting communication with (i) the previously mentioned components of vending machine 100, a central controller via a network (not shown), and/or (iii) other components or devices. The network communication port 142 may comprise a modem (e.g. a cellular modem or otherwise), a wireless transmitter or transponder (e.g. an infrared transmitter/receiver, a radio transmitter/receiver).

In addition to the elements previously mentioned, processing module 144 may include a central processing unit 126 (also referred to as a "CPU" or "processor") connected to communication port 142. CPU 126, which may comprise one or more Intel® Pentium® or Centrino™ processors, communicates with random access memory (RAM) 128, read only memory (ROM) 130, clock 132. CPU 126 also communicates with at least one item dispenser 122, at least one price display 124 and storage device 134. Price display 124 may be any display device, preferably a digital display, employing conventional technology such as a light emitting diode ("LED") display or a liquid crystal display ("LCD").

The CPU 126 and the storage device 134 may each be, for example: (i) located entirely within a single computer or other computing device; or (ii) connected to each other by a remote communication medium, such as a serial port cable, a LAN, a telephone line, radio frequency transceiver, a fiber optic connection or the like. In some embodiments for example, the vending machine may comprise one or more computers (or processors) that are connected to a remote server computer operative to maintain databases, where the storage device 134 comprises a combination of a remote server computer and associated databases.

Vending machine 100 may includes dispensers, such as the twelve item dispensers 122 and twelve price displays 124, one item dispenser and display corresponding to each product offered for sale by vending machine 100. Any number of item dispensers and any number of price displays may be used, and the number of item dispensers need not equal the number of price displays.

Product inventory storage and item dispensing functions of a vending machine configured in accordance with a snack machine embodiment of the present invention may include one or more of: (i) a drive motor, (ii) metal shelves, (iii) a product delivery system (e.g. a chute, product tray, product tray door, etc.), (iv) dual spiral (i.e. double helix) item dispensing rods, (v) convertible (i.e. extendable) shelves, and/or (vi) a refrigeration unit.

In some embodiments, a vending machine may be housed in a casing of the model 129 SnackShop manufactured by Automatic Products™. In such embodiments, three removable shelves may be employed, together providing for thirty product rows and an inventory capacity of between 185 to 522 commonly vended snack products.

Inventory storage and item dispensing mechanism(s) 122 may comprise one or more of: (i) metal and/or plastic shelving, (ii) item dispensing actuators/motors, (iii) product delivery chutes, and/or (iv) a refrigeration unit. Further details concerning vending machine inventory storage and dispensing mechanisms are well known in the art.

As in many conventional vending machines, item dispenser 122 may be activated by CPU 126 after a customer has purchased item 136, causing item 136 to be transferred to receptacle 140. A customer has access to a purchased item in receptacle 140 via door 138. Purchased item 136 can then be removed by a customer from receptacle 140 through door 138.

As shown in FIGS. 1 and 2, each item dispenser 122 has a corresponding price display 124 that displays information pertaining to item 136 dispensed by item dispenser 122. Typically, price display 124 will display the price of item 136 as determined according to the steps of the present invention. Although vending machine 100, as illustrated, includes a plurality of item dispensers 122 and a plurality of displays 124, this is only one possible embodiment of the many types of vending machines that could employ the present invention. Selecting an appropriate conventional item dispensing mechanism, a single item dispenser 122 could be used to dispense the plurality of items 136. Likewise, a single price display 124 could be used to communicate prices and other information of the plurality of products.

As shown in FIG. 3, storage device 134 stores a database of authorization and price management data, including data represented by an authorization table 400; and a price management table 500.

As will be understood by those skilled in the art, any schematic illustrations and accompanying descriptions of any sample databases and data tables presented herein are exemplary arrangements for stored representations of information. Any number of other arrangements may be employed besides those suggested by the tables shown. Similarly, any illustrated entries of the databases represent exemplary information only; those of ordinary skill in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

Figure 4:
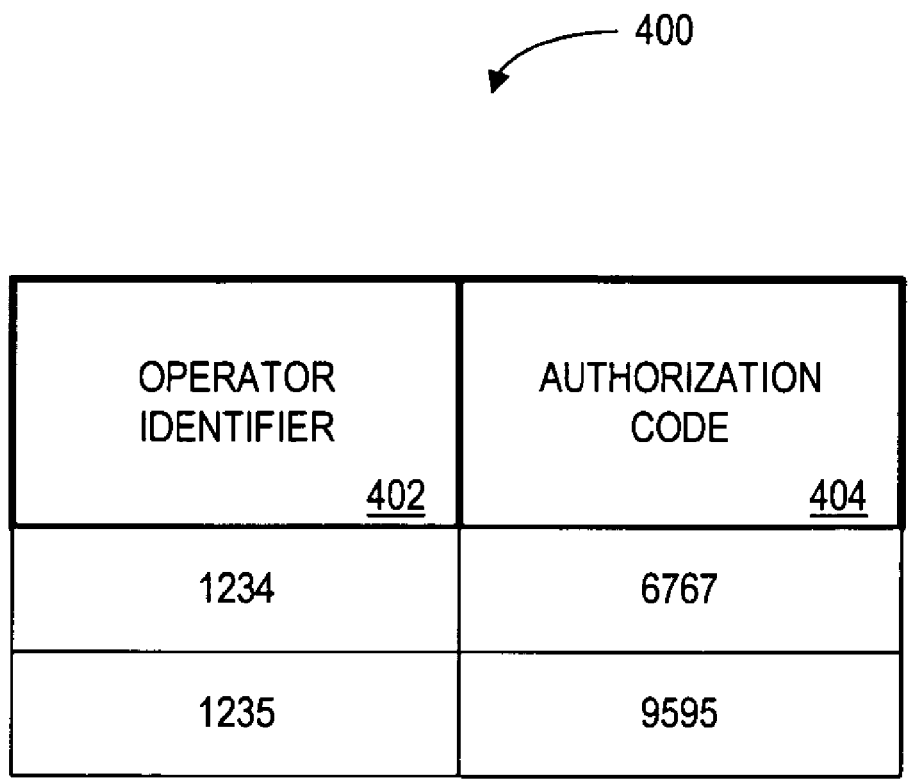
FIG. 4 is a table illustrating the structure of n authorization table stored in the memory of the vending machine of FIG. 2.

Tables 400 and 500 comprise at least a portion of the data stored by storage device 134 and are described more fully with reference to FIGS. 4 and 5, respectively. Storage device 134 further includes instructions for implementing the steps of the present invention. Specifically, storage device 134 includes inventory stocking process instructions 600; post-purchase price evaluation process instructions 700; and periodic price evaluation process instructions 800. Storage device 134 may comprise any appropriate combination of magnetic, optical and/or semiconductor memory, and may include, for example, additional processors, communication ports, Random Access Memory ("RAM"), Read-Only Memory ("ROM"), a magnetic disk drive, a CD-ROM drive, an optical disk drive, a RAM drive and/or any other conventional storage device as would be deemed appropriate by one of ordinary skill in the art.

The vending machine 100 may include or be in communication with a peripheral device. A peripheral device may be a device that obtains (e.g., receives or reads) information from (and/or transmits information to) one or more vending machines. For example, a peripheral device may be operable to obtain information about transactions being conducted at a vending machine, such as the initiation of a transaction, an amount of money deposited for a transaction and/or a product selected during a transaction. For example, a peripheral device may monitor activities carried out by a processor of a vending machine.

In one or more embodiments, one or more such peripheral devices may be in communication with a peripheral device controller (e.g., a server computer). This configuration would allow the peripheral device controller to receive information regarding a plurality of transactions conducted at a plurality of vending machines. The peripheral device controller, in turn, may be in communication with the CPU of a vending machine (or more than one vending machine). It should be understood that any functions described herein as performed by a CPU of a vending machine may alternatively or additionally be performed by a peripheral device and/or a peripheral device controller. Similarly, any data described herein as being stored on or accessed by a storage device of a vending machine may alternatively or additionally be stored on or accessed by a peripheral device and/or a peripheral device controller.

An example of a peripheral device is the e-Port™ by USA Technologies Inc. The e-Port™ is a credit and smart card-accepting unit that controls access to office and MDB vending equipment, and serves as a point of purchase credit card transaction device. The e-Port™ includes an LCD that allows for the display of color graphics, and a touch sensitive input device (touch screen) that allows users to input data to the device. The display may be used to prompt users interactively with, e.g., promotions and information about their transaction status.

A peripheral device may be operable to receive input from customers, receive payment from customers, exchange information with a remotely located server (e.g., a web server, a file server, a peripheral device controller) and/or display messages to customers. A peripheral device may be operable to instruct a vending machine that appropriate payment has been received (e.g., via a credit card read by the separate device) and/or that a particular product should be dispensed by the vending machine. Further, a peripheral device may be operable to instruct the vending machine to execute process steps and/or output messages.

A peripheral device can be useful for enhancing the operation of a conventional vending machine to implement one or more embodiments of the invention. For example, in order to avoid or minimize the necessity of modifying or replacing a program already stored in a memory of a conventional vending machine, an external or internal module that comprises a peripheral device may be inserted in, connected to or associated with the vending machine. For example, a conventional vending machine may be retrofitted with a peripheral device in order to implement one or more embodiments of the present invention.

A peripheral device may include (i) a communications port (e.g., for communicating with one or more vending machines, a peripheral device controller, another peripheral device, a server); (ii) a display (e.g., for displaying graphics and/or text associated with a promotion), (iii) another output means (e.g., a speaker, light, or motion device to communicate with a customer), (iv) a benefit providing means (e.g., a printer and paper dispensing means), and/or (v) an input means.

In one or more embodiments, a peripheral device may direct a vending machine to perform certain functions. For example, a program stored in a memory of peripheral device may cause a processor of a vending machine to perform certain functions. For example, a program stored in a memory of peripheral device may cause a processor of a vending machine to dispense one or more products, dispense a monetary amount, refrain from dispensing a monetary amount, refrain from outputting a product, and/or communicate with another device.

Note that, in one or more embodiments, a vending machine and a peripheral device that is associated with the vending machine may not communicate with one another at all. In some embodiments, however, each may communicate with a computer or other device. For example, if both vending machine and peripheral device are in communication with controller, each may obtain information associated with the other through controller.

In one embodiment, a peripheral device controller and/or a peripheral device may be accessible (directly or indirectly) by a customer or another entity via another computer (which communicates, e.g., over the Internet or another network). Accordingly, a customer or other entity (e.g., an owner of the vending machine) of the other computer could communicate with the peripheral device and/or peripheral device controller 260 via a Web browser. The other computer could, e.g., receive from the peripheral device and/or peripheral device controller messages described herein as being output by the vending machine or peripheral device, and/or transmit to the peripheral device and/or peripheral device controller input described herein as being provided to the vending machine. Similarly, various data described herein as received through an input device of a vending machine and/or peripheral device may be received through a Web browser communicating with the peripheral device and/or peripheral device controller 260, which in turn communicates with the vending machine. Thus, an operator of the vending machine may employ remote polling and reporting capabilities (e.g. remote access to vending machine databases and diagnostics), transmit instructions and/or commands to the vending machine, communicate with vending machine customers of the vending machine (via the vending machine's input and output devices), and the like.

Data Tables

FIG. 4 illustrates the contents of an exemplary authorization table 400 in tabular format. Each record of authorization table 400 includes an operator identifier 402 and an authorization code 404 that defines a valid operator identifier/authorization code pair. Authorization table 400 is utilized to enable only authorized operators to access the price management data stored in storage device 134. Of course, authentication table 400 could also be used for authentication of network control and monitoring signals in accordance with the network configuration more fully described with reference to FIG. 9.

Figure 5C:

FIGS. 5A, 5B and 5C illustrate the contents of an exemplary price management table 500. Each of the twelve illustrative records 548-570 of price management table 500 represents information pertaining to a specific product and item dispenser. For purposes of illustration, this data is based on a system date of Jul. 1, 1997. Generally, the data stored in price management table 500 falls into three categories: inventory data, shown in FIG. 5A; evaluation data, shown in FIG. 5B;

and pricing data, shown in FIG. 5C. Certain data elements may fall into more than one category, as described below.

Generally, the exemplary price management table 500 defines (among other things) products available for sale by the vending machine, prices of the products available for sale, and/or rules which define or are used (exclusively or partially) in defining how to adjust prices. The data illustrated by FIGS. 5A, 5B and 5C reflect certain embodiments of price management data. Those of ordinary skill in the art will readily recognize various modifications to and alternative arrangements for price management data. Specific alternatives to the illustrated price management table 500 are described in detail below. As illustrated in FIGS. 5A, 5B and 5C, each exemplary record in price management table 500 includes a dispenser identifier 510 and a product identifier 512. Dispenser identifier field 510 stores a dispenser identifier that uniquely identifies a corresponding item dispenser 122 of vending machine 100. Product identifier field 512 identifies the product associated with the dispenser identified by field 510. accordingly, in this illustrated embodiment, there can be a one-to-one correspondence between a dispenser and a product, i.e. either field uniquely identifies a record. In other words, each dispenser dispenses only one product, and each product is limited to a single dispenser. Other embodiments, discussed below, do not require that there be a one-to-one correspondence between a dispenser and a product.

In various embodiments, a price management table may be configured to store different information and/or different associations between information than as is illustrated in FIGS. 5A, 5B and 5C. An example of different information would be the storage of data defining a one-to-one correspondence between a dispenser and a product price. Thus, a dispenser could dispense more than one product, in which there can be a one-to-one correspondence between a dispenser and a price of products dispensed by that dispenser. In other words, each dispenser dispenses one or more products that are each sold for the same price. Further, units of the same product could be located in different dispensers, and sold for different prices.

Still another way in which price management data may be stored and managed is described in commonly-owned, co-pending patent application Ser. No. 10/951,296. This application generally describes data input and storage procedures that enable, among other things, a plurality of (possibly) different products, each with their own prices, to be stocked in and dispensed from a single dispenser. By effectively identifying the products' "positions" in a dispenser, the disclosure of this co-pending patent application teaches an alternative way to track products and their prices. For example, rather than defining a quantities of a particular product in a particular dispenser (e.g., as do the fields 514 and/or 516 of FIG. 5A of the present application), in this co-pending patent application each item is considered separately because it can have a price which is independent of (i) the price of other units of the same product, and/or (ii) the price of other units in the same dispenser.

One of ordinary skill will recognize that by distributing the price management data among multiple tables, multiple products could, for example, be offered in a single dispenser, and/or multiple dispensers could, for example, dispense the same product.

The remaining fields shown in FIG. 5A store data generally describing the inventory of vending machine 100. Stocked quantity field 514 stores the number of items that were originally stocked in the dispenser identified by field 510. The contents of this field may be input by an operator during stocking or routine maintenance. Available quantity field 516 contains the number of items currently associated with the dispenser identified by field 510. After stocking or routine maintenance, the contents of field 516 is automatically set equal to the contents of field 514, for each record corresponding to a restocked product. Thereafter, the available quantity is automatically updated by CPU 126 for each associated item sold.

Current price field 518 contains the selling price of the product associated with the item dispenser. Current price field 518 may be populated by the operator during stocking or routine maintenance, and may be determined according to the process steps of the present invention. Exemplary process steps which may be executed to automatically determine a current price are described with reference to FIGS. 6-8B.

FIG. 5B illustrates fields of price management table 500 that define when a price is dynamically evaluated. Stock date field 520 stores the date the dispenser identified by field 510 was most recently stocked. Termination date field 522 contains the last date on which the items of the associated dispenser may be sold. The termination date is entered by an operator during stocking of vending machine 100 and may be a date entered by the operator, the expiration date of the items in the associated dispenser, or another relevant date, such as the next scheduled stocking date.

The next two fields of price management table 500 define shelf times for the product identified by field 512. Total shelf time field 524 defines the maximum allowable shelf time for the product. The contents of field 524 are calculated by CPU 126 based on stock date field 520 and termination date field 522 upon stocking. Remaining shelf time field 526 defines the remaining shelf time of the product and is periodically calculated by CPU 126 based on the system date, and the contents of field 522.

Evaluation frequency field 528 stores a code representing a rule defining the frequency with which the CPU 126 should evaluate the price of the product identified by field 512. Although field 528 only contains a code, the contents of field 528 illustrated in FIG. 5 show the logical representations of the codes. The evaluation rule applicable to a product is generally selected by an operator from a set of rules defined by the vending machine manufacturer. In the examples shown in FIG. 5, evaluation frequency field 528 may store a code representing a rule to evaluate a product price every x purchases or a rule to evaluate a product price every y hours, where x and y are greater than zero.

Of course, the present invention envisions numerous alternative evaluation frequency rules. For example, a rule could be defined to evaluate the price whenever sensor 115 senses a predetermined condition. If sensor 115 is a thermostat, CPU 126 could be programmed to evaluate the price whenever the temperature exceeded a predefined temperature. Other evaluation frequency rules could be implemented to evaluate the price when demand for a product rapidly changes or if at the current demand level items will remain stocked past the termination date in field 522. Further, CPU 126 could be programmed to evaluate prices during periods of low activity, such as during the early morning. In another embodiment, one or more evaluation frequency rules could be defined to evaluate one or more prices based on inventory data. For example, a price could be evaluated when available quantity falls below a threshold amount. More particularly, a price could be evaluated when, based upon current and/or predicted demand, it is estimated that the available quantity of a given product will be zero (i.e. the product will sell out) before the restock date.

Last evaluation date/time field 530 stores a timestamp identifying the time of last sale, and field 532 stores the number of sales of the associated product made since the last price evaluation. These fields are periodically updated by CPU 126, and are periodically accessed by CPU 126 based on the evaluation rule represented by the contents of field 528.

Fields 534-538 define demand-based price evaluation parameters. Previous demand field 534 stores the level of demand as of the last price evaluation. Current demand field stores the current demand level for the product in the dispenser identified by the contents of field 510. CPU 126 periodically calculates the current demand and stores it in field 536. After each evaluation, CPU 126 sets the contents of previous demand field 534 equal to the contents of current demand field 536. Demand increment field 538 defines the incremental difference between the previous demand and the current demand that is required to trigger a price evaluation process. Other types of demand increment data may be employed. For example, a demand increment may be defined with respect to one or more corresponding values of demand, such that at different values/ranges of values of demand, different demand increments are required to trigger a price evaluation process.

FIG. 5C illustrates fields of price management table 500 that are used to calculate the current price stored in field 518. Price adjustment increment field 540 stores the amount by which the price of the product identified by field 512 may be adjusted. Of course, the price of the product identified by field 512 may be adjusted by multiples of the price adjustment increment. Other types of price adjustment increment data may be employed. For example, a price adjustment increment may be defined with respect to one or more corresponding values of price, such that at different values/ranges of values of price, different price adjustment increments are employed to modify a price.

It should be noted that price adjustment increment amounts may be set to amounts relevant to a specific currency. For example, in the United States, a price adjustment increment may be set to a multiple of a desired denomination, so that prices are raised or lowered by an amount that may be conveniently paid for with, e.g., a "nickel" coin, such as the exemplary $0.05 price adjustment increment amount corresponding to record 548 of FIG. 5C. By way of another example, a price adjustment increment may be set so that prices are raised or lowered by an amount that may be conveniently paid for with a "dime" coin, such as the exemplary $0.10 price adjustment increment amount corresponding to record 556 of FIG. 5C. In this manner, prices may be raised and lowered to currency-specific denominations that are relevant in a particular economy.

More particularly, the price adjustment increment may be set to a desired denomination based on the price. For example, a desired denomination may be (i) set to a dime coin when the price is relatively high (e.g., $0.80), and (ii) set to a lesser denomination (e.g., a nickel coin) when the price is relatively low (e.g., $0.50). Thus, the price adjustment may permit greater fluctuations in price when the price is relatively high, but decreasing fluctuations in price when the price is relatively low.

Fields 542-546 define price parameters for the product identified by field 512. The minimum price to be charged for the product is stored in minimum price field 542; the manufacturer's suggested retail price for the product is stored in suggested price field 544; and the maximum price to be charged for the product is stored in maximum price field 546.

The manufacturer's suggested retail price of field 544 may be used as the initial current price after stocking, and/or it may be used as a factor to determine future prices. The minimum price and maximum price fields 542 and 546 are used to prevent the calculated price from falling outside a predetermined range. This financially protects both the vending machine operator and the consumer.

Evaluation Process Steps

Having thus described the system architecture and components of various embodiments, the operation of various embodiments will now be described in greater detail with reference to FIGS. 6A-8B, and continuing reference to FIGS. 1-5C. It is to be understood that the instructions (e.g., embodied in one or more software or firmware "programs") which may be employed to provide the functionality described herein may be stored, e.g., as software stored in the storage device 134 of the vending machine 100. The instructions may alternatively or additionally be stored in ROM 130. It will also be understood that, although the methods described herein include various steps by way of illustration, various steps are optional and not required in all embodiments of the invention.

The CPU performs instructions (e.g., of the one or more programs), and thereby operates in accordance with the present invention, and particularly in accordance with the various methods described in detail herein. An aspect of the invention may include a computer program developed using an object oriented language that allows the modeling of complex systems with modular objects to create abstractions that are representative of real world, physical objects and their interrelationships. However, it would be understood by one of ordinary skill in the art that the embodiments as described herein can be implemented in many different ways using a wide range of programming techniques as well as general purpose hardware systems or dedicated controllers.

The instructions may be stored in a compressed, uncompiled and/or encrypted format. The instructions furthermore may include program elements that may be generally useful, such as an operating system, a database management system and device drivers for allowing the CPU to interface with computer peripheral devices. Appropriate general purpose program elements are well known to those of ordinary skill in the art.

Further, the instructions are operative to execute a number of invention-specific, objects, modules and/or subroutines, as disclosed herein.

According to some embodiments of the present invention, the instructions may be read into a main memory of the CPU from another computer-readable medium, such from a ROM to a RAM or a flash memory device. Execution of sequences of the instructions can cause the CPU to perform the process steps described herein. In alternate embodiments, hard-wired circuitry or integrated circuits may be used in place of, or in combination with, software instructions for implementation of the processes of various embodiments. Thus, embodiments of the present invention are not limited to any specific combination of hardware, firmware, and/or software.

It should be noted that the term "computer-readable medium" as used herein refers to any medium that participates in providing instructions and/or data to a processor (e.g., the CPU 126) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. Various forms of computer readable media may be involved in carrying one or more sequences of one or more instructions to a processor for execution.

According to embodiments of the present invention, there are at least three general situations in which it is can be appropriate to determine the price of a product in a vending machine: after stocking, after a sale of an item and after a period of time. FIGS. 6A-6B, FIGS. 7A-7B and FIGS. 8A-8B illustrate the process steps executed by vending machine 100 to determine a price of a product at each of these times, respectively. Nevertheless, the price of a one or more products may be determined at other times, as desired.

Figure 6A:
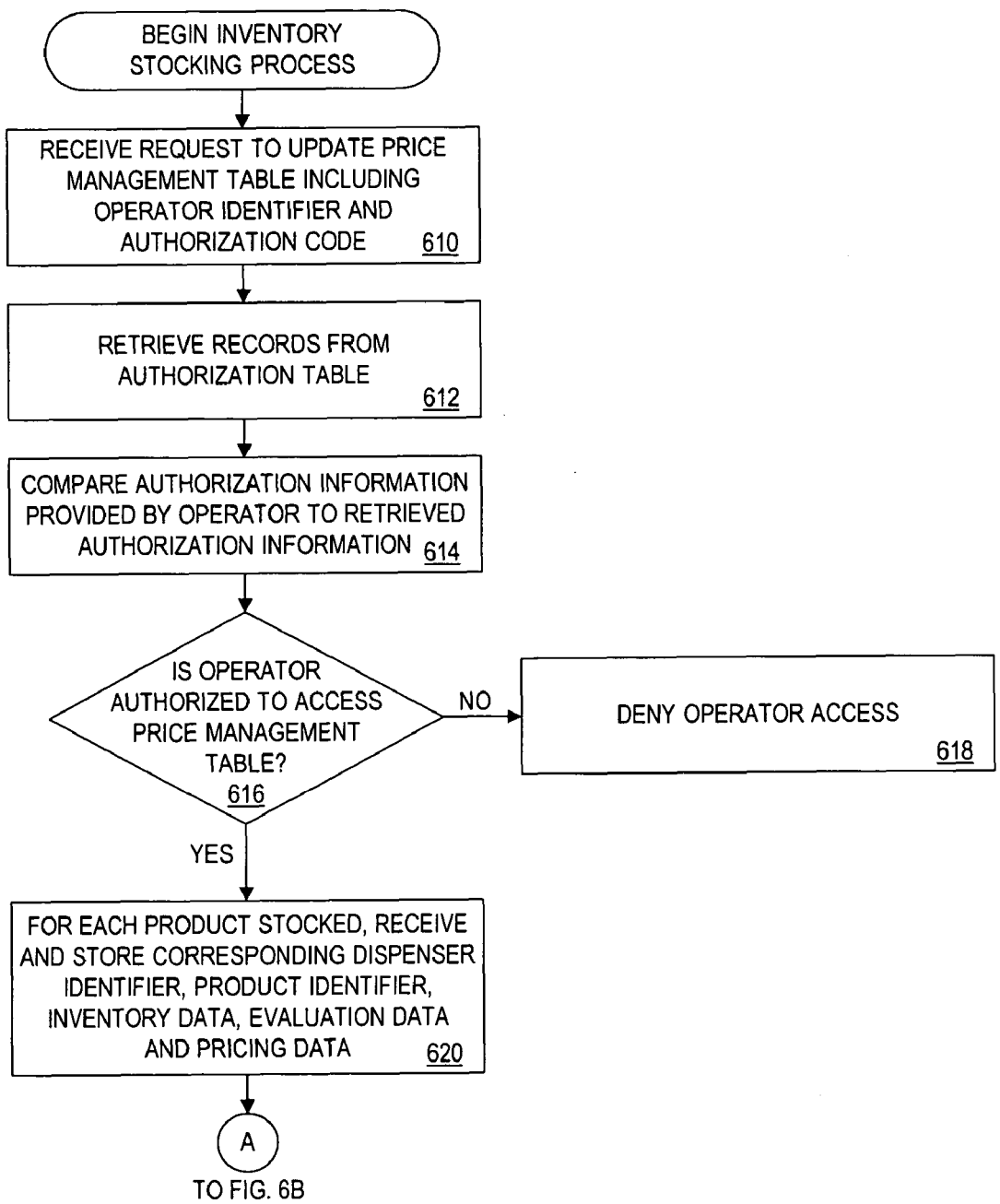
FIGS. 6A-6B is a flow chart illustrating the computer implemented steps used to set a product price upon stocking the vending machine of FIG. 2.
Figure 6B:
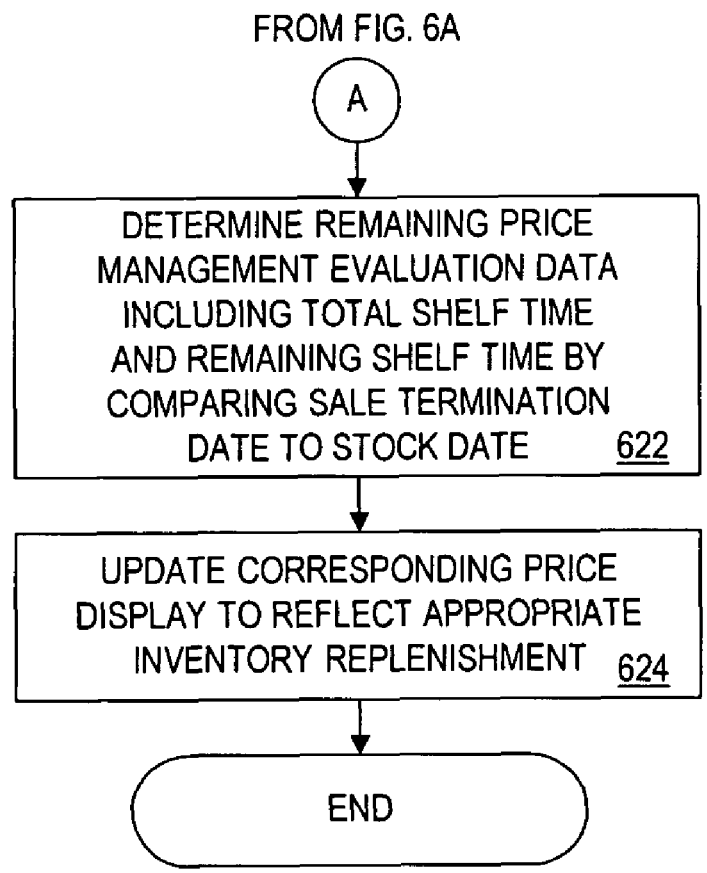

Referring now to FIGS. 6A and 6B, process steps that may be executed by vending machine 100 to determine a price of a product after stocking will be described. As shown at step 610, CPU 126 receives a request to update price management table 500. This request indicates that an operator is stocking vending machine 100, and the request includes an operator identifier and authorization code entered by the operator.

At step 612, CPU 126 retrieves a record from authorization table 400 using the received operator identifier as an index. CPU 126 then, as shown at step 614, compares operator identifier and authorization code received at step 610 with the contents of operator identifier field 402 and authorization code field 404 retrieved at step 612, respectively. It may then be determined, according to some embodiments, if the operator is authorized to access the price management table, at 616. If the comparison yields a match of the respective data, CPU 126 may proceed to execute step 620, for example, otherwise, CPU 126 may deny the operator access to price management table 500, at 618.

At step 620, CPU 126 receives input from the operator. The operator inputs a dispenser identifier, a product identifier and relevant portions of the inventory, evaluation and pricing data pertaining to the stocked product and associated dispenser to be stored in price management table 500. The inventory data received from the operator includes a stocked quantity, and a current price. The evaluation data received from the operator includes a termination date, an evaluation frequency and a demand increment. The pricing data received from the operator includes a price adjustment increment, a minimum price, a suggested price and a maximum price. The data received from the operator is stored by CPU 126 in the appropriate fields of price management table 500. Of course, receiving data for one or more of these fields from the operator may be optional as CPU 126 could supply default values for certain fields. In addition, the data for one or more of these fields could be automatically received from a remote source using the network configuration illustrated in FIG. 9 or from an attached bar code reader (not shown) such as the U.P.C. scanners attached to the vending machines (e.g., a scanner such as one manufactured by Automatic Vending America, Inc.)

At step 622, CPU 126 calculates the remaining price management data to be stored in price management inventory table 500. Specifically, CPU 126 calculates the total shelf time, remaining shelf time and current price for the associated product. Although, the current price may be input by the operator, the current price would preferably be set equal to the manufacturer's suggested price stored in field 544, or to another predefined default price. Of course, in an alternate embodiment, the current price could be determined in accordance with the price evaluations described below with reference to, e.g., the post-purchase evaluation process and/or the periodic evaluation process.

At step 624, the stocking process concludes with the step of adjusting the price display 124 corresponding to item dispensers 122 dispensing the associated product. The price displays 124 are adjusted to display the price determined at step 620.

One of ordinary skill in the art would readily understand various alternatives to the stocking process described above. For example, alternative processes and additional steps to the processes described herein are described in commonly-owned, co-pending U.S. patent application Ser. No. 10/951, 296.

Figure 7A:
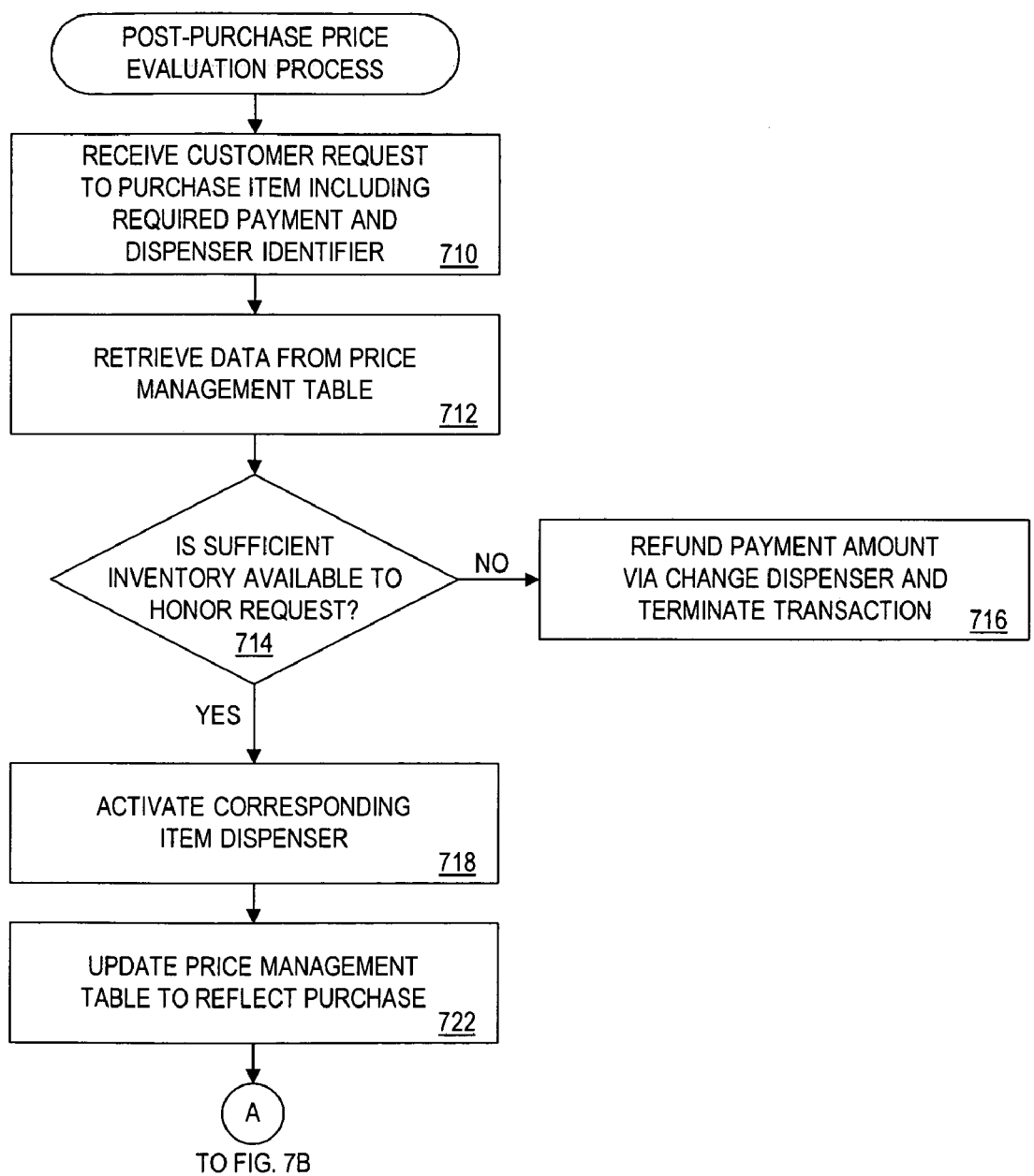
FIGS. 7A-7C are a flow chart illustrating the computer implemented steps used to set a product price after a product purchase at the vending machine of FIG. 2.
Figure 7B:
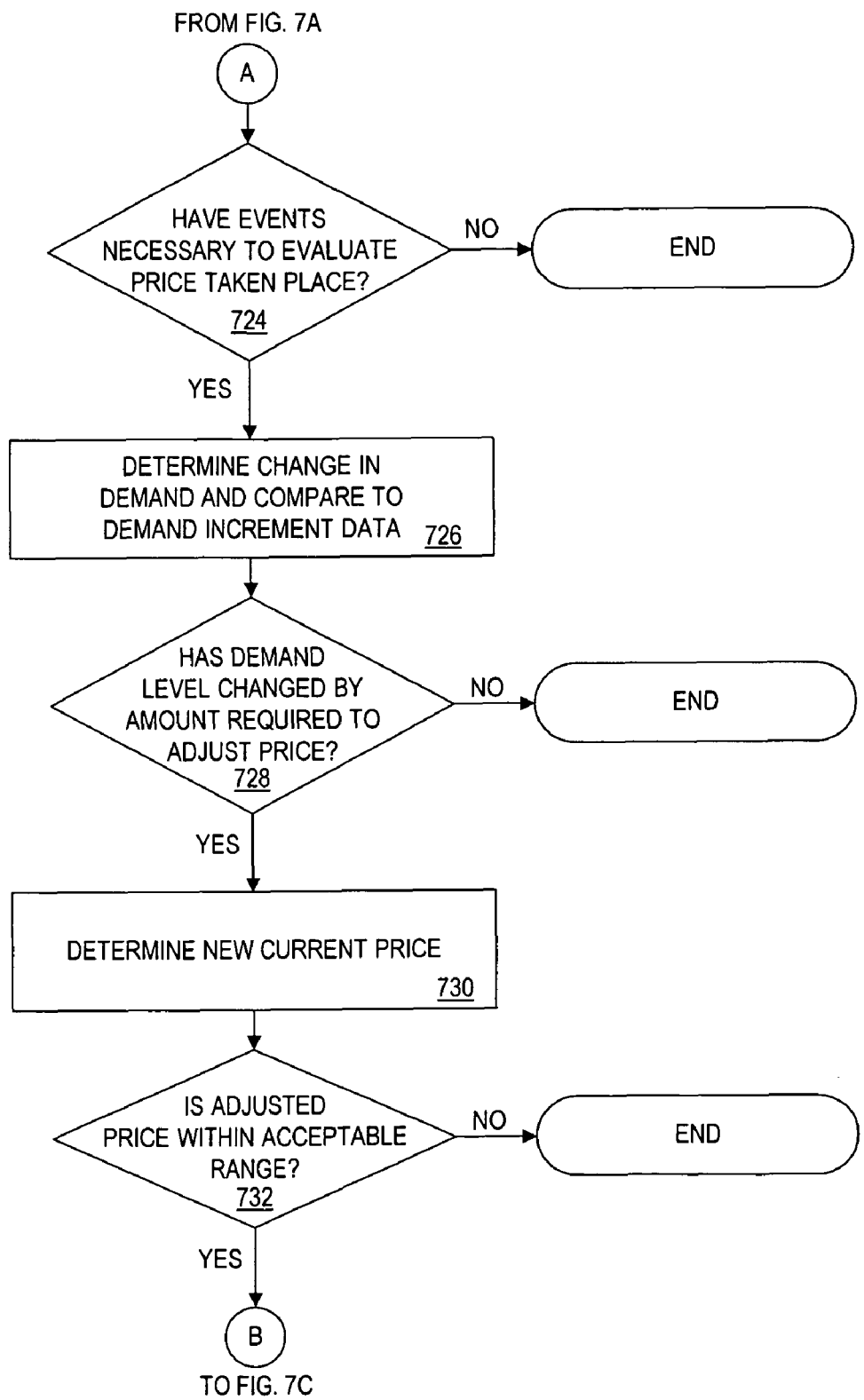
Figure 7C:
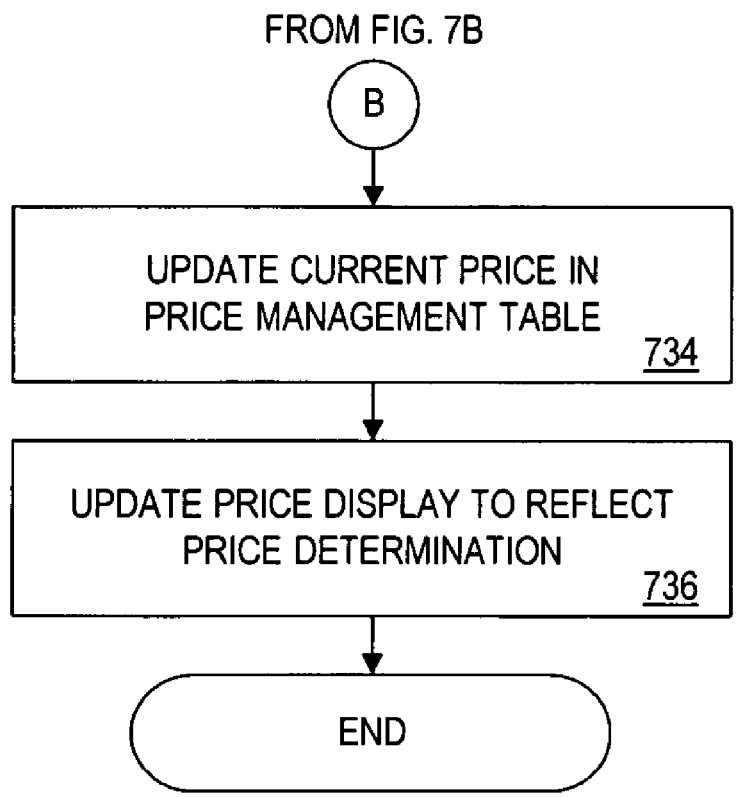

Referring now to FIGS. 7A, 7B and 7C, process steps that may be executed by vending machine 100 to determine a price of a product after a sale of an item will be described. At step 710, CPU 126 receives a customer request to purchase an item. In accordance with vending machine 100, the request includes an indication of payment and a dispenser identifier. In other embodiments, the request may include a product identifier instead of the dispenser identifier. CPU 126 then uses the received dispenser identifier to retrieve the relevant record from price management table 500, as shown at step 712. Based on the contents of field 516, a determination is made at step 714 whether sufficient inventory is available to honor the request. If there is not sufficient inventory, CPU 126 processes step 716 and causes change dispenser 118 to return any inserted payment, and the transaction is terminated. If vending machine 100 holds sufficient inventory to honor the request, CPU 126 processes step 718 and activates item dispenser 122 corresponding to the dispenser identifier received at step 710.

At step 722, CPU 126 updates the price management data pertaining to the product selected by the customer and stores the updated data in price management table 500. The step of updating includes the step of decrementing the contents of available quantity field 516, incrementing the contents of field 532 to reflect the sale and updating the contents of current demand field 536. At step 724, a determination is made whether the necessary events have occurred to require a price evaluation for the selected product. In the present embodiment, this step includes comparing the parameter identified by evaluation frequency field 528 to either last evaluation date/time field 530 or sales since last evaluation field 532. If it is time to evaluate the price of the selected product, CPU processes step 726.

At step 726, CPU 126 calculates the change in demand for the specified product and at step 728 compares the calculated change in demand to the demand increment data stored in field 538. If the demand for the specified product has changed by at least the demand increment stored in field 538, CPU 126 processes step 730 and determines a new current price for the specified product. One of many preferred formulas that can be used to determine a new current price is:

$$P_{nc} = P_{current} \pm P_{increment}$$

where:

$P_{nc}$ represents the new current price;

$P_{current}$ represents the current price stored in field 518; and $P_{increment}$ represents the price increment stored in field 540.

If the demand for the product has increased, the new current price equals the contents of current price field 518 plus the contents of price adjustment field 540. If the demand for the product has decreased, the new current price equals the contents of current price field 518 less the contents of price adjustment field 540. At step 732, CPU 126 verifies that the new current price falls within the range of acceptable prices as defined by minimum price field 542 and maximum price field 546.

If the new current price is within the acceptable range, current price field 518 is updated to reflect the new current price as shown at step 734. It is important to note that although a specific price determination formula has been described herein, the method and apparatus of the present invention is intended to work with many different price determination formulas applicable to product pricing. Various formulas may easily be implemented by one of ordinary skill in the art with minor design variations. Finally, at step 736, CPU 126 updates the price display 124 associated with subject item dispenser to reflect the new current price of the product.

Figure 8A:
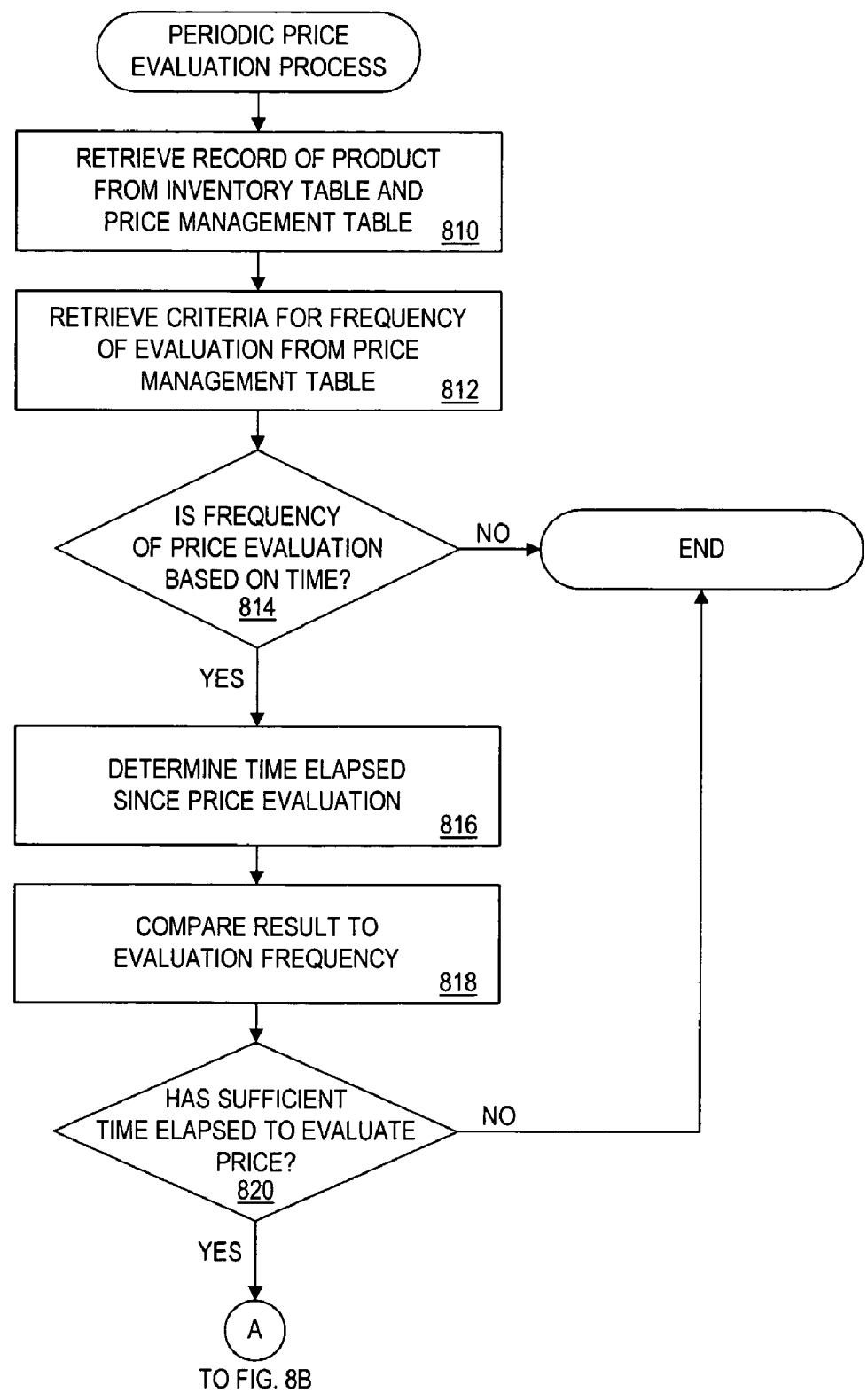
FIGS. 8A-8B are a flow chart illustrating the computer implemented steps used to set a product price at the vending machine of FIG. 2 according to a predetermined schedule.
Figure 8B:
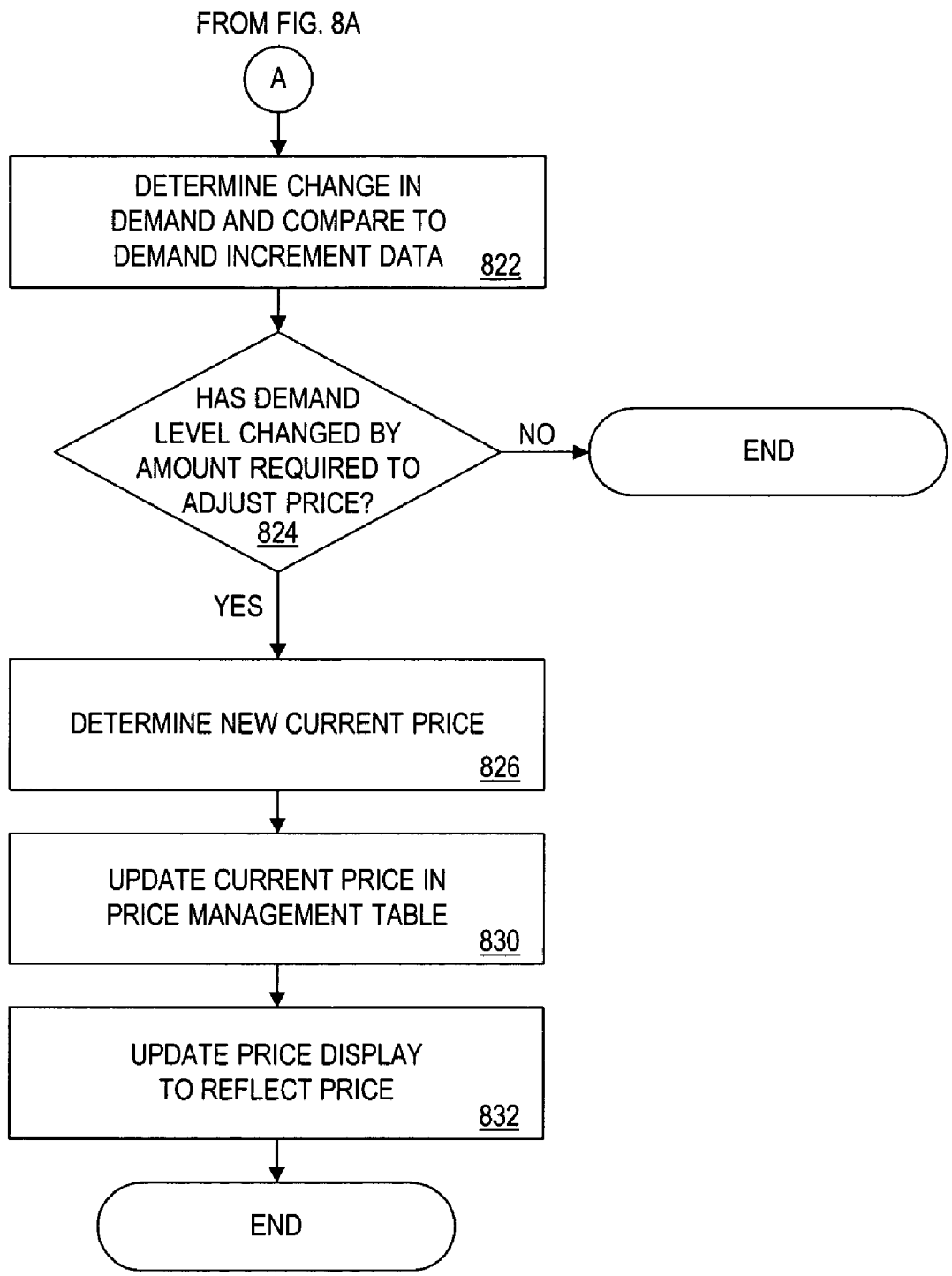

Referring now to FIGS. 8A and 8B, a flow chart is presented illustrating exemplary process steps that may be executed to determine the price of a product during a periodic price evaluation. The process steps of FIGS. 8A and 8B are described herein with respect to a single product. It is envisioned that these steps can be repeated for some or all of the products represented in price management table 500.

At step 810, CPU 126 begins the periodic price evaluation process by retrieving a record associated with a specified product from price management table 500. At step 812, CPU 126 accesses the contents of evaluation frequency field 528 to determine if the price evaluation frequency is based on time, as shown at step 814. If the evaluation of the product's price is not based on time, the process ends. Otherwise, the process proceeds to step 816. In an alternate embodiment, step 814 may include determining whether the quantity of the product is non-zero. If the quantity of the product is zero, CPU 126 would terminate the process to avoid evaluating the price of an unavailable product.

At step 816, CPU 126 determines the time elapsed since the price of the product was last evaluated. This is accomplished by retrieving the system date and time from clock 132 and comparing the system date and time to the date and time stored in last evaluation date/time field 530. At step 818, the result is compared to the evaluation frequency parameter indicated by field 528. It may then be determined, according to some embodiments, if sufficient time has elapsed to evaluate the price, at 820. If sufficient time has elapsed, the process may proceed, for example, with step 822. Otherwise, the process may ends.

At step 822, CPU 126 calculates the change in demand for the specified product and compares the calculated change in demand to the demand increment data stored in field 538. It may then be determined, according to some embodiments, if the demand level has changed by an amount appropriate to require an adjustment of the price, at 824. If the demand for the specified product has changed by at least the demand increment stored in field 538, for example, CPU 126 processes step 826 and determines a new current price for the specified product. One possible formula that can be used to determine a new current price is:

$$P_{nc}=[(ST_{remain}/ST_{total})\times(P_{maximum}-P_{minimum})]+P_{minimum}$$

where:

$P_{nc}$ represents the new current price;

$ST_{remain}$ represents the remaining shelf time stored in field 526;

$ST_{total}$ represents the total shelf time stored in field 524;

$P_{maximum}$ represents the maximum price stored in field 542; and $P_{minimum}$ represents the minimum price stored in field 546.

This particular formula generally determines the new current price based on the remaining shelf life and the maximum and minimum price boundaries. In this embodiment, the calculated price may be rounded to the nearest price adjustment increment indicated in field 540. At step 830, current price field 518 is updated to reflect the new current price as shown at step 830. Finally, at step 832 CPU 126 updates the price display associated with subject item dispenser to reflect the new current price of the product.

In other embodiments, the new current price may be determined based on the demand for the product, and/or the demand for the product relative to the demands of other products (e.g., the other products sold by the vending machine, the other products sold by the vending machine that are of the same type as the product). Such a demand-based formula (as well as other formulas) may also determine the new current price based also on the maximum and minimum price boundaries. For example, one possible formula that can be used to determine a new current price is:

$$P_{nc}=[(D_{current}/D_{maximum})\times(P_{maximum}-P_{minimum})]+P_{minimum}$$

where:

$P_{nc}$ represents the new current price;

$D_{current}$ represents the current demand for the product (e.g., units sold/hour);

$D_{maximum}$ represents the maximum, or highest permitted, demand for the product (e.g., units sold/hour);

$P_{maximum}$ represents the maximum price stored in field 542; and $P_{minimum}$ represents the minimum price stored in field 546.

Thus, for example, the $D_{maximum}$ could be a predefined amount (e.g., ten units sold per hour), and $D_{current}$, when determined, could be restricted to being no greater than $D_{maximum}$. If $D_{current}$ were determined to be greater than $D_{maximum}$ then $D_{current}$ could be set to $D_{maximum}$. This would permit the price for products having a demand of $D_{maximum}$ or greater to be set to the maximum price.

In another embodiment, the new current price is set based on the current demand and the current inventory amount of the product. For example, a product with a relatively high demand may be priced relatively high, and a product with a relatively low inventory amount may be priced relatively high. Employing these principles in combination, a product may be priced as follows $$P_{nc}=[(D_{current}/D_{maximum})\times(I_{current}/I_{maximum})\times(P_{maximum}-P_{minimum})]+P_{minimum}$$

where:

$P_{nc}$ represents the new current price;

$D_{current}$ represents the current demand for the product (e.g., units sold/hour);

$D_{maximum}$ represents the maximum, or highest permitted, demand for the product (e.g., units sold/hour);

$I_{current}$ represents the current inventory amount for the product (e.g., units remaining);

$I_{maximum}$ represents the maximum, or highest permitted, inventory amount for the product (e.g., units which may be stocked in a particular product row, units which may be stocked in the vending machine, or units which were originally stocked);

$P_{maximum}$ represents the maximum price stored in field 542; and $P_{minimum}$ represents the minimum price stored in field 546.

Although the exemplary formulas described above are linear equations of various variables, those of skill in the art will understand that many types of non-linear formulas may be employed and/or many other variables may be employed, in various combinations.

Further, different mechanisms for determining the new current price may be used instead of or in addition to formulas. For example, a table may be used to associate values or ranges of values of one or more variables with a new current price, or a change in the current price. For example, a table may define, for each of a plurality of prices or ranges of prices, fields for demand, inventory amount. The fields may in turn define a value or range of values (e.g., for demand). In addition, a table may be used for one or more products, and thus one or more tables may be used for one or more products sold by a vending machine.

Still further mechanisms may be used for determining the new current price instead of or in addition to formulas and/or tables. For example, an adaptive algorithm (e.g., employing a neural network algorithm, a genetic algorithm) may be used to associate variables and prices. Such adaptive algorithms generally employ a fitness function (e.g., sales rate, sales amount, profitability, profit/time, profit per stocking period) to determine the effectiveness of a selected set of variables and a selected set of methods for processing those variables in determining prices of products. In one embodiment, an adaptive algorithm may be used to adjust weighting variables applied to formulas. In one embodiment, an adaptive algorithm may be used to adjust values or ranges of values of fields in a table.

Referring back to FIGS. 5A-5C, the contents of record 562 illustrates the result of the example process 800. As shown by field 512, record 550 is associated with a dispenser stocked with cola. According to field 526, the remaining shelf time for the cola in inventory is 62 days, while the total shelf time stored in field 524 is 70 days. The maximum price for cola, stored in field 546, is $1.15, and the minimum price is $0.35, as shown by field 542. To calculate the selling price of cola according to the present embodiment, CPU 126 applies the formula described above:

$$P_{nc} = [(ST_{remain}/ST_{total}) \times (P_{maximum} - P_{minimum})] + P_{minimum}$$

$$P_{nc} = [(62/70) \times (\$1.15 - \$0.35)] + \$0.35$$

$$P_{nc} = \$1.0586$$

Rounding the result to the nearest price adjustment increment stored in field 540, the selling price is $1.05.

As described, the price evaluation formulas discussed with reference to FIGS. 7A-7C and 8A-8B rely on data collected and stored in price management table 500. The present invention may employ other factors in place of or in addition to stored data to determine a current selling price. In particular, output from sensor 115 may be used to determine the price of a product. For example, in the case where sensor 115 is a thermometer, a price calculation could be employed that increases the price of a soft drink as the external temperature increases (e.g., by increasing the amount of a price determined by a formula, by a table). Alternatively, the price of hot chocolate could increase as the external temperature decreases. Various products may be associated (e.g., through data stored in a table) with a value that correlates the change (both in magnitude and direction) in a measurement (e.g., temperature) to a change in the price of that product.

Figure 9:
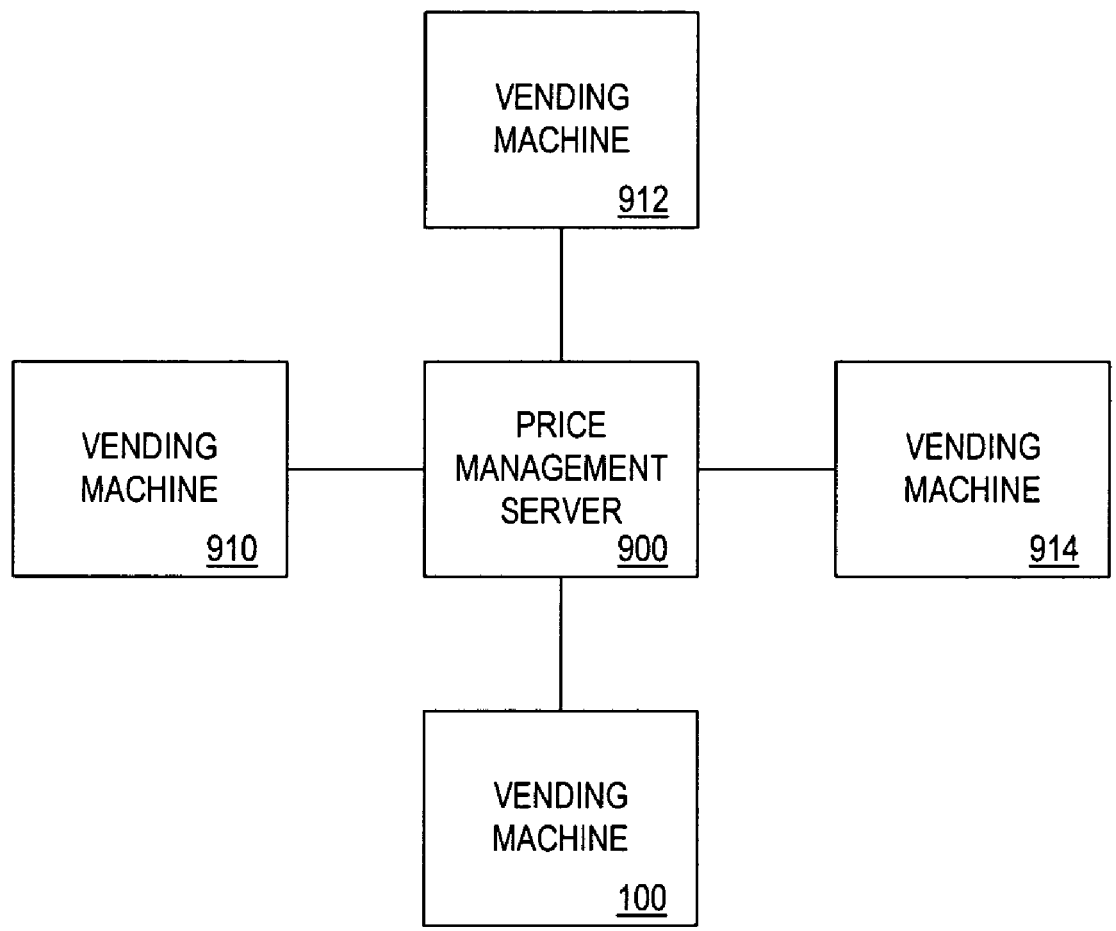
FIG. 9 is a schematic block diagram illustrating a network embodiment of the present invention.

Referring now to FIG. 9, a network is shown to illustrate an alternate embodiment of the present invention. Price management server 900 and a plurality of vending machines 100, 910, 912 and 914 (collectively, the "nodes") preferably transmit digitally encoded data and other information between one another. Any number of vending machines may be in communication with the server 900. The communication links between the nodes and price management server 900 preferably comprise a cable, fiber or wireless link on which electronic signals can propagate. For example, each node may be connected via an Internet connection (e.g., by using a public switched telephone network (PSTN), such as those provided by a local or regional telephone operating company). Alternatively, each node may be connected by dedicated data lines, cellular, Personal Communication Systems ("PCS"), microwave, optical or satellite networks. Possible communications protocols that may be employed in communications include: Ethernet (or IEEE 802.3), SAP, ATP, Bluetooth™, and TCP/IP.

In this configuration, the previously described functionality provided by processing module 144 (i.e. inventory management and dynamic price adjustment) can be remotely performed by price management server 900. The resulting price adjustments are transmitted from price management server 900 to each of the plurality of vending machines.

Conventional cryptographic techniques may be employed to ensure the authenticity of remote data received by the nodes. Further, authentication table 400, or a functional equivalent, may be employed at price management server 900, the node or both.

In one embodiment, a price of one or more products may be reduced in price increments, but increases to the price may be to one (or more) default prices. For example, the price of a product may be incrementally reduced (e.g., by increments of $0.10) if demand falls below a predetermined threshold within a given period of time (e.g., less than 1 unit sold per hour during the last three hours), but prices may be raised only to, e.g., a single, default price (e.g., the retail price) if demand surpasses a predetermined threshold within a given period of time (e.g., more than 5 items per hour during the last two hours). That is, where price increases are appropriate because demand has met or surpassed a given threshold, such as the threshold illustrated by the demand increment of field 538 of FIG. 5B, prices may be increased only to a default retail price, rather than by adding a price adjustment increment, such as the increments illustrated in field 540 of FIG. 5C, to the product's current price.

In such an embodiment, a given product may be assigned price management rules in a Price Management Table such as that illustrated by FIGS. 5A-C. For example, if demand for a given product is reduced by 10%, the price management rules may provide that the price should be reduced by $0.05. However, the price management rules may provide that if demand subsequently increases by 10%, the price should be set to $0.50—a price which may correspond to the manufacturer's suggested retail price stored in field 544 of FIG. 5C. As with other price management embodiments discussed herein, a price management process may be executed after a customer has purchased an item, periodically (e.g. every 24 hours), substantially continuously or otherwise as described herein.

In various embodiments the price may be raised to the default price for reasons other than a sufficient demand. In general, many examples have been provided herein in which an increase in price is appropriate, and such situations may be employed to raise the price to a default price. For example, the price may be raised to the default price (i) based on the inventory level (e.g., less than two units of the product remain), (ii) based on the inventory level and the demand (e.g., demand is greater than a first predetermined threshold and inventory level is less than a second predetermined threshold), (iii) at certain times (e.g., during "lunch hour", during weekdays between 8 Am and 11 AM), (iv) upon receiving a command or signal (e.g., from an operator who locally or remotely administers such a signal/command).

In some consumer markets, an embodiment in which the price may be raised to only one (or more) default prices can be advantageous. For example, such an embodiment may provide a convenient, palatable and understandable way to communicate price changes to consumers. Specifically, because prices in such an embodiment are not incrementally raised, but are rather raised to a fixed, predetermined retail price, consumers may perceive that vending machine merchandise may be available either (i) at an advertised retail price, or (ii) at a discount price. The consumer may thus perceive that any increase is price is simply a return to the normal retail price (e.g. the manufacturer's suggested retail price) through the elimination of a munificent discount, rather than a "price hike" or opportunistic "price gouging". Thus, consumer dissatisfaction can be reduced or eliminated in employing such an embodiment.

To further enhance the message that the vending machine merchandise may be available either (i) at an advertised retail price, or (ii) at a discount price, the vending machine may display (e.g., on a video display, on a numerical indicator adjacent to a product's price indicator) the "discount amount" (the amount by which the current "discounted" price is less than the advertised retail price). For example, if the retail price of a product is $0.80, and the current (discounted) price is $0.70, the discount amount is $0.10, and this discount amount can be displayed to the customer.

In addition to or instead of displaying a discount amount, the vending machine may display an indicator which indicates, e.g., that a discounted price is in effect, or than a significant discount amount exists. For example, a red LED adjacent to a product may illuminate (i) when the price of that product is less than the corresponding retail price, (ii) when the discount amount of that product is greater than a predetermined amount (e.g., greater than $0.10), and/or (iii) when the price of that product is less than the a predetermined threshold (e.g., when the price is less than half of the retail price).

In one embodiment, the above-described methods for adjusting a price may be employed in adjusting a value which is based on a price and/or a proxy for a price ("price substitute"). For example, one or more products may have an amount of points, or have a price category, in addition to or instead of having a price. Any or all of the products for sale by the vending machine may include a price substitute. Further, products which include a price substitute may cease including a price substitute independent of whether other products cease or commence including a price substitute. Similarly, products which do not include a price substitute may commence including a price substitute independent of whether other products cease or commence including a price substitute.

A price category that a product includes may be a selected one of a plurality of enumerated categories (e.g., one of "low value", "medium value" and "high value" categories). Categories may be mutually exclusive (a product cannot belong to more than one category), or may overlap (a product may belong to more than one category).

The value of the price substitute of a product may be determined based on the price of the product. For example, in an embodiment where a product includes a price category (e.g., includes one of "low value", "medium value" and "high value" categories), the category may be determined based on the price of the product.

The determination of value of the price substitute based on price may be made using many methodologies. Further, the determination may be based on price, or based on prices relative to other prices.

For example, a table may define ranges of prices and corresponding price categories. Alternatively, a table may define the ordinal position of a product (when ordered by price) and corresponding price categories. In other words, a first price category could be associated with, e.g., the five highest-priced products, while a second price category could be associated with, e.g., the three lowest-priced products.

The assignment of products to product categories can generally be advantageous, as described in co-pending U.S. patent application Ser. No. 10/902,397 entitled "PRODUCTS AND PROCESSES FOR VENDING A PLURALITY OF PRODUCTS", filed Jul. 29, 2004. Further, the assignment of products to product categories can generally be advantageous in embodiments, as described in co-pending U.S. Provisional Patent Application No. 60/527,988 entitled "APPARATUS, SYSTEM AND METHOD FOR ESTABLISHING MULTI-TRANSACTION RELATIONSHIPS WITH VENDING MACHINE CUSTOMERS", filed Dec. 9, 2003.

Rather than translating a price to a price substitute, a price management data may include other data which is manipulated to yield a price substitute. For example, a price management table may define, for one or more products, an amount of points, point adjustment increment, minimum amount of points, suggested amount of points and/or maximum amount of points. Such data regarding points may be readily employed and manipulated as describe above in conjunction with the employment of prices, price adjustment increment, minimum price, suggested price and/or maximum price.

Other methodologies of determining a value of a price substitute based on price will be readily recognized by one of ordinary skill in the art based on he present disclosure.

In general, it can be advantageous to display an indication of the price substitute of a product. For example, one or more LEDs may be employed to display, e.g., a price category that a product includes (e.g., illuminating either a red or green LED to denote either a first or second category respectively). As another example, a single LED, when illuminated, may indicate that a product (or more than one product) is/is not included in a price category. Note that the price need not be displayed, even if a product includes a price.

In one embodiment, the price substitute which is adjusted indicates the acceptability of a particular coupon, of a plurality of particular coupons, or of coupons in general by or at the vending machine. For example, in periods of relatively high demand or a particular product, it may be undesirable to accept coupons for that product, since that product is likely to sell even without the added incentive of a coupon (particularly a coupon for a reduced price). Accordingly, the acceptability of coupons can be made to be related to or correlated with relatively low demand. For example, coupons for a certain product may only be accepted when demand for that product is less than a threshold demand amount.

Coupon-related embodiments may employ price categories. For example, a first price category may indicate that coupons may be redeemed for the corresponding product, while a second category indicates that coupons may not be redeemed for the corresponding product. As another example, coupon categories can reflect the value of coupons. For example, a discount value of a coupon (i.e. the amount by which the price of a product is reduced upon redeeming that coupon) may be enhanced or multiplied in accordance with price categories. In one embodiment, price categories could define that a coupon define a "face value discount amount" "double face value discount amount", or "triple face value discount amount". Thus, depending on the price category a product includes at a particular time, the redemption of a coupon with a face value discount amount of $0.10 could result in a reduction in price of $0.10, $0.20 or $0.30.

As described above, it can be advantageous to display an indication of the price substitute of a product. For example, a video display could indicate via text and/or graphics that coupons may be redeemed for any product in the vending machine, or for certain products in the machine.

Coupons can be made available by in various known manners. For example, coupons may be paper coupons provided by the vending machine or by other means. Coupons may also take the form of an "electronic coupon", such as an indication of a numeric or alphanumeric code which may be read by or received by the vending machine.

Coupons may be read by employing various well-known means, such as by a vending machine peripheral device which accepts paper coupons in much the same manner as a bill or currency acceptor accepts paper currency. Such a peripheral may, alone or in combination with other devices, read data on the coupon, such as by reading a bar code on the coupon with a bar code scanner, or by otherwise reading optical information on the coupon using a laser scanner or other like technology. Similarly, in an embodiment where the code is a numeric or alphanumeric code, a vending machine peripheral such as a keypad or touch screen may allow the user to enter the code manually. In another embodiment, a code may be received via digital communication network, such as a transmission via a Web Browser or cellular telephone over the Internet.

While the best mode for carrying out the invention has been described in detail, those familiar with the art to which the invention relates will recognize various alternative designs and embodiments for practicing the invention. These alternative embodiments are within the scope of the present invention.

We claim:

1. A method comprising:
    determining, by a controller of a vending machine, a current price of a product for sale by the vending machine;
    determining, by the vending machine controller and for the product,
        a price increment,
        a predetermined price, and
        a demand threshold
    that are defined by data stored in at least one data table;
    determining, by the vending machine controller, a rate of units of the product that are sold by calculating a number of units sold during a predetermined period of time;
    comparing, by the vending machine controller, the rate with the demand threshold;
    determining, by the vending machine controller and based on the comparison of the rate with the demand data, whether a new price should be greater than or less than the current price;
    setting, by the vending machine controller, the new price to the predetermined price if the new price should be greater than the current price;
    subtracting, by the vending machine controller, a price increment amount from the current price to yield the new price if the new price should be less than the current price; and
    displaying, by the vending machine, the determined new price.

2. The method of claim 1, in which the demand threshold defines a range of demand.

3. The method of claim 2, in which the demand threshold defines an upper demand threshold and a lower demand threshold.

4. The method of claim 3, in which comparing the rate with the demand threshold comprises:
    determining whether the rate is greater than the upper demand threshold.

5. The method of claim 3, in which comparing the rate with the demand threshold comprises:
    determining whether the rate is less than the lower demand threshold.

6. A vending machine, comprising:
    a processor; and
    a storage device in communication with the processor and storing instructions that when executed by the processor result in:
        determining a current price of a product for sale by the vending machine;
        determining, for the product,
            a price increment,
            a predetermined price, and
            a demand threshold
            that are defined by data stored in at least one data table;
        determining a rate of units of the product that are sold by calculating a number of units sold during a predetermined period of time;
        comparing the rate with the demand threshold;
        determining, based on the comparison of the rate with the demand data, whether a new price should be greater than or less than the current price;
        setting the new price to the predetermined price if the new price should be greater than the current price;
        subtracting a price increment amount from the current price to yield the new price if the new price should be less than the current price; and
        causing a displaying of the determined new price.

7. The vending machine of claim 6, in which the demand threshold defines a range of demand.

8. The vending machine of claim 7, in which the demand threshold defines an upper demand threshold and a lower demand threshold.

9. The vending machine of claim 8, in which comparing the rate with the demand threshold comprises:
    determining whether the rate is greater than the upper demand threshold.

10. The vending machine of claim 8, in which comparing the rate with the demand threshold comprises:
    determining whether the rate is less than the lower demand threshold.

11. A computer program product, comprising a computer usable medium having a computer readable program code embodied therein, said computer readable program adapted to be executed by a processor to:
    determine a current price of a product for sale by a vending machine;
    determine, for the product,
        a price increment,
        a predetermined price, and a demand threshold
that are defined by data stored in at least one data table;
determine a rate of units of the product that are sold by calculating a number of units sold during a predetermined period of time;
compare the rate with the demand threshold;
determine, based on the comparison of the rate with the demand data, whether the new price should be greater than or less than the current price;
set the new price to the predetermined price if the new price should be greater than the current price;
subtract a price increment amount from the current price to yield the new price if the new price should be less than the current price; and
cause a displaying of the determined new price.

12. The computer program product of claim 11, in which the demand threshold defines a range of demand.

13. The computer program product of claim 12, in which the demand threshold defines an upper demand threshold and a lower demand threshold.

14. The computer program product of claim 13, in which comparing the rate with the demand threshold comprises:
determining whether the rate is greater than the upper demand threshold.

15. The computer program product of claim 13, in which comparing the rate with the demand threshold comprises:
determining whether the rate is less than the lower demand threshold.

* * * * *